(12) United States Patent
Hiwatari et al.

(10) Patent No.: US 9,516,007 B2
(45) Date of Patent: Dec. 6, 2016

(54) VERIFIER AND PROVER HAVE AN AUTHENTICATION PROTOCOL WITH CHALLENGE-RESPONSE WITH THE CHALLENGE FROM PROVER HAVING IDENTIFICATION OF THE VERIFIER

(71) Applicant: SONY CORPORATION, Tokyo (JP)

(72) Inventors: Harunaga Hiwatari, Kanagawa (JP); Koichi Sakumoto, Tokyo (JP); Taizo Shirai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/372,530

(22) PCT Filed: Oct. 10, 2013

(86) PCT No.: PCT/JP2013/077605
§ 371 (c)(1),
(2) Date: Jul. 16, 2014

(87) PCT Pub. No.: WO2014/087738
PCT Pub. Date: Jun. 12, 2014

(65) Prior Publication Data
US 2014/0359727 A1 Dec. 4, 2014

(30) Foreign Application Priority Data
Dec. 5, 2012 (JP) ................................ 2012-266341

(51) Int. Cl.
*G06F 21/31* (2013.01)
*H04L 29/06* (2006.01)
*H04L 9/32* (2006.01)
*H04L 9/30* (2006.01)
*H04L 12/24* (2006.01)

(52) U.S. Cl.
CPC ............. *H04L 63/08* (2013.01); *H04L 9/3093* (2013.01); *H04L 9/3218* (2013.01); *H04L 9/3271* (2013.01)

(58) Field of Classification Search
CPC ........... H04L 9/3271; H04L 29/06755; G06F 21/30; G06F 21/44
See application file for complete search history.

(56) References Cited

U.S. PATENT DOCUMENTS 5,740,361 A * 4/1998 Brown .................... G06F 21/31 726/5
6,690,794 B1 * 2/2004 Terao et al. ..................... 380/22

(Continued)

FOREIGN PATENT DOCUMENTS

| JP | 2012-098690 A | 5/2012 |
| WO | WO 2007/091531 A2 | 8/2007 |
| WO | WO 2012/014669 A1 | 2/2012 |

OTHER PUBLICATIONS

Public-Key Identification Schemes Based on Multivariate Quadratic Polynomials. Sakumoto et al. 2011.*

(Continued)

*Primary Examiner* — Venkat Perungavoor
(74) *Attorney, Agent, or Firm* — Chip Law Group

(57) ABSTRACT

An information processing apparatus including a memory and one or more processors coupled to the memory and configured to transmit commitment information, including identification information of a verification processing apparatus, to the verification processing apparatus, receive first challenge information from the verification processing apparatus, generate second challenge information including the identification information based on the received first challenge information, generate response information, used for the verification processing apparatus to execute a process related to verification of the information processing apparatus, based on the generated second challenge information, and transmit the response information to the verification processing apparatus.

20 Claims, 41 Drawing Sheets

(56) References Cited

U.S. PATENT DOCUMENTS

| | | | | |
|---|---|---|---|---|
| 6,889,322 | B1* | 5/2005 | Levy | 713/168 |
| 8,595,506 | B2* | 11/2013 | Robshaw et al. | 713/182 |
| 2004/0103281 | A1* | 5/2004 | Brickell | 713/171 |
| 2005/0268096 | A1* | 12/2005 | Kilian-Kehr | H04L 63/0869 713/168 |
| 2006/0195692 | A1* | 8/2006 | Kuhlman et al. | 713/166 |
| 2007/0157023 | A1* | 7/2007 | Kotzin | H04L 63/0853 713/168 |
| 2007/0239986 | A1* | 10/2007 | Viggiano | H04L 9/3271 713/168 |
| 2009/0198619 | A1* | 8/2009 | Tripunitara et al. | 705/71 |
| 2010/0169643 | A1 | 7/2010 | Teranishi | |
| 2011/0296188 | A1 | 12/2011 | Sakumoto et al. | |
| 2011/0296189 | A1* | 12/2011 | Sakumoto et al. | 713/176 |
| 2012/0131340 | A1* | 5/2012 | Teuwen | H04L 9/3278 713/168 |
| 2012/0166801 | A1* | 6/2012 | Park | H04L 9/3228 713/169 |
| 2013/0089201 | A1* | 4/2013 | Sakumoto et al. | 380/44 |
| 2013/0311768 | A1* | 11/2013 | Fosmark | G06Q 20/3223 713/155 |

OTHER PUBLICATIONS

International Search Report issued Dec. 17, 2013 in PCT/JP2013/077605.

Koichi Sakumoto, "Public-key identification schemes based on multivariate polynomials", Workshop on Solving Multivariate Polynomial Systems and Related Topics, Sony Corporation, Mar. 3, 2013, 25 Pages.

Jacques Stern, "Designing identification schemes with keys of short size", Advances in Cryptology—CRYPTO '94, Lecture Notes in Computer Science, vol. 839, 1994, pp. 164-173.

Koichi Sakumoto, et al., "Public-key identification schemes based on multivariate quadratic polynomials", CRYPTO2011, Sony Corporation, Aug. 18, 2011, 19 Pages.

Jacques Stern, "A new identification scheme based on syndrome decoding", Advances in Cryptology—CRYPTO '93, Lecture Notes in Computer Science, vol. 773, 1994, pp. 13-21.

David Pointcheval, et al., "A new NP-complete problem and public-key identification", Designs, Codes and Cryptography, vol. 28, No. 1, Jan. 2003, 22 Pages.

European Extended Search Report received for European Patent Application No. 13860818.7, mailed on Jun. 30, 2016, p. 9.

Gildas Avoine et al., "When Compromised Readers Meet RFID", Information Security Applications, Springer Berlin Heidelberg, Berlin, Heidelberg, Aug. 25, 2009, pp. 15.

Koichi Sakumoto et al., "Public-Key Identification Schemes Based on Multivariate Quadratic Polynomials", Correct System Design; [Lecture Notes in Computer Science: Lect. Notes Computer], Springer International Publishing, Cham, Aug. 14, 2011, pp. 18.

A. Menezes et al., "Chapter 10: Identification and Entity 1-15 Authentication ED-Menezes A J; Van Oorschot P. C; Vanstone SA", Handbook of Applied Cryptography; [CRC Press Series On Discrete Mathematices And Its Applications], Crc Press, Boca Raton, FL, US, Oct. 1, 1996, pp. 41.

* cited by examiner

VERIFIER AND PROVER HAVE AN AUTHENTICATION PROTOCOL WITH CHALLENGE-RESPONSE WITH THE CHALLENGE FROM PROVER HAVING IDENTIFICATION OF THE VERIFIER

TECHNICAL FIELD

The present disclosure relates to an information processing apparatus, a verification processing apparatus, an information processing method, a verification processing method, and a program.

BACKGROUND ART

Authentication schemes have been used in various situations.

Further, authentication schemes using various algorithms have been developed. As a technology related to a Multivariate Quadratic (MQ) authentication scheme (a scheme based on an MQ question), a technology disclosed in Non-Patent Literature 1 below is exemplified. As a technology related to a Multivariate Cubic (MC) authentication scheme (a scheme based on an MC question), a technology disclosed in Non-Patent Literature 2 below is exemplified. As a technology related to a Syndrome Decoding (SD) authentication scheme (a scheme based on an SD question), a technology disclosed in Non-Patent Literature 3 below is exemplified. As a technology related to a Constrained Linear Equations (CLE) authentication scheme (a scheme based on a CLE question), a technology disclosed in Non-Patent Literature 4 below is exemplified. As a technology related to a Permuted Perceptrons (PP) authentication scheme (a scheme based on a PP problem), a technology disclosed in Non-Patent Literature 5 below is exemplified.

CITATION LIST

Non-Patent Literature

Non-Patent Literature 1: Public-Key Identification Schemes Based on Multivariate Quadratic Polynomials by Koichi Sakumoto, Taizo Shirai, Harunaga Hiwatari, CRYPTO 2011
Non-Patent Literature 2: Public-Key Identification Schemes Based on Multivariate Cubic Polynomials by Koichi Sakumoto, PKC 2012
Non-Patent Literature 3: A New Identification Scheme Based on Syndrome Decoding by Jacques Stern, CRYPTO 1993
Non-Patent Literature 4: Designing Identification Schemes with Keys of Short Size by Jacques Stern, CRYPTO 1994
Non-Patent Literature 5: A New NP-Complete Problem and Public-key Identification by David Pointcheval, Guillaume Poupard, Des. Codes Cryptography 2003

SUMMARY OF INVENTION

Technical Problem

In an authentication protocol in which a verification processing apparatus (hereinafter simply referred to as a "verifier" in some cases) serving as a verifier (authenticator) authenticates an information processing apparatus (hereinafter simply referred to as a "prover" in some cases) serving as a prover (entity to be authenticated) through communication with the information processing apparatus, authentication content destined for a certain verifier may not be confirmed from communication content in some cases.

As described above, when the authentication content destined for a certain verifier may not be confirmed from the communication content, for example, there is a probability of illegal authentication being executed, for example, "an ill-intentioned verifier B uses communication content obtained by executing authentication with a certain prover A for authentication with another verifier C and the ill-intentioned verifier B pretends that the verifier B is the prover A and succeeds in authentication with the verifier C."

Here, as a method of preventing illegal authentication (a threat in authentication), as described above, for example, there is a method of imposing a restriction that information related to authentication of one verifier not be used for authentication with another verifier by embedding an identifier (ID) of the verifier into communication content, as defined in, "ISO\IEC 9798-3."

However, for example, only an authentication scheme using a signature technology is considered in the method defined in "ISO\IEC 9798-3." For this reason, for example, it is difficult to apply the method defined in "ISO\IEC 9798-3" to methods other than, for example, the authentication schemes using the signature technologies, such as the authentication schemes using the technologies disclosed in Non-Patent Literature 1 to Non-Patent Literature 5. Accordingly, for example, even when the method defined in "ISO\IEC 9798-3" is used, it may not be said to prevent the illegal authentication described above.

The present disclosure suggests a novel and improved information processing apparatus, a novel and improved verification processing apparatus, a novel and improved information processing method, a novel and improved verification processing method, and a novel and improved program capable of preventing illegal authentication with another verifier executed using information related to authentication with one verifier for other purposes.

Solution to Problem

According to the present disclosure, there is provided an information processing apparatus including a processing unit configured to transmit commitment information including identification information on a verification processing apparatus to the verification processing apparatus, generate response information used for the verification processing apparatus to execute a process related to verification based on challenge information transmitted from the verification processing apparatus, and transmit the response information to the verification processing apparatus or configured to transmit the commitment information to the verification processing apparatus, generate second challenge information including the identification information based on first challenge information transmitted from the verification processing apparatus, generate the response information based on the generated second challenge information, and transmit the response information to the verification processing apparatus.

According to the present disclosure, there is provided a verification processing apparatus including a verification processing unit configured to verify an information processing apparatus based on identification information of the verification processing apparatus and response information transmitted from the information processing apparatus, in regard to challenge information transmitted from the information processing apparatus and transmitted based on commitment information including the identification information or configured to generate first challenge information transmitted to the information processing apparatus based on the commitment information transmitted from the information processing apparatus and second challenge information based on the identification information and to verify the information processing apparatus based on the second challenge information and the response information transmitted from the information processing apparatus in regard to the first challenge information.

According to the present disclosure, there is provided an information processing method including a step of transmitting commitment information including identification information of a verification processing apparatus to the verification processing apparatus, and a step of generating response information used for the verification processing apparatus to perform a process related to verification based on challenge information transmitted from the verification processing apparatus and transmitting the response information to the verification processing apparatus, or a step of transmitting the commitment information to the verification processing apparatus, a step of generating second challenge information including the identification information based on first challenge information transmitted from the verification processing apparatus, and a step of generating the response information based on the generated second challenge information and transmitting the response information to the verification processing apparatus.

According to the present disclosure, there is provided a verification processing method including a step of transmitting challenge information based on commitment information transmitted from an information processing apparatus and including identification information of a verification processing apparatus, and a step of verifying the information processing apparatus based on response information transmitted from the information processing apparatus in regard to the transmitted challenge information and the identification information, or a step of transmitting first challenge information to the information processing apparatus based on the commitment information transmitted from the information processing apparatus, a step of generating second challenge information based on the transmitted first challenge information and the identification information, and a step of verifying the information processing apparatus based on the second challenge information and the response information transmitted from the information processing apparatus in regard to the first challenge information.

According to the present disclosure, there is provided a program for causing a computer to execute a step of transmitting commitment information including identification information of a verification processing apparatus to the verification processing apparatus, and a step of generating response information used for the verification processing apparatus to perform a process related to verification based on challenge information transmitted from the verification processing apparatus and transmitting the response information to the verification processing apparatus, or a step of transmitting the commitment information to the verification processing apparatus, a step of generating second challenge information including the identification information based on first challenge information transmitted from the verification processing apparatus, and a step of generating the response information based on the generated second challenge information and transmitting the response information to the verification processing apparatus.

According to the present disclosure, there is provided a program for causing a computer to execute a step of transmitting challenge information based on commitment information transmitted from an information processing apparatus and including identification information of the verification processing apparatus, and a step of verifying the information processing apparatus based on response information transmitted from the information processing apparatus in regard to the transmitted challenge information and the identification information, or a step of transmitting first challenge information to the information processing apparatus based on the commitment information transmitted from the information processing apparatus, a step of generating second challenge information based on the transmitted first challenge information and the identification information, and a step of verifying the information processing apparatus based on the second challenge information and the response information transmitted from the information processing apparatus in regard to the first challenge information.

Advantageous Effects of Invention

According to the present disclosure, it is possible to prevent illegal authentication with another verifier executed using information related to authentication with one verifier for other purposes.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Hereinafter, the description will be made in the following order.

1. Information processing method and verification processing method according to embodiment
2. Information processing apparatus and verification processing apparatus according to embodiment
3. Program according to embodiment (Information Processing Method and Verification Processing Method According to Embodiment)

An information processing method (a method related to a process in a prover) according to an embodiment and a verification processing method (a method related to a process in a verifier) according to the embodiment will be first described before the configurations of an information processing apparatus according to the embodiment and a verification processing apparatus according to the embodiment are described. Hereinafter, the information processing method according to the embodiment will be described exemplifying a case in which the information processing apparatus (an apparatus serving as a prover) according to the embodiment executes a process related to the information processing method according to the embodiment. Hereinafter, the verification processing method according to the embodiment will be described exemplifying a case in which the verification processing apparatus (an apparatus serving as a verifier) according to the embodiment executes a process related to the verification processing method according to the embodiment.

[1] Example of Illegal Authentication Executed Using Information Related to Authentication with One Verifier for Other Purposes As described above, when authentication content destined for a certain verifier may not be confirmed from communication content, there is a probability of illegal authentication being executed.

Figure 1:
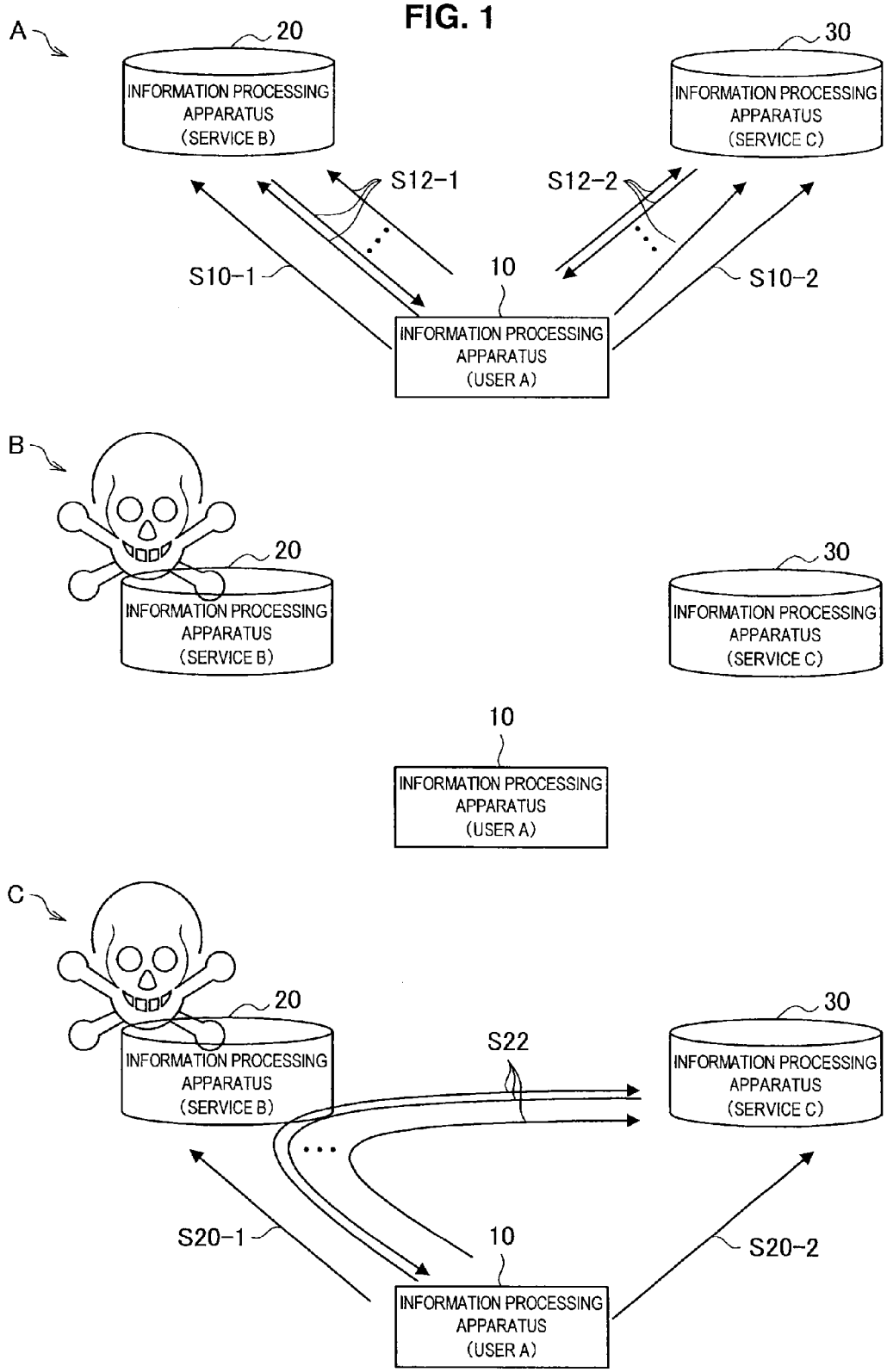
FIG. 1 is an explanatory diagram for describing an example of illegal authentication executed using information related to authentication with one verifier for other purposes.

FIG. 1 is an explanatory diagram for describing an example of illegal authentication executed using information related to authentication with one verifier for other purposes. A of FIG. 1 illustrates an example of normal authentication, and B and C of FIG. 1 illustrate an example of illegal authentication. FIG. 1 illustrates an example in which an information processing apparatus 10 is a prover and information processing apparatuses 20 and 30 are verifiers. FIG. 1 illustrates an example in which the information processing apparatus 20 supplies service B and the information processing apparatus 30 supplies service C. The information processing apparatus 10 indicates "user A," the information processing apparatus 20 indicates "service B," and the information processing apparatus 30 indicates "service C" in some cases below.

First, an example of normal authentication will be described with reference to A of FIG. 1. User A registers the same public key in service B and service C (S10-1 and S10-2). Then, user A executes public key authentication using a private key to receive various services such as service B and service C to be supplied (S12-1 and S12-2).

Next, an example of illegal authentication will be described with reference to B and C of FIG. 1. For example, as illustrated in B of FIG. 1, a case in which the information processing apparatus 20 supplying service B is an apparatus managed by an ill-intentioned manager in a situation such as A of FIG. 1 will be assumed. When an authentication scheme in which communication content does not include information indicating which verifier information is destined for is used in a situation illustrated in B of FIG. 1, there is a probability of user A being exposed to a threat illustrated in C of FIG. 1.

User A registers the same public key in service B and service C as in steps S10-1 and S10-2 illustrated in A of FIG. 1 (S20-1 and S20-2). When user A executes authentication with service B as in step S12-1 illustrated in A of FIG. 1, service B executes authentication with service C as user A based on information obtained in the communication with user A (S22). In step S22, service B succeeds in illegal authentication (attack) merely by transmitting the information obtained in the communication with user A directly to service C and transmitting information obtained in communication with service C directly to user A.

For example, as illustrated in C of FIG. 1, the information processing apparatus 20 (one verifier) managed by an ill-intentioned manager can execute illegal authentication with the information processing apparatus 30 by using information related to the authentication with the information processing apparatus 20 for authentication with the information processing apparatus 30 (another verifier). Accordingly, for example, user A can be exposed to a threat such as robbery of personal information.

Figure 2:
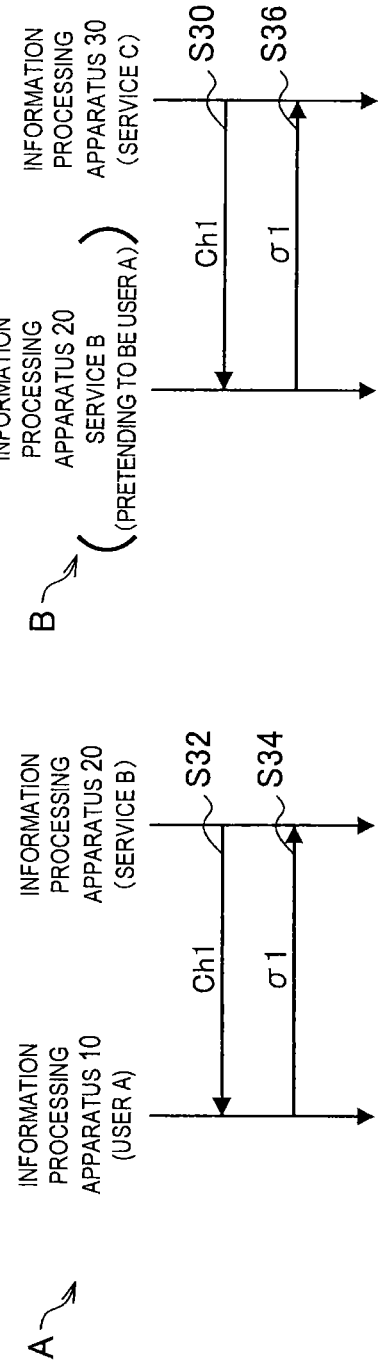
FIG. 2 is another explanatory diagram for describing an example of illegal authentication executed using information related to authentication with one verifier for other purposes.

FIG. 2 is another explanatory diagram for describing an example of illegal authentication executed using information related to authentication with one verifier for other purposes. Here, as in C of FIG. 1, A and B of FIG. 2 illustrate the information processing apparatus 10 (user A), the information processing apparatus 20 (service B) managed by an ill-intentioned manager, and the information processing apparatus 30 (service C) and illustrate an example of the process of step S22 illustrated in C of FIG. 1. FIG. 2 illustrates an example in which challenge-response authentication is executed.

When the information processing apparatus 20 pretending to be user A based on the information obtained in the communication with user A receives a challenge $Ch_1$ transmitted from service C (S30), the information processing apparatus 20 transmits the challenge $Ch_1$ to user A (S32). When the information processing apparatus 20 receives a response $\sigma_1$ to the challenge $Ch_1$ transmitted from user A (S34), the information processing apparatus 20 transmits the response $\sigma_1$ to service C (S36).

The illegal authentication (attack) by the information processing apparatus 20, as illustrated in FIG. 2, may not be prevented at a component technology level (component technology layer) of public key authentication.

[2] Problem when Existing Method is Used

Here, as a method of preventing the foregoing illegal authentication (a threat in authentication), for example, there is a method of imposing a restriction that information related to authentication of one verifier not be used for authentication with another verifier by embedding an identifier (ID) of the verifier into communication content, as defined in, "ISO\IEC 9798-3," as described above. The method defined in "ISO\IEC 9798-3" corresponds to a method of preventing illegal authentication at an operational level of public key authentication.

Figure 3:
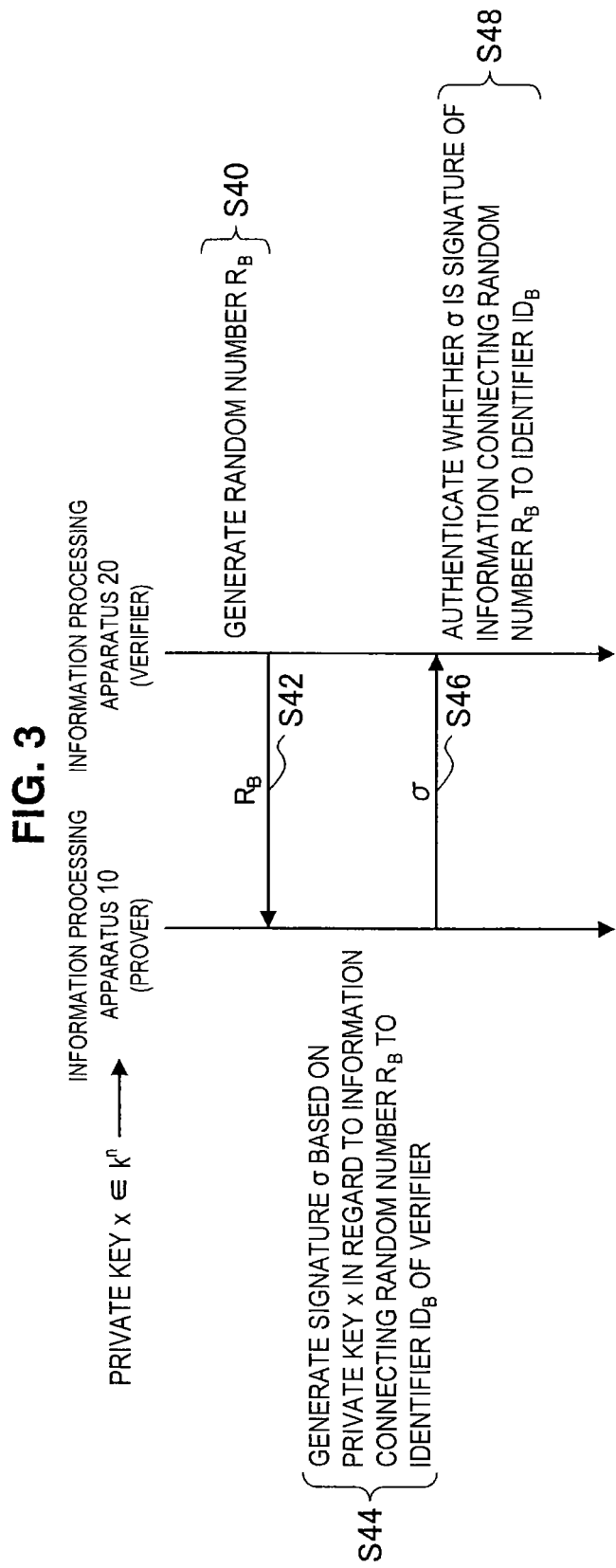
FIG. 3 is an explanatory diagram illustrating an example of a process related to an existing method.

FIG. 3 is an explanatory diagram illustrating an example of a process related to an existing method. Here, FIG. 3 illustrates an example of a process related to authentication in which the information processing apparatus 10 (user A) serves as a prover in the situation illustrated in FIG. 1 and the information processing apparatus 20 (service B) serves as a verifier in the situation illustrated in FIG. 1. In FIG. 3, an identifier of the verifier is indicated by "$ID_B$."

The information processing apparatus 20 generates a random number $R_B$ (S40) and transmits the generated random number $R_B$ to the information processing apparatus 10 (S42). Here, the transmission of the generated random number $R_B$ to the information processing apparatus 10 corresponds to transmission of challenge information to the information processing apparatus 10.

The information processing apparatus 10 receiving the random number $R_B$ generates a signature σ based on a private key x in regard to information connecting the random number $R_B$ to the identifier $ID_B$ of the verifier (S44). Then, the information processing apparatus 10 transmits the generated signature σ to the information processing apparatus 20 (S46). Here, the transmission of the signature σ to the information processing apparatus 20 corresponds to transmission of response information to the information processing apparatus 20.

The information processing apparatus 20 receiving the signature σ verifies whether the received signature σ is a signature of the information connecting the random number $R_B$ to the identifier $ID_B$ of the verifier (S48).

For example, as illustrated in FIG. 3, in the process related to the existing method, the information processing apparatus serving as the prover includes the identifier $ID_B$ of the information processing apparatus serving as the verifier in the signature, so that the information processing apparatus serving as the verifier can confirm that the received information is information destined for the self-apparatus. Accordingly, for example, by using the existing method, there is a probability of, for example, illegal authentication illustrated in C of FIG. 2 being prevented.

However, for example, only an authentication scheme using a signature technology is considered in the existing method defined in "ISO\IEC 9798-3." For this reason, for example, it is difficult to apply the existing method defined in "ISO\IEC 9798-3" to methods other than, for example, the authentication schemes using the signature technologies, such as the authentication schemes using the technologies disclosed in Non-Patent Literature 1 to Non-Patent Literature 5. Accordingly, for example, even when the existing method defined in "ISO\IEC 9798-3" is used, it may not be said to prevent, for example, the illegal authentication illustrated in C of FIG. 2.

[3] Overviews of Information Processing Method and Verification Processing Method According to Embodiment Accordingly, an embodiment suggests an information processing method (a method related to a process in a prover) and a verification processing method (a method related to a process in a verifier) which can be applied not only to authentication schemes using signature technology but also to methods other than the authentication schemes using the signature technologies, such as the authentication schemes using the technologies disclosed in Non-Patent Literature 1 to Non-Patent Literature 5.

More specifically, the information processing apparatus serving as a prover according to the embodiment executes a process of including identification information in a series of processes related to authentication as a process related to the information processing method according to the embodiment. Further, a verification processing apparatus serving as a verifier according to the embodiment executes verification by including identification information on information received from the information processing apparatus according to the embodiment as a process related to the verification processing method according to the embodiment.

Here, identification information according to the embodiment is data indicating a legitimate verification processing apparatus. Examples of the identification information according to the embodiment include an ID representing a number, a name, or a nickname of the legitimate verification processing apparatus, a uniform resource locator (URL) representing the legitimate verification processing apparatus, and a media access control (MAC) address of the legitimate verification processing apparatus.

For example, the identification information according to the embodiment is shared by the information processing apparatus according to the embodiment and the verification processing apparatus (legitimate verification processing apparatus) according to the embodiment. As a method of sharing the identification information according to the embodiment, a method of the information processing apparatus according to the embodiment and the verification processing apparatus according to the embodiment sharing the identification information in advance is exemplified. The identification information according to the embodiment may be shared in such a manner that the information processing apparatus according to the embodiment transmits the identification information to the verification processing apparatus according to the embodiment in a series of processes related to authentication. Hereinafter, a process related to the information processing method according to the embodiment and a process related to the verification processing method according to the embodiment will be described mainly exemplifying a case in which the identification information according to the embodiment is shared in advance by the information processing apparatus according to the embodiment and the verification processing apparatus according to the embodiment.

As described above, the information processing apparatus according to the embodiment executes a process, including the identification information, in a series of processes related to authentication. Further, the verification processing apparatus according to the embodiment executes verification on received information including the identification information, so that the verification processing apparatus according to the embodiment can confirm whether the received information is information destined for the self-apparatus. Accordingly, by using the information processing method and the verification processing method according to the embodiment, it is possible to prevent, for example, the illegal authentication illustrated in C of FIG. 2.

Accordingly, by using the information processing method and the verification processing method according to the embodiment, it is possible to prevent another verifier from executing illegal authentication using information related to authentication with one verifier for other purposes.

[4] Examples of Process Related to Information Processing Method According to Embodiment and Process Related to Verification Processing Method According to Embodiment Next, a process (a process in a prover) related to the information processing method according to the embodiment and a process (a process in a verifier) related to the verification processing method according to the embodiment will be described more specifically.

Hereinafter, a process related to the information processing method according to the embodiment will be described exemplifying a case in which the information processing apparatus according to the embodiment executes the process (the process in the prover) related to the information processing method according to the embodiment. Further, hereinafter, a process (the process in the verifier) related to the verification processing method according to the embodiment will be described exemplifying a case in which the verification processing apparatus according to the embodiment executes the process related to the verification processing method according to the embodiment. The information processing apparatus according to the embodiment indicates an "information processing apparatus 100" or a "prover A" and the verification processing apparatus according to the embodiment indicates a "verification processing apparatus 200" or a "verifier B" in some cases below.

Hereinafter, a process (a process in the prover) related to the information processing method according to the embodiment and a process (a process in the verifier) related to the verification processing method according to the embodiment will be described exemplifying a case in which identification information "$ID_B$" of the verification processing apparatus (legitimate verification processing apparatus) according to the embodiment is shared by the verification processing apparatus according to the embodiment and the verification processing apparatus according to the embodiment.

Hereinafter, a process related to the information processing method according to the embodiment and a process related to the verification processing method according to the embodiment will be described exemplifying a case in which the information processing apparatus according to the embodiment and the verification processing apparatus according to the embodiment execute a process regarding authentication, for example, in the MQ authentication scheme of the technology disclosed in Non-Patent Literature 1. The process related to the information processing method according to the embodiment and the process related to the verification processing method according to the embodiment are not limited to the process to which, for example, the MQ authentication scheme related to the technology disclosed in Non-Patent Literature 1 is applied. For example, the process related to the information processing method according to the embodiment and the process related to the verification processing method according to the embodiment can be applied to various authentication schemes other than authentication schemes using signature technologies, such as the authentication schemes related to the technologies disclosed in Non-Patent Literature 2 to Non-Patent Literature 5. The process related to the information processing method according to the embodiment and the process related to the verification processing method according to the embodiment can also be applied to, for example, authentication schemes using signature technologies.

To facilitate the description, application examples of the process related to the information processing method according to the embodiment and the process related to the verification processing method according to the embodiment to a basic structure configuring the MQ authentication scheme will be described below. Thereafter, application examples of the process related to the information processing method according to the embodiment and the process related to the verification processing method according to the embodiment to the MQ authentication scheme will be described.

[4-1] Application Example to Basic Structure Configuring MQ Authentication Scheme

[4-1-1] Application Example to First Example of Basic Structure Configuring MQ Authentication Scheme

[4-1-1-1] First Example of Basic Structure Configuring MQ Authentication Scheme

Figure 4:
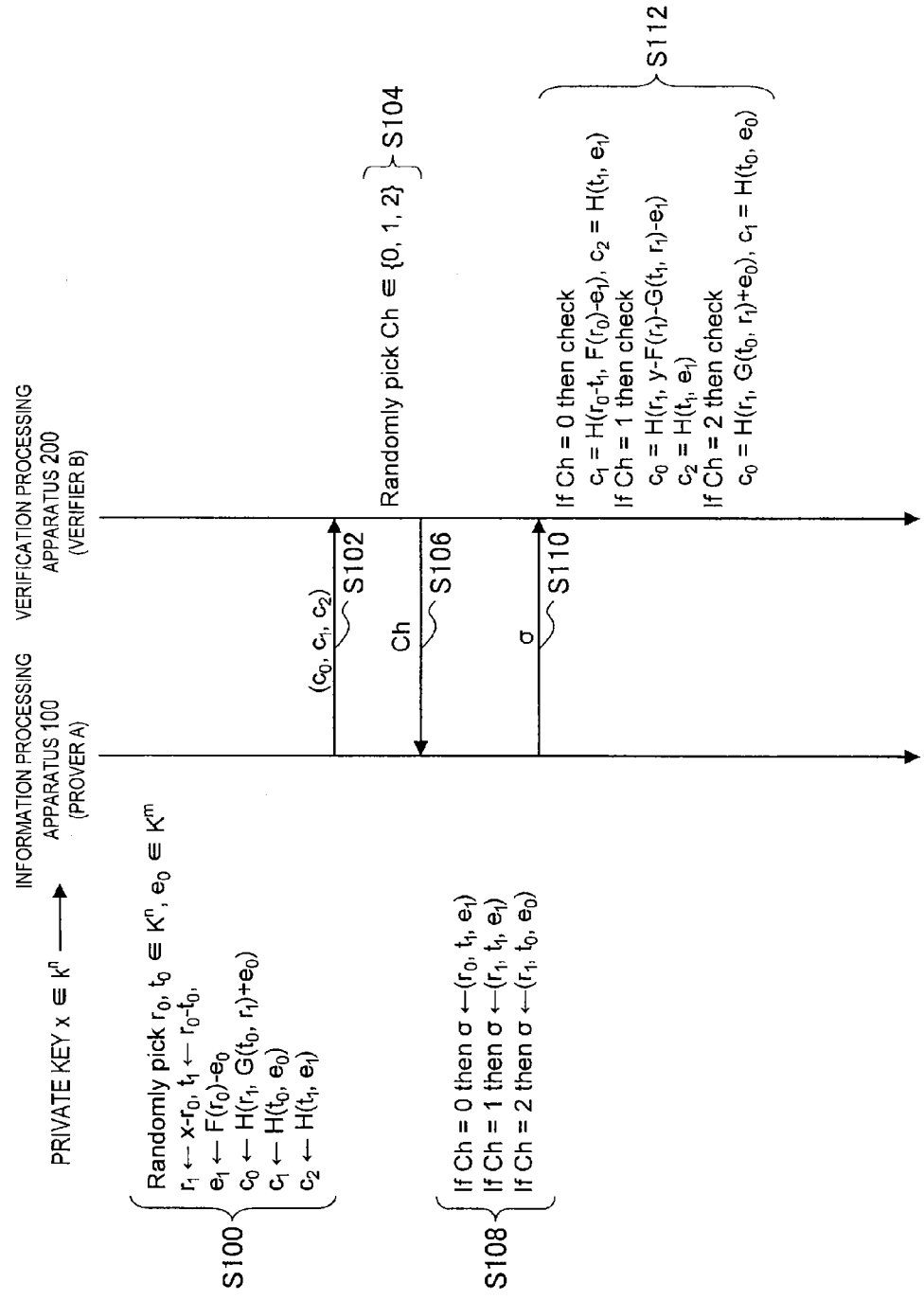
FIG. 4 is an explanatory diagram illustrating a first example of a basic structure configuring an MQ authentication scheme.

First, a first example of the basic structure configuring the MQ authentication scheme will be described. FIG. 4 is an explanatory diagram illustrating the first example of the basic structure configuring the MQ authentication scheme.

The information processing apparatus 100 generates variables to generate commitment information (for example, "$c_0$," "$c_1$," and "$c_2$" illustrated in FIG. 4) (S100) and transmits the generated commitment information to the verification processing apparatus 200 (S102).

Here, the commitment information according to the embodiment is, for example, data triggered to generate challenge information and transmit the challenge information to an apparatus serving as a verifier. Further, the commitment information according to the embodiment is data to be verified in an apparatus serving as a verifier.

When the verification processing apparatus 200 receives the commitment information transmitted in step S102 from the information processing apparatus 100, the verification processing apparatus 200 generates challenge information (S104). Then, the verification processing apparatus 200 transmits the generated challenge information to the information processing apparatus 100 (S106).

Here, the challenge information according to the embodiment is, for example, data triggered to generate response information and transmit the response information to an apparatus serving as a prover. An example of the challenge information according to the embodiment includes a random value (or a temporary value) such as a value randomly selected from "0," "1," and "2," as illustrated in step S104 of FIG. 4.

The information processing apparatus 100 receiving the challenge information transmitted in step S106 from the verification processing apparatus 200 generates response information corresponding to the value indicated by the received challenge information (S108). Then, the information processing apparatus 100 transmits the generated response information as a response to the challenge information to the verification processing apparatus 200 (S110).

Here, the response information according to the embodiment is, for example, data used for an apparatus serving as a prover to prove the self-apparatus. For example, the response information according to the embodiment is used to verify the commitment information in an apparatus serving as a verifier.

When the verification processing apparatus 200 receives the response information transmitted in step S110 from the information processing apparatus 100, the verification processing apparatus 200 verifies the information processing apparatus 100 by verifying information forming the commitment information corresponding to the transmitted challenge information based on the received response information (S112).

For example, when the challenge information transmitted in step S106 is "0," the verification processing apparatus 200 calculates values of $c_1$ and $c_2$ which are parts of the information forming the commitment information, for example, by calculating a hash value based on the received response information. The verification processing apparatus 200 compares the calculated $c_1$ to $c_1$ forming the received commitment information and compares the calculated $c_2$ to $c_2$ forming the received commitment information. Then, for example, when these values are identical to each other, the verification processing apparatus 200 authenticates the information processing apparatus 100 having transmitted the response information as the genuine information processing apparatus 100.

Figure 5:
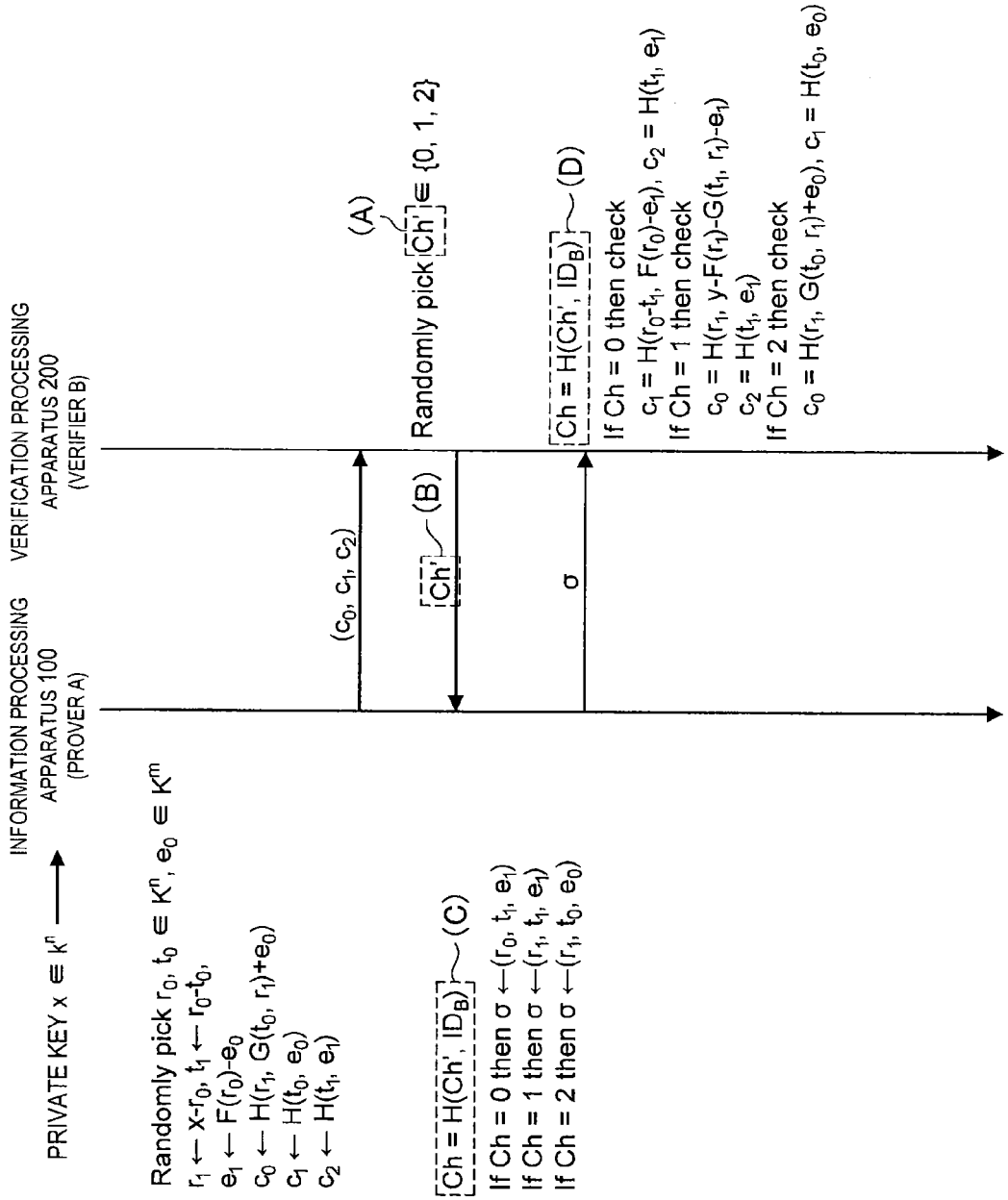
FIG. 5 is an explanatory diagram for describing a process related to an information processing method according to an embodiment and a process related to a verification processing method according to the embodiment.

[4-1-1-2] First Application Example to Basic Structure Configuring MQ Authentication Scheme According to First Example: Process of Including Identification Information in Challenge Information FIG. 5 is an explanatory diagram for describing a process related to an information processing method according to the embodiment and a process related to a verification processing method according to the embodiment. Here, FIG. 5 illustrates a first application example to the basic structure configuring the MQ authentication scheme according to the first example illustrated in FIG. 4. More specifically, FIG. 5 illustrates an example of a process of including the identification information in the challenge information in the basic structure configuring the MQ authentication scheme according to the first example illustrated in FIG. 4, and (A) to (D) of FIG. 5 illustrate differences from the process illustrated in FIG. 4. Hereinafter, the differences from the process illustrated in FIG. 4 will be described.

When the verification processing apparatus 200 receives the commitment information transmitted from the information processing apparatus 100, the verification processing apparatus 200 generates first challenge information Ch' ((A) illustrated in FIG. 5). Then, the verification processing apparatus 200 transmits the generated first challenge information Ch' to the information processing apparatus 100 ((B) illustrated in FIG. 5).

Here, the first challenge information Ch' according to the embodiment is, for example, data used for an apparatus serving as a prover to generate second challenge information Ch which is used to generate the response information, as illustrated in (C) of FIG. 5. For example, the first challenge information Ch' according to the embodiment is used to generate the second challenge information Ch used in a process related to verification by an apparatus serving as a verifier, as illustrated in (D) of FIG. 5.

As illustrated in (C) of FIG. 5 and (D) of FIG. 5, the second challenge information Ch is generated based on the first challenge information Ch' and the identification information $ID_B$. For example, the verification processing apparatus 200 transmits a part of the second challenge information Ch as the first challenge information according to the embodiment in consideration of the identification information $ID_B$. The first challenge information according to the embodiment may be, for example, data generated without consideration of the identification information $ID_B$.

The information processing apparatus 100 generates the second challenge information Ch including the identification information $ID_B$ based on the identification information $ID_B$ and the first challenge information Ch' transmitted from the verification processing apparatus 200 ((C) illustrated in FIG. 5). Then, the information processing apparatus 100 generates the response information based on the generated second challenge information Ch, as in step S108 of FIG. 4, and transmits the response information σ to the verification processing apparatus 200, as in step S110 of FIG. 4.

The verification processing apparatus 200 generates the second challenge information Ch based on the identification information $ID_B$ and the first challenge information Ch' transmitted to the information processing apparatus 100 ((D) illustrated in FIG. 5). Then, the verification processing apparatus 200 verifies the information processing apparatus 100 based on the generated second challenge information Ch and the response information σ transmitted from the information processing apparatus 100 in regard to the transmitted first challenge information Ch', as in step S112 of FIG. 4.

For example, as illustrated in FIG. 5, the information processing apparatus 100 serving as the prover generates the second challenge information Ch including the identification information $ID_B$ and transmits the response information corresponding to the generated second challenge information Ch to the verification processing apparatus 200. That is, in the process illustrated in FIG. 5, the information processing apparatus 100 executes a process of including the identification information in the series of processes related to the authentication.

For example, as illustrated in FIG. 5, the verification processing apparatus 200 serving as the verifier generates the second challenge information Ch including the identification information $ID_B$ and verifies the information processing apparatus 100 based on the generated second challenge information Ch and the response information transmitted from the information processing apparatus 100. That is, in the process illustrated in FIG. 5, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 5 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 5 as the process related to the verification processing method according to the embodiment, so that, for example, the illegal authentication illustrated in C of FIG. 2 can be prevented from being executed.

Figure 6:
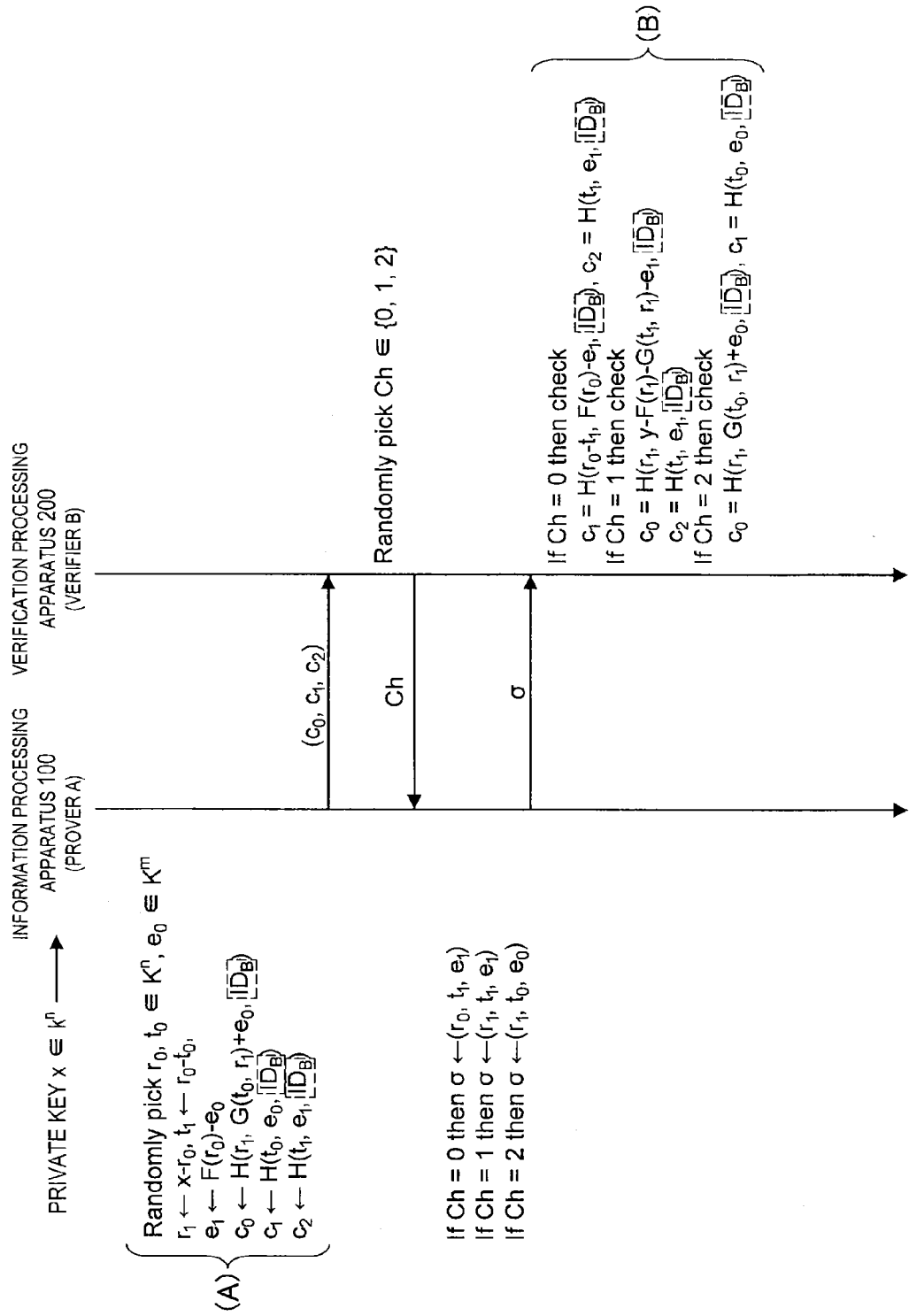
FIG. 6 is an explanatory diagram for describing a process related to the information processing method according to the embodiment and a process related to the verification processing method according to the embodiment.

[4-1-1-3] Second Application Example to Basic Structure Configuring MQ Authentication Scheme According to First Example: Process of Including Identification Information in Commitment Information FIG. 6 is an explanatory diagram for describing a process related to the information processing method according to the embodiment and a process related to the verification processing method according to the embodiment. Here, FIG. 6 illustrates a second application example to the basic structure configuring the MQ authentication scheme according to the first example illustrated in FIG. 4. More specifically, FIG. 6 illustrates an example of a process of including the identification information in the commitment information in the basic structure configuring the MQ authentication scheme according to the first example illustrated in FIG. 4, and (A) and (B) of FIG. 6 illustrate differences from the process illustrated in FIG. 4. Hereinafter, the differences from the process illustrated in FIG. 4 will be mainly described.

The information processing apparatus 100 generates the commitment information including the identification information $ID_B$ ((A) illustrated in FIG. 6). Then, the information processing apparatus 100 transmits the generated commitment information including the identification information $ID_B$ to the verification processing apparatus 200, as in step S102 of FIG. 4.

The verification processing apparatus 200 verifies the information processing apparatus 100 based on the identification information $ID_B$ and the response information $\sigma$ transmitted from the information processing apparatus 100, as in step S110 illustrated in FIG. 4 ((B) illustrated in FIG. 6). More specifically, the verification processing apparatus 200 verifies the information processing apparatus 100 by calculating a hash value based on the received response information $\sigma$ and the identification information $ID_B$ and calculating a value corresponding to the parts of the information forming the commitment information, as in step S112 illustrated in FIG. 4.

For example, as illustrated in (A) of FIG. 6, the information processing apparatus 100 serving as the prover includes the identification information $ID_B$ in all of the information ($c_0$, $c_1$, and $c_2$) forming the commitment information. That is, in the process illustrated in FIG. 6, the information processing apparatus 100 executes a process of including the identification information in the series of processes related to the authentication.

For example, as illustrated in (B) of FIG. 6, the verification processing apparatus 200 serving as the verifier verifies the information processing apparatus 100 based on the identification information $ID_B$ and the response information $\sigma$ transmitted from the information processing apparatus 100 in regard to the challenge information Ch. That is, in the process illustrated in FIG. 6, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 6 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 6 as the process related to the verification processing method according to the embodiment, so that, for example, the illegal authentication illustrated in C of FIG. 2 can be prevented from being executed.

A process of including the identification information in the commitment information is not limited to the process illustrated in FIG. 6.

Figure 7:
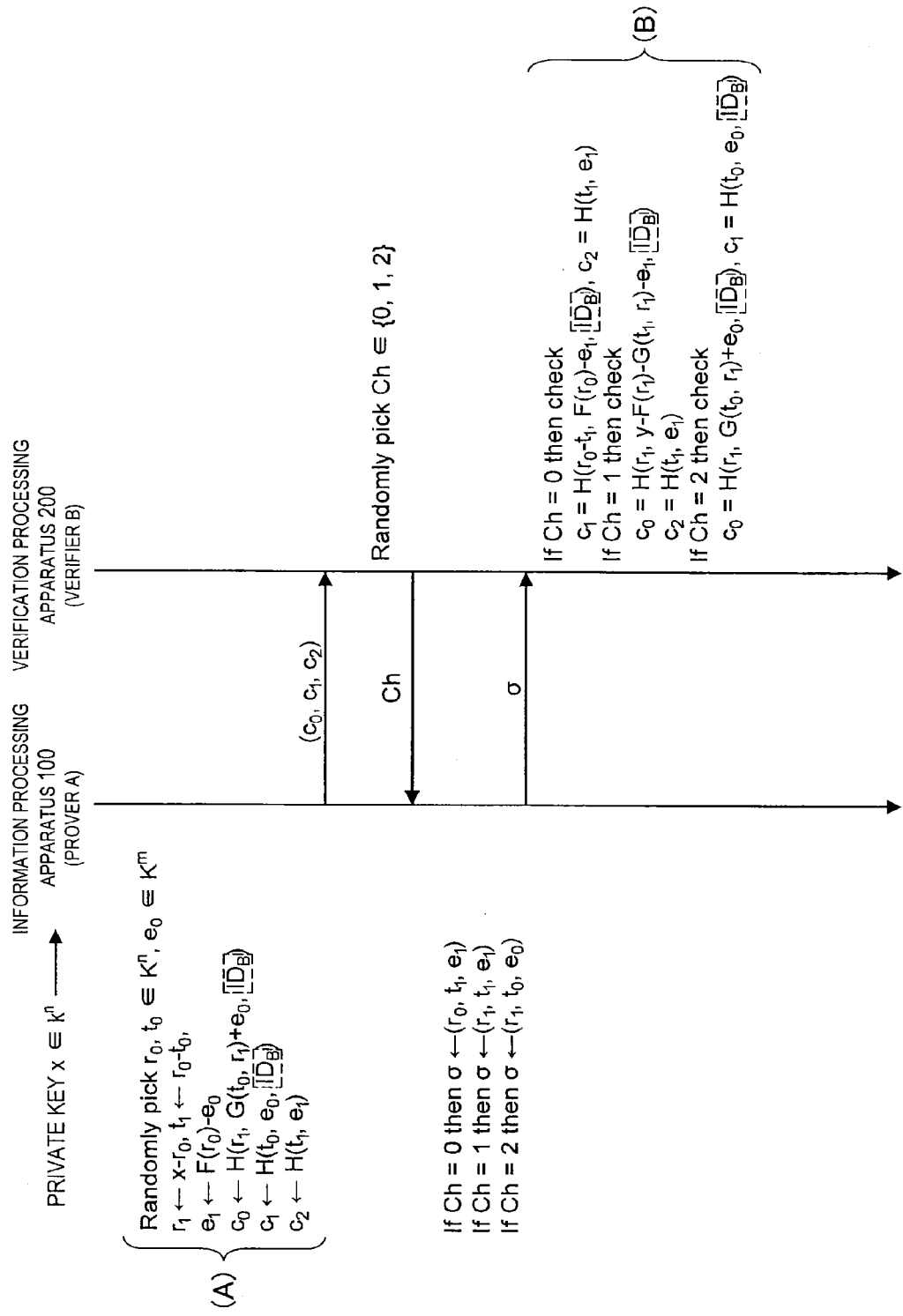
FIG. 7 is an explanatory diagram for describing a process related to the information processing method according to the embodiment and a process related to the verification processing method according to the embodiment.

FIG. 7 is an explanatory diagram for describing a process related to the information processing method according to the embodiment and a process related to the verification processing method according to the embodiment. Here, FIG. 7 illustrates a modification example of "the second application example to the basic structure configuring the MQ authentication scheme according to the first example" illustrated in FIG. 6. More specifically, FIG. 7 illustrates another example of a process of including the identification information in the commitment information in the basic structure configuring the MQ authentication scheme according to the first example illustrated in FIG. 4, and (A) and (B) of FIG. 7 illustrate differences from the process illustrated in FIG. 4. Hereinafter, the differences from the process illustrated in FIG. 4 will be mainly described.

The information processing apparatus 100 generates the commitment information including the identification information $ID_B$ ((A) illustrated in FIG. 7). Then, the information processing apparatus 100 transmits the generated commitment information including the identification information $ID_B$ to the verification processing apparatus 200, as in step S102 of FIG. 4.

Here, in the process of (A) illustrated in FIG. 6, the information processing apparatus 100 includes the identification information $ID_B$ in all of the information ($c_0$, $c_1$, and $c_2$) forming the commitment information. In the process of (A) illustrated in FIG. 7, however, the information processing apparatus 100 includes the identification information $ID_B$ in the parts ($c_0$ and $c_1$) of the information forming the commitment information. Further, the parts of the information forming the commitment information in which the information processing apparatus 100 includes the identification information $ID_B$ are not limited to ($c_0$ and $c_1$). For example, when the process related to the verification of the MQ authentication scheme is executed in the verification processing apparatus 200, as illustrated in (B) of FIG. 7, the information processing apparatus 100 can include the identification information $ID_B$ in any two or more pieces of information among all of the information forming the commitment information.

The verification processing apparatus 200 verifies the information processing apparatus 100 based on the identification information $ID_B$ and the response information $\sigma$ transmitted from the information processing apparatus 100, as in step S110 illustrated in FIG. 4 ((B) illustrated in FIG. 7).

Here, in the process of (B) illustrated in FIG. 6, the verification processing apparatus 200 normally uses the identification information $ID_B$ when the verification processing apparatus 200 calculates values corresponding to the parts of the information forming the commitment information. In the process of (B) illustrated in FIG. 7, however, the verification processing apparatus 200 uses the identification information $ID_B$ in regard to the parts of the information forming the commitment information including the identification information $ID_B$, when the verification processing apparatus 200 calculates values corresponding to the parts of the information forming the commitment information. Accordingly, the verification processing apparatus 200 executing the process of (B) illustrated in FIG. 7 can reduce a calculation amount more than when the verification processing apparatus 200 executes the process of (B) illustrated in FIG. 6.

For example, as illustrated in (A) of FIG. 7, the information processing apparatus 100 serving as the prover includes the identification information $ID_B$ in the parts (for example, $c_0$ and $c_1$) of the information forming the commitment information. That is, in the process illustrated in FIG. 7, the information processing apparatus 100 executes a process of including the identification information in the series of processes related to the authentication.

For example, as illustrated in (B) of FIG. 7, the verification processing apparatus 200 serving as the verifier verifies the information processing apparatus 100 based on the identification information $ID_B$ and the response information $\sigma$ transmitted from the information processing apparatus 100 in regard to the challenge information Ch. At this time, the verification processing apparatus 200 verifies the parts of the information forming the commitment information based on the identification information $ID_B$. That is, in the process illustrated in FIG. 7, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 7 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 7 as the process related to the verification processing method according to the embodiment, so that, for example, the illegal authentication illustrated in C of FIG. 2 can be prevented from being executed.

[4-1-2] Application Example to Second Example of Basic Structure Configuring MQ Authentication Scheme

Figure 8:
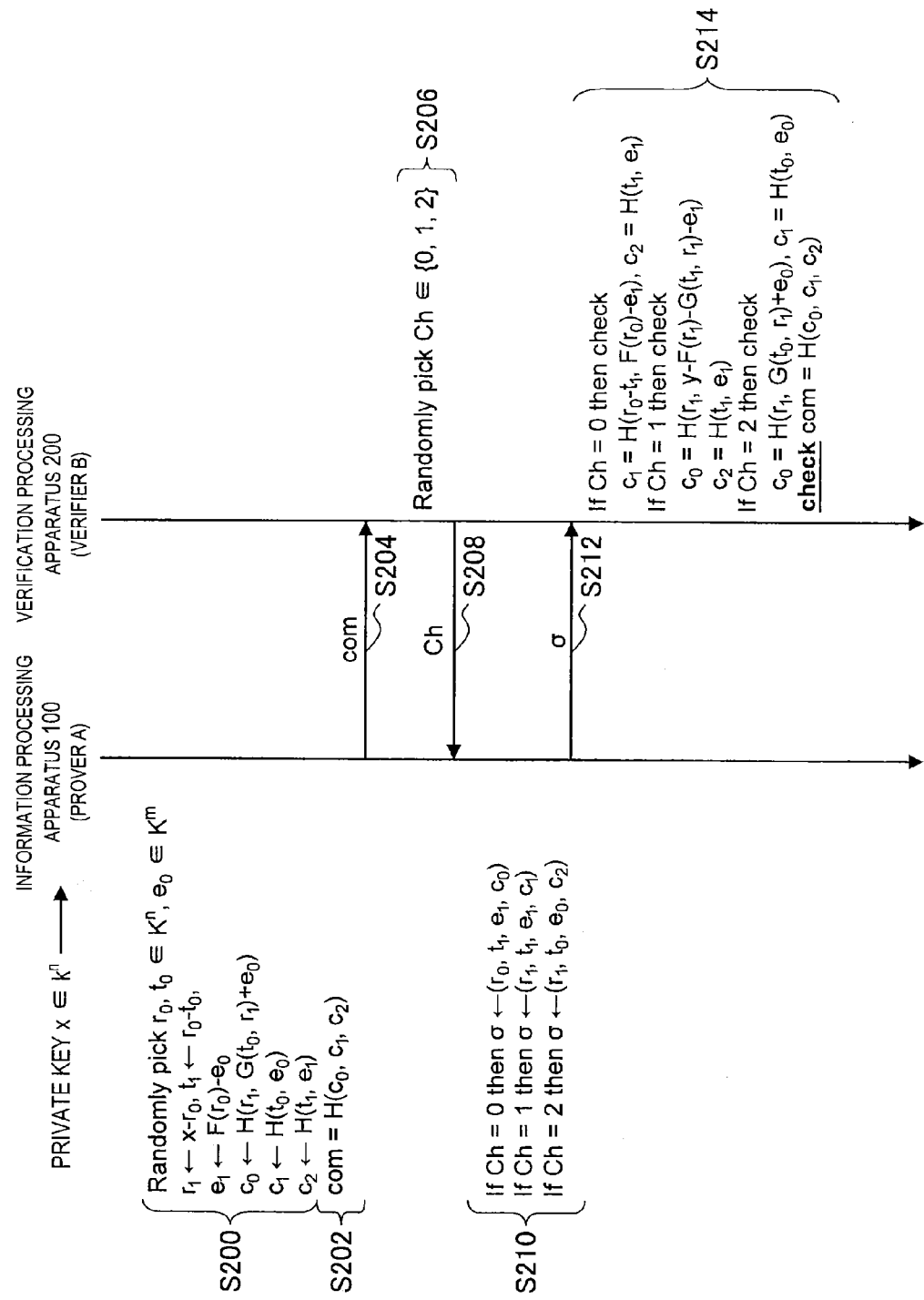
FIG. 8 is an explanatory diagram illustrating a second example of a basic structure configuring the MQ authentication scheme.

[4-1-2-1] Second Example of Basic Structure Configuring MQ Authentication Scheme Next, a second example of the basic structure configuring the MQ authentication scheme will be described. FIG. 8 is an explanatory diagram illustrating the second example of a basic structure configuring the MQ authentication scheme.

The information processing apparatus 100 generates variables to generate commitment information (for example, "$c_0$," "$c_1$," and "$c_2$" illustrated in FIG. 8), as in step S100 of FIG. 4 (S200). The information processing apparatus 100 calculates a hash corn of the generated commitment information (S202). Then, the information processing apparatus 100 transmits the hash com of the generated commitment information to the verification processing apparatus 200 (S204).

When the verification processing apparatus 200 receives the commitment information transmitted in step S204 from the information processing apparatus 100, the verification processing apparatus 200 generates challenge information, as in step S104 of FIG. 4 (S206). Then, the verification processing apparatus 200 transmits the generated challenge information to the information processing apparatus 100, as in step S106 of FIG. 4 (S208).

The information processing apparatus 100 receiving the challenge information transmitted in step S208 from the verification processing apparatus 200 generates response information corresponding to the value indicated by the received challenge information, as in step S108 of FIG. 4 (S210). Then, the information processing apparatus 100 transmits the generated response information as a response to the challenge information to the verification processing apparatus 200, as in step S110 of FIG. 4 (S212).

When the verification processing apparatus 200 receives the response information transmitted in step S212 from the information processing apparatus 100, the verification processing apparatus 200 verifies the information processing apparatus 100 based on the received response information (S214).

Here, when the commitment information received from the information processing apparatus 100 is a hash of the commitment information, the verification processing apparatus 200 verifies the hash of the commitment information based on the response information σ. More specifically, for example, the verification processing apparatus 200 calculates a hash corresponding to the hash of the commitment information based on the response information σ. When the value of the calculated hash is identical to the value of the hash of the commitment information, the verification processing apparatus 200 authenticates the information processing apparatus 100 having transmitted the response information as the genuine information processing apparatus 100.

Figure 9:
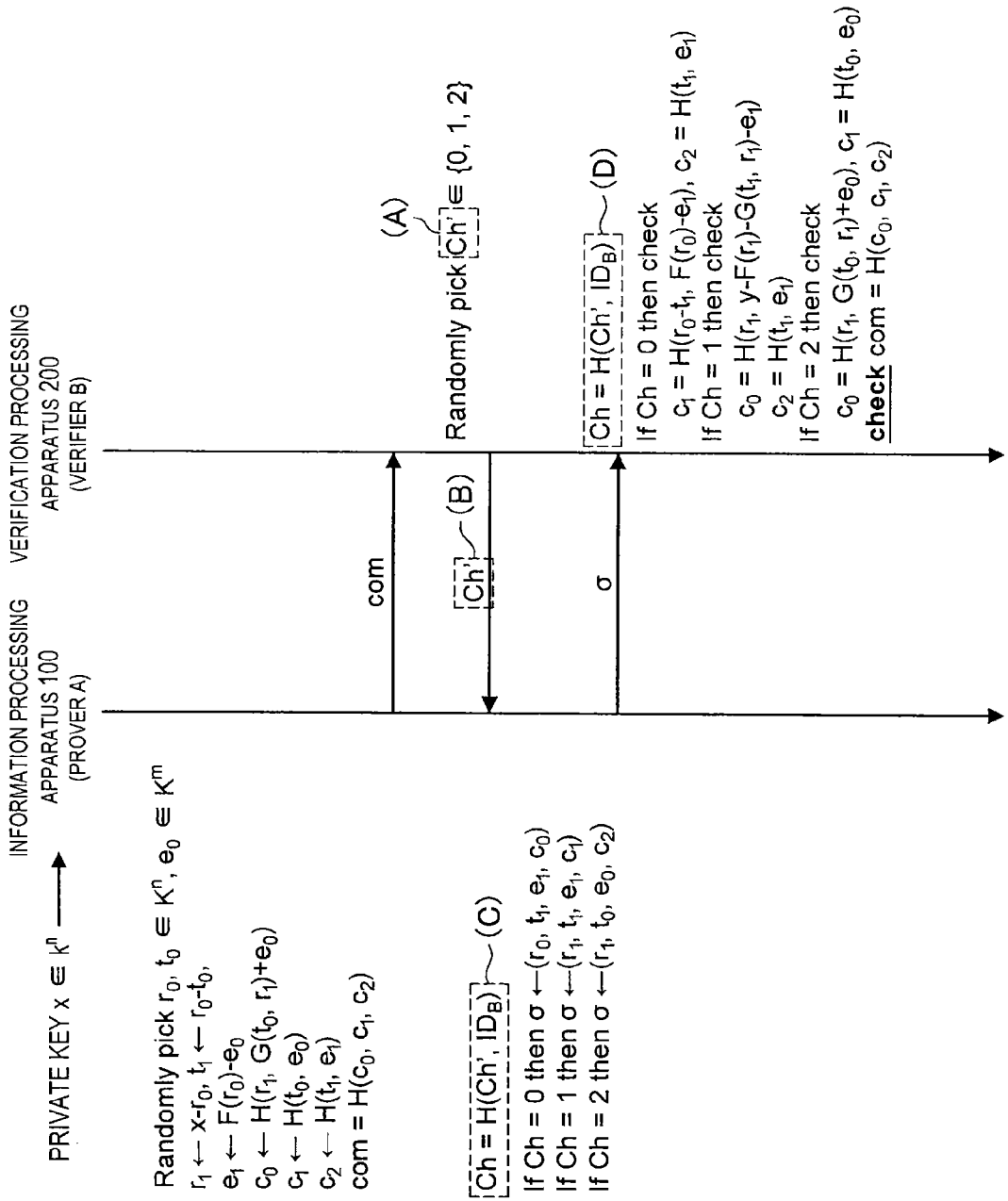
FIG. 9 is an explanatory diagram for describing a process related to the information processing method according to the embodiment and a process related to the verification processing method according to the embodiment.

[4-1-2-2] First Application Example to Basic Structure Configuring MQ Authentication Scheme According to Second Example: Process of Including Identification Information in Challenge Information FIG. 9 is an explanatory diagram for describing a process related to the information processing method according to the embodiment and a process related to the verification processing method according to the embodiment. Here, FIG. 9 illustrates a first application example to the basic structure configuring the MQ authentication scheme according to the second example illustrated in FIG. 8. More specifically, FIG. 9 illustrates an example of a process of including the identification information in the challenge information in the basic structure configuring the MQ authentication scheme according to the second example illustrated in FIG. 8, and (A) to (D) illustrated in FIG. 9 illustrate differences from the process illustrated in FIG. 8. Hereinafter, the differences from the process illustrated in FIG. 8 will be mainly described.

Based on the hash of the commitment information transmitted from the information processing apparatus 100, the verification processing apparatus 200 generates first challenge information Ch' ((A) illustrated in FIG. 9). Then, the verification processing apparatus 200 transmits the generated first challenge information Ch' to the information processing apparatus 100 ((B) illustrated in FIG. 9).

The information processing apparatus 100 generates the second challenge information Ch including the identification information $ID_B$ based on the identification information $ID_B$ and the first challenge information Ch' transmitted from the verification processing apparatus 200, as in the process of (C) illustrated in FIG. 5 ((C) illustrated in FIG. 9). Then, the information processing apparatus 100 generates the response information based on the generated second challenge information Ch, as in step S210 of FIG. 8, and transmits response information σ to the verification processing apparatus 200, as in step S212 of FIG. 8.

The verification processing apparatus 200 generates the second challenge information Ch based on the identification information $ID_B$ and the first challenge information Ch' transmitted to the information processing apparatus 100, as in the process of (D) illustrated in FIG. 5 ((D) illustrated in FIG. 9). Then, the verification processing apparatus 200 verifies the information processing apparatus 100 based on the generated second challenge information Ch and the response information σ transmitted from the information processing apparatus 100 in regard to the transmitted first challenge information Ch', as in step S214 of FIG. 8.

For example, as illustrated in FIG. 9, the information processing apparatus 100 serving as the prover generates the second challenge information Ch including the identification information $ID_B$ and transmits the response information corresponding to the generated second challenge information Ch to the verification processing apparatus 200. That is, in the process illustrated in FIG. 9, the information processing apparatus 100 executes a process of including the identification information in the series of processes related to the authentication.

For example, as illustrated in FIG. 9, the verification processing apparatus 200 serving as the verifier generates the second challenge information Ch including the identification information $ID_B$ and verifies the information processing apparatus 100 based on the generated second challenge information Ch and the response information transmitted from the information processing apparatus 100. That is, in the process illustrated in FIG. 9, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 9 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 9 as the process related to the verification processing method according to the embodiment, so that, for example, the illegal authentication illustrated in C of FIG. 2 can be prevented from being executed.

Figure 10:
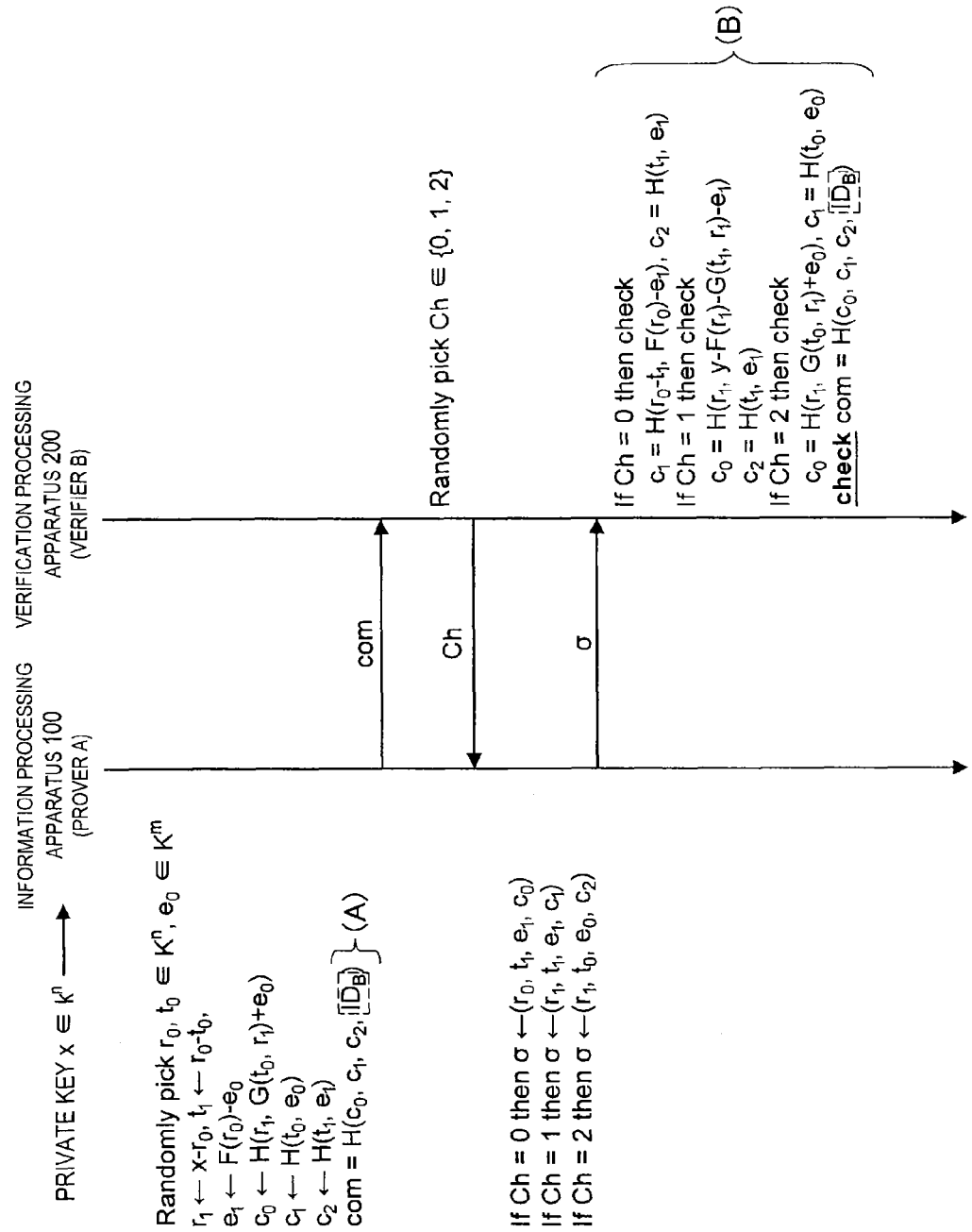
FIG. 10 is an explanatory diagram for describing a process related to the information processing method according to the embodiment and a process related to the verification processing method according to the embodiment.

[4-1-2-3] Second Application Example to Basic Structure Configuring MQ Authentication Scheme According to Second Example: Process of Including Identification Information in Commitment Information FIG. 10 is an explanatory diagram for describing a process related to the information processing method according to the embodiment and a process related to the verification processing method according to the embodiment. Here, FIG. 10 illustrates a second application example to the basic structure configuring the MQ authentication scheme according to the second example illustrated in FIG. 8. More specifically, FIG. 10 illustrates an example of a process of including the identification information in the commitment information in the basic structure configuring the MQ authentication scheme according to the second example illustrated in FIG. 8, and (A) and (B) illustrated in FIG. 10 illustrate differences from the process illustrated in FIG. 8. Hereinafter, the differences from the process illustrated in FIG. 8 will be mainly described.

The information processing apparatus 100 generates a hash corn of the commitment information including the identification information $ID_B$ ((A) illustrated in FIG. 10). Then, the information processing apparatus 100 transmits the hash corn of the generated commitment information including the identification information $ID_B$ to the verification processing apparatus 200, as in step S204 of FIG. 8.

The verification processing apparatus 200 verifies the information processing apparatus 100 based on the identification information $ID_B$ and the response information σ transmitted from the information processing apparatus 100, as in step S212 illustrated in FIG. 8 ((B) illustrated in FIG. 10). More specifically, for example, the verification processing apparatus 200 calculates a hash corresponding to the hash of the commitment information based on the received response information σ and identification information $ID_B$. For example, when the value of the calculated hash is identical to the value of the hash of the commitment information, the verification processing apparatus 200 authenticates the information processing apparatus 100 having transmitted the response information σ as the genuine information processing apparatus 100.

For example, as illustrated in (A) of FIG. 10, the information processing apparatus 100 serving as the prover includes the identification information $ID_B$ in the hash corn of the commitment information. That is, in the process illustrated in FIG. 10, the information processing apparatus 100 executes a process of including the identification information in the series of processes related to the authentication.

For example, as illustrated in (B) of FIG. 10, the verification processing apparatus 200 serving as the verifier verifies the information processing apparatus 100 by verifying the hash corn of the commitment information based on the identification information $ID_B$ and the response information σ transmitted from the information processing apparatus 100 in regard to the challenge information Ch. That is, in the process illustrated in FIG. 10, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 10 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 10 as the process related to the verification processing method according to the embodiment, so that, for example, the illegal authentication illustrated in C of FIG. 2 can be prevented from being executed.

[4-2] Application Example to MQ Authentication Scheme

Next, application examples to the MQ authentication scheme in which the application examples are applied to the basic structure configuring the MQ authentication scheme described above will be described.

[4-2-1] Application Example to MQ Authentication Scheme (3-Pass and Parallelization) to which Basic Structure According to First Example is Applied

[4-2-1-1] MQ Authentication Scheme to which Basic Structure According to First Example is Applied: 3-Pass and Parallelization An MQ authentication scheme (3-pass and parallelization) to which the basic structure according to the first example is applied will be first described before description of the application examples to the MQ authentication scheme (3-pass and parallelization) to which the basic structure according to the first example is applied.

Figure 11:
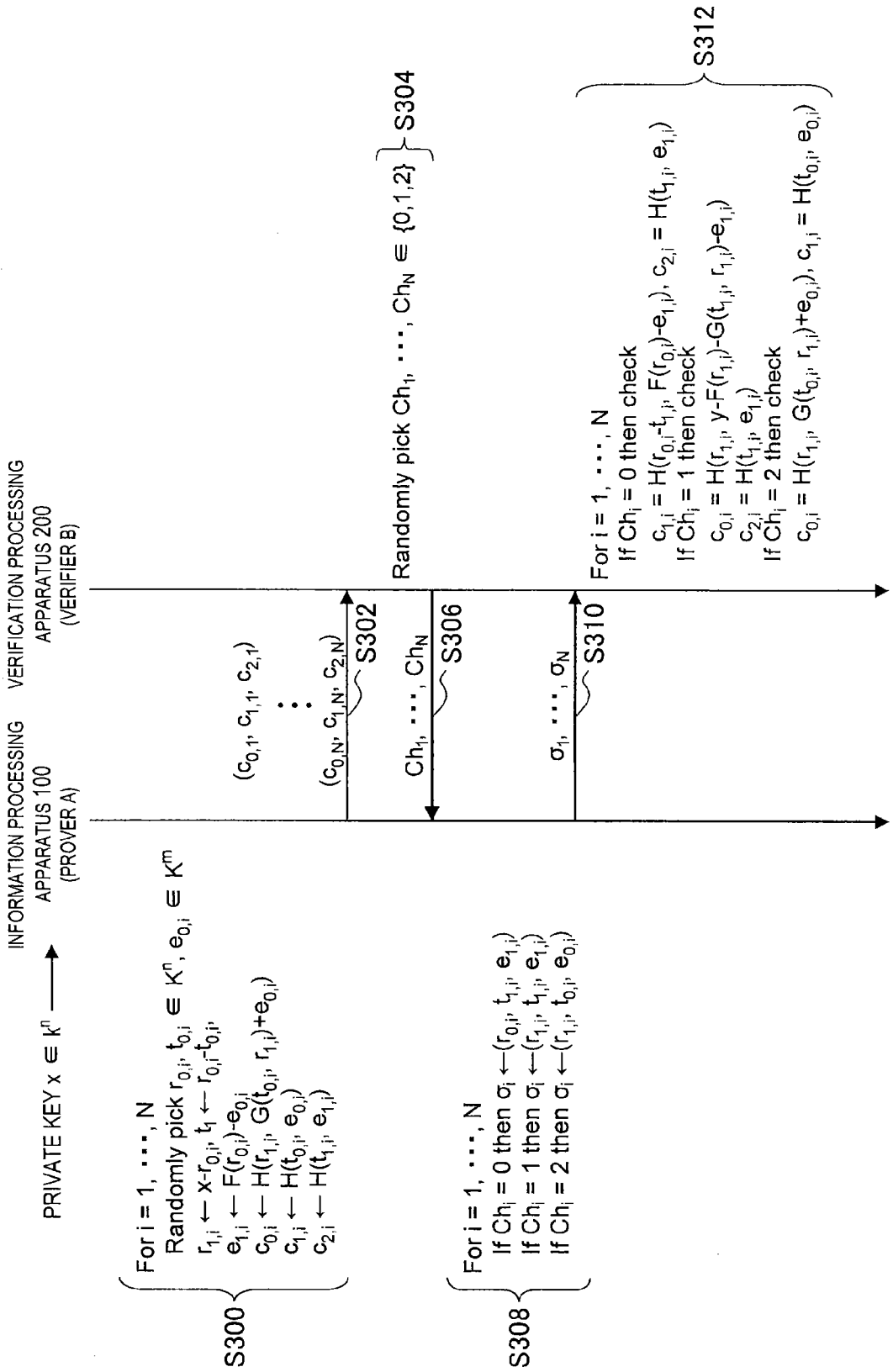
FIG. 11 is an explanatory diagram for describing an MQ authentication scheme (3-pass and parallelization) to which the basic structure according to the first example is applied.

FIG. 11 is an explanatory diagram for describing the MQ authentication scheme (3-pass and parallelization) to which the basic structure according to the first example is applied. Here, a process illustrated in FIG. 11 corresponds to a process of parallelizing the plurality of basic structures configuring the MQ authentication scheme according to the first example illustrated in FIG. 4.

The information processing apparatus 100 repeats the same process as step S100 of FIG. 4 N times (where N is a positive integer) to generate N pieces of commitment information (for example, "$c_{0,N}$," "$c_{1,N}$," "$c_{2,N}$" illustrated in FIG. 11) (S300). Then, the information processing apparatus 100 transmits the generated commitment information to the verification processing apparatus 200 (S302).

When the verification processing apparatus 200 receives the commitment information transmitted in step S302 from the information processing apparatus 100, the verification processing apparatus 200 repeats the same process as step S104 of FIG. 4 N times to generate N pieces of challenge information (S304). Then, the verification processing apparatus 200 transmits the generated challenge information to the information processing apparatus 100 (S306).

The information processing apparatus 100 receiving the challenge information transmitted in step S306 from the verification processing apparatus 200 generates response information corresponding to values indicated by the received challenge information, as in step S108 of FIG. 4 (S308). Then, the information processing apparatus 100 transmits the generated response information as a response to the challenge information to the verification processing apparatus 200, as in step S110 of FIG. 4 (S310).

When the verification processing apparatus 200 receives the response information transmitted in step S310 from the information processing apparatus 100, the verification processing apparatus 200 repeats the same process as step S112 of FIG. 4 N times and verifies the information processing apparatus 100 based on the verification results of the N processes (S312). For example, when values calculated in all of the N processes are identical to values included in the commitment information, the verification processing apparatus 200 authenticates the information processing apparatus 100 having transmitted the response information as the genuine information processing apparatus 100.

Figure 12:
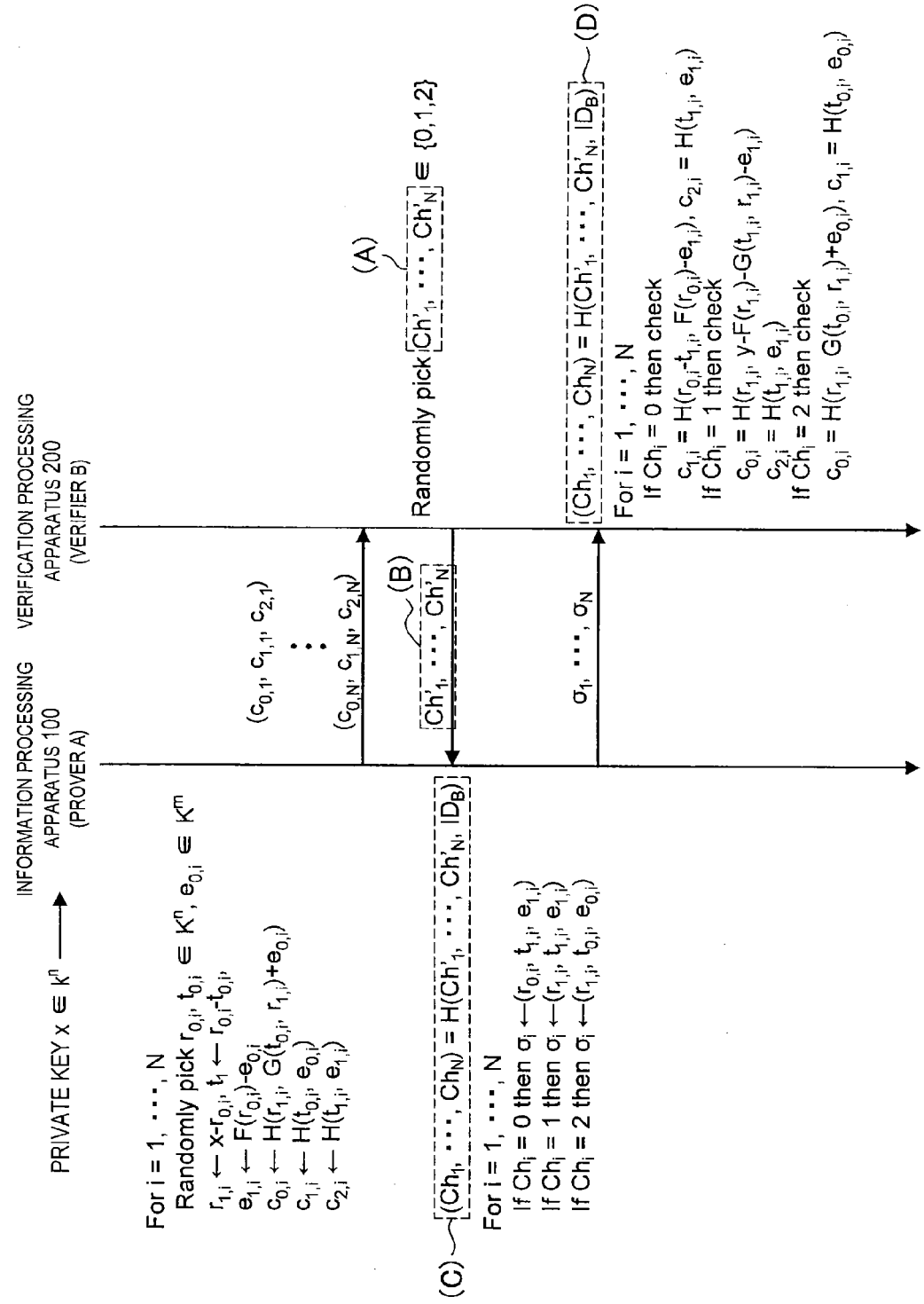
FIG. 12 is an explanatory diagram for describing a process related to the information processing method according to the embodiment and a process related to the verification processing method according to the embodiment.

[4-2-1-2] First Application Example to MQ Authentication Scheme (3-Pass and Parallelization) to which Basic Structure According to First Example is Applied: Process of Including Identification Information in Challenge Information FIG. 12 is an explanatory diagram for describing a process related to the information processing method according to the embodiment and a process related to the verification processing method according to the embodiment. Here, FIG. 12 illustrates the first application example to the MQ authentication scheme (3-pass and parallelization) to which the basic structure according to the first example illustrated in FIG. 11 is applied. More specifically, FIG. 12 illustrates an example of a process (a process of including the identification information in the challenge information) of applying "the first application example to the basic structure configuring the MQ authentication scheme according to the first example" illustrated in FIG. 5 in the MQ authentication scheme (3-pass and the parallelization) to which the basic structure according to the first example illustrated in FIG. 11 is applied. (A) to (D) illustrated in FIG. 12 illustrate differences from the process illustrated in FIG. 11. Hereinafter, the differences from the process illustrated in FIG. 11 will be mainly described.

The verification processing apparatus 200 repeats the process illustrated in (A) of FIG. 5 N times and generates the first challenge information Ch' when the verification processing apparatus 200 receives the commitment information transmitted from the information processing apparatus 100 ((A) of FIG. 12). Then, the verification processing apparatus 200 transmits the generated first challenge information Ch' to the information processing apparatus 100 ((B) illustrated in FIG. 12).

The information processing apparatus 100 generates the second challenge information Ch including the identification information $ID_B$ based on the identification information $ID_B$ and the first challenge information Ch' transmitted from the verification processing apparatus 200 ((C) illustrated in FIG. 12). Then, the information processing apparatus 100 generates the response information based on the generated second challenge information Ch, as in step S308 of FIG. 11, and transmits the response information σ to the verification processing apparatus 200, as in step S310 of FIG. 3.

The verification processing apparatus 200 generates the second challenge information Ch based on the identification information $ID_B$ and the first challenge information Ch' transmitted to the information processing apparatus 100 ((D) illustrated in FIG. 12). Then, the verification processing apparatus 200 verifies the information processing apparatus 100 based on the generated second challenge information Ch and the response information σ transmitted from the information processing apparatus 100 in regard to the transmitted first challenge information Ch', as in step S312 of FIG. 11.

For example, as illustrated in FIG. 12, the information processing apparatus 100 serving as the prover generates the second challenge information Ch including the identification information $ID_B$ and transmits the response information corresponding to the generated second challenge information Ch to the verification processing apparatus 200. That is, in the process illustrated in FIG. 12, the information processing apparatus 100 executes a process of including the identification information in the series of processes related to the authentication.

For example, as illustrated in FIG. 12, the verification processing apparatus 200 serving as the verifier generates the second challenge information Ch including the identification information $ID_B$ and verifies the information processing apparatus 100 based on the generated second challenge information Ch and the response information transmitted from the information processing apparatus 100. That is, in the process illustrated in FIG. 12, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 12 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 12 as the process related to the verification processing method according to the embodiment, so that, for example, the illegal authentication illustrated in C of FIG. 2 can be prevented from being executed.

Figure 13:
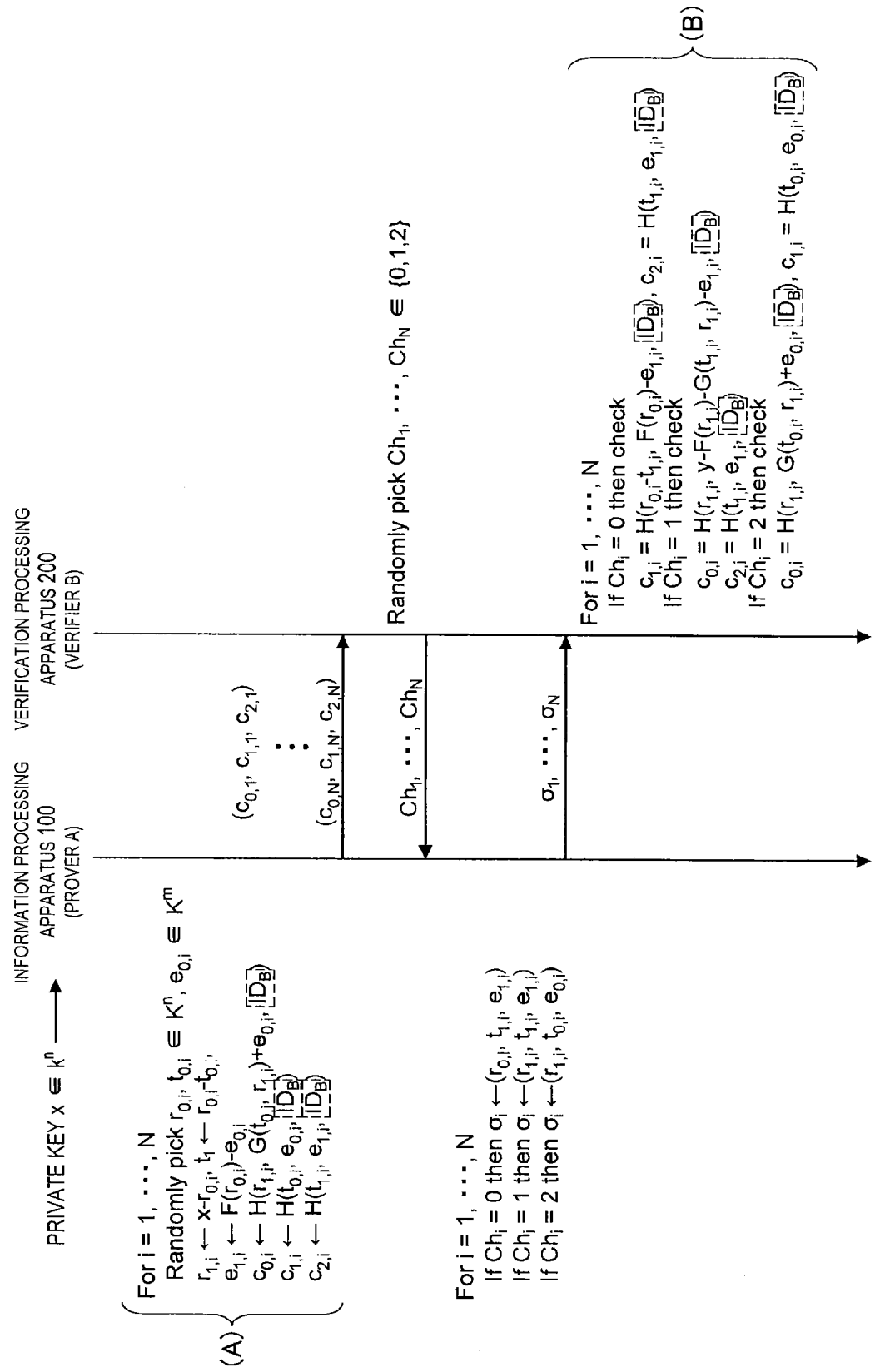
FIG. 13 is an explanatory diagram for describing a process related to the information processing method according to the embodiment and a process related to the verification processing method according to the embodiment.

[4-2-1-3] Second Application Example to MQ Authentication Scheme (3-Pass and Parallelization) to which Basic Structure According to First Example is Applied: Process of Including Identification Information in Commitment Information FIG. 13 is an explanatory diagram for describing a process related to the information processing method according to the embodiment and a process related to the verification processing method according to the embodiment. Here, FIG. 13 illustrates the second application example to the MQ authentication scheme (3-pass and parallelization) to which the basic structure according to the first example illustrated in FIG. 11 is applied. More specifically, FIG. 13 illustrates an example of a process (a process of including the identification information in the commitment information) of applying "the second application example to the basic structure configuring the MQ authentication scheme according to the first example" illustrated in FIG. 6 in the MQ authentication scheme (3-pass and the parallelization) to which the basic structure according to the first example illustrated in FIG. 11 is applied. (A) and (B) illustrated in FIG. 13 illustrate differences from the process illustrated in FIG. 11. Hereinafter, the differences from the process illustrated in FIG. 11 will be mainly described.

The information processing apparatus 100 repeats the same process as the process illustrated in (A) of FIG. 6 N times and generates the commitment information including the identification information $ID_B$ ((A) illustrated in FIG. 13). Then, the information processing apparatus 100 transmits the generated commitment information including the identification information $ID_B$ to the verification processing apparatus 200 as in step S302 of FIG. 11.

The verification processing apparatus 200 repeats the same process as the process of (B) illustrated in FIG. 6 N times and verifies the information processing apparatus 100 based on the identification information $ID_B$ and the response information σ transmitted from the information processing apparatus 100, as in step S310 illustrated in FIG. 11 ((B) illustrated in FIG. 13).

For example, as illustrated in (A) of FIG. 13, the information processing apparatus 100 serving as the prover includes the identification information $ID_B$ in all of the information ($c_{0,N}$, $c_{1,N}$, and $c_{2,N}$) forming the commitment information. That is, in the process illustrated in FIG. 13, the information processing apparatus 100 executes a process of including the identification information in the series of processes related to the authentication.

For example, as illustrated in (B) of FIG. 13, the verification processing apparatus 200 serving as the verifier verifies the information processing apparatus 100 based on the identification information $ID_B$ and the response information σ transmitted from the information processing apparatus 100 in regard to the challenge information Ch. That is, in the process illustrated in FIG. 13, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 13 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 13 as the process related to the verification processing method according to the embodiment, so that, for example, the illegal authentication illustrated in C of FIG. 2 can be prevented from being executed.

A process of including the identification information in the commitment information is not limited to the process illustrated in FIG. 13.

Figure 14:
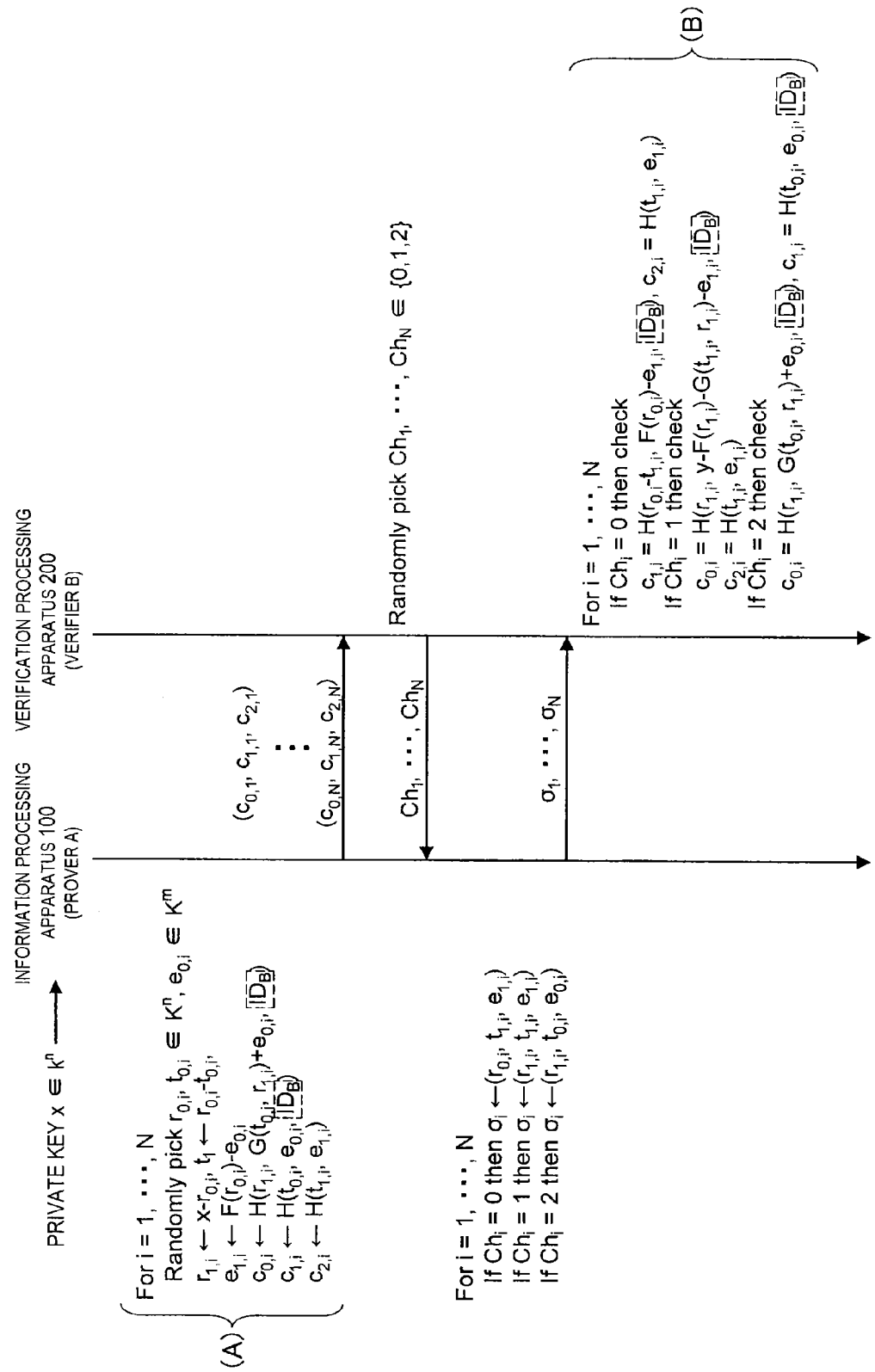
FIG. 14 is an explanatory diagram for describing a process related to the information processing method according to the embodiment and a process related to the verification processing method according to the embodiment.

FIG. 14 is an explanatory diagram for describing a process related to the information processing method according to the embodiment and a process related to the verification processing method according to the embodiment. Here, FIG. 14 illustrates a modification example of "the second application example to the MQ authentication scheme (3-pass and parallelization) according to the first example" illustrated in FIG. 13. More specifically, FIG. 14 illustrates a process (a process of including the identification information in the commitment information) of applying "another example of the second application example to the basic structure configuring the MQ authentication scheme according to the first example" illustrated in FIG. 7 in the MQ authentication scheme (3-pass and parallelization) according to the first example illustrated in FIG. 11. (A) and (B) illustrated in FIG. 14 illustrate differences from the process illustrated in FIG. 11. Hereinafter, the differences from the process illustrated in FIG. 11 will be mainly described.

The information processing apparatus 100 repeats the same process as the process of (A) illustrated in FIG. 7 N times and generates the commitment information including the identification information $ID_B$ ((A) illustrated in FIG. 14). Then, the information processing apparatus 100 transmits the generated commitment information including the identification information $ID_B$ to the verification processing apparatus 200, as in step S302 of FIG. 11.

The verification processing apparatus 200 repeats the same process as the process of (B) illustrated in FIG. 7 N times and verifies the information processing apparatus 100 based on the identification information $ID_B$ and the response information σ transmitted from the information processing apparatus 100, as in step S310 illustrated in FIG. 11 ((B) illustrated in FIG. 14).

For example, as illustrated in (A) of FIG. 14, the information processing apparatus 100 serving as the prover includes the identification information $ID_B$ in the parts (for example, $c_0$ and $c_1$) of the information forming the commitment information. That is, in the process illustrated in FIG. 14, the information processing apparatus 100 executes a process of including the identification information in the series of processes related to the authentication.

For example, as illustrated in (B) of FIG. 14, the verification processing apparatus 200 serving as the verifier verifies the information processing apparatus 100 based on the identification information $ID_B$ and the response information σ transmitted from the information processing apparatus 100 in regard to the challenge information Ch. At this time, the verification processing apparatus 200 verifies the parts of the information forming the commitment information based on the identification information $ID_B$. That is, in the process illustrated in FIG. 14, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 14 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 14 as the process related to the verification processing method according to the embodiment, so that, for example, the illegal authentication illustrated in C of FIG. 2 can be prevented from being executed.

[4-2-2] Application Example to MQ Authentication Scheme (3-Pass and Parallelization) to which Basic Structure According to Second Example is Applied
[4-2-2-1] MQ Authentication Scheme to which Basic Structure According to Second Example is Applied: 3-Pass and Parallelization An MQ authentication scheme (3-pass and parallelization) to which the basic structure according to the second example is applied will be first described before description of the application examples to the MQ authentication scheme (3-pass and parallelization) to which the basic structure according to the second example is applied.

Figure 15:
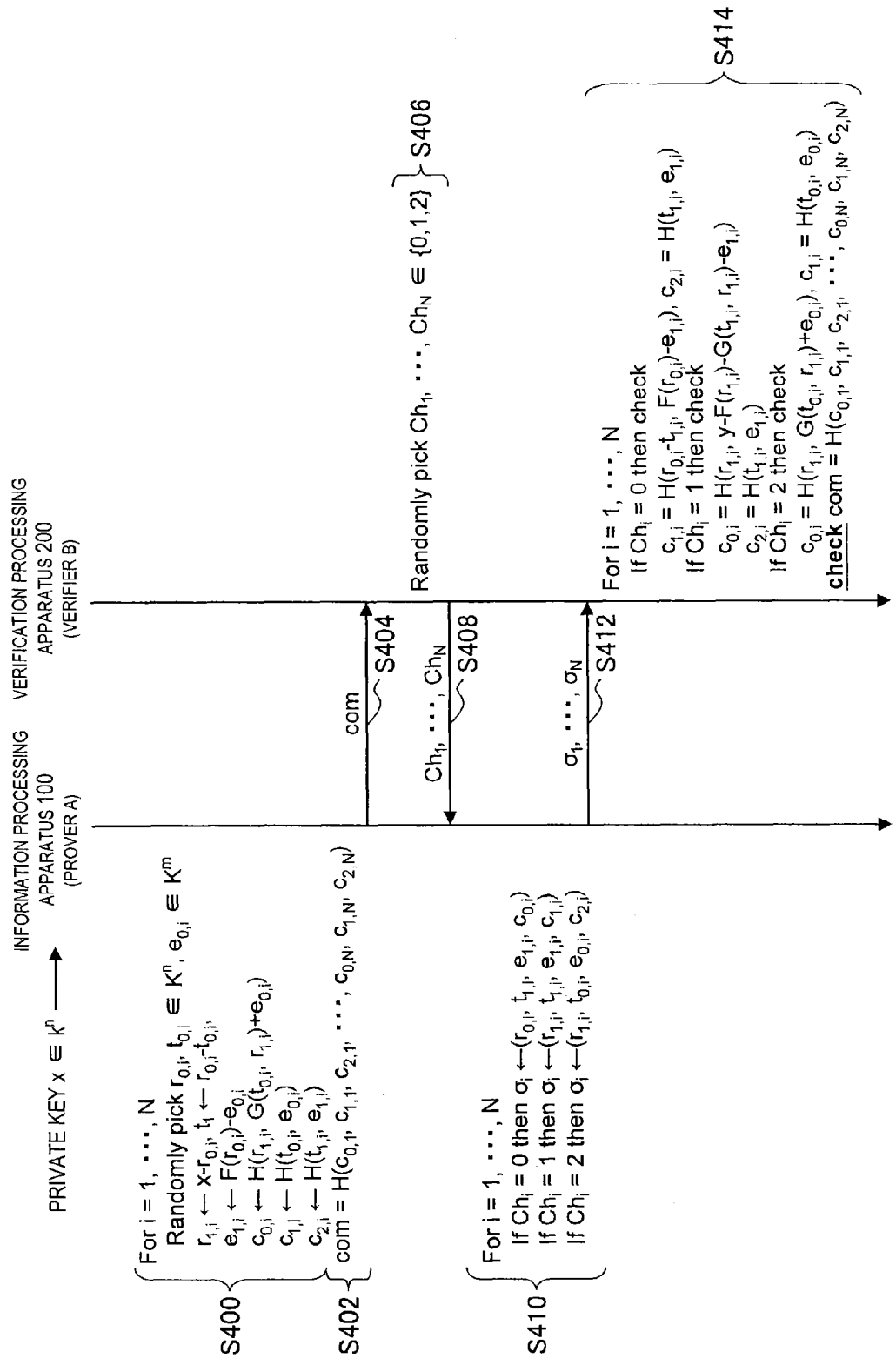
FIG. 15 is an explanatory diagram for describing an MQ authentication scheme (3-pass and parallelization) to which the basic structure according to the second example is applied.

FIG. 15 is an explanatory diagram for describing the MQ authentication scheme (3-pass and parallelization) to which the basic structure according to the second example is applied. Here, a process illustrated in FIG. 15 corresponds to a process of parallelizing the plurality of basic structures configuring the MQ authentication scheme according to the second example illustrated in FIG. 8.

The information processing apparatus 100 repeats the same process as step S100 of FIG. 4 N times, as in step S300 of FIG. 11 to generate N pieces of commitment information (for example, "$c_{0,N}$," "$c_{1,N}$," "$c_{2,N}$" illustrated in FIG. 15) (S400). The information processing apparatus 100 calculates a hash corn of the generated commitment information (S402). Then, the information processing apparatus 100 transmits the hash corn of the generated commitment information to the verification processing apparatus 200 (S404).

Here, for example, as illustrated in step S404 of FIG. 15, the information processing apparatus 100 can further reduce a communication amount related to the transmission of the commitment information by transmitting the hash corn of the generated commitment information to the verification processing apparatus 200.

When the verification processing apparatus 200 receives the commitment information transmitted in step S404 from the information processing apparatus 100, the verification processing apparatus 200 repeats the same process as step S206 of FIG. 8 N times to generate N pieces of challenge information (S406). Then, the verification processing apparatus 200 transmits the generated challenge information to the information processing apparatus 100, as in step S208 of FIG. 8 (S408).

The information processing apparatus 100 receiving the challenge information transmitted in step S408 from the verification processing apparatus 200 repeats the same process as the process of step S210 of FIG. 8 N times to generate response information $\sigma_1, \ldots, \sigma_N$ corresponding to values indicated by the received challenge information (S410). Then, the information processing apparatus 100 transmits the generated response information as responses to the challenge information to the verification processing apparatus 200, as in step S212 of FIG. 8 (S412).

When the verification processing apparatus 200 receives the response information transmitted in step S412 from the information processing apparatus 100, the verification processing apparatus 200 verifies the information processing apparatus 100, for example, by verifying the hash of the commitment information based on the response information σ, as in step S214 of FIG. 8 (S414).

Figure 16:
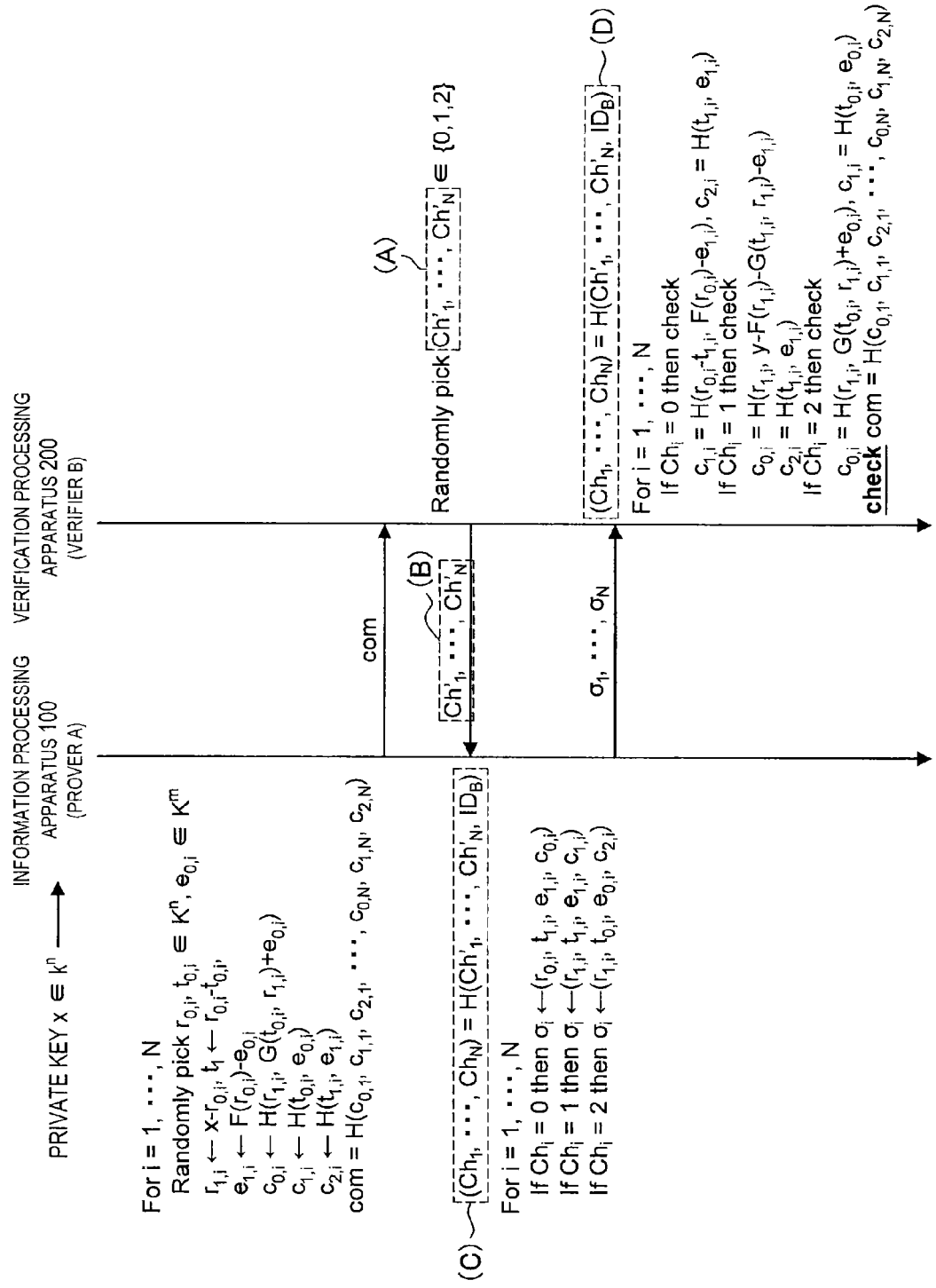
FIG. 16 is an explanatory diagram for describing a process related to the information processing method according to the embodiment and a process related to the verification processing method according to the embodiment.

[4-2-2-2] First Application Example to MQ Authentication Scheme (3-Pass and Parallelization) to which Basic Structure According to Second Example is Applied: Process of Including Identification Information in Challenge Information FIG. 16 is an explanatory diagram for describing a process related to the information processing method according to the embodiment and a process related to the verification processing method according to the embodiment. Here, FIG. 16 illustrates the first application example to the MQ authentication scheme (3-pass and parallelization) to which the basic structure according to the second example illustrated in FIG. 15 is applied. More specifically, FIG. 16 illustrates an example of a process (a process of including the identification information in the challenge information) of applying "the first application example to the basic structure configuring the MQ authentication scheme according to the second example" illustrated in FIG. 9 in the MQ authentication scheme (3-pass and the parallelization) to which the basic structure according to the second example illustrated in FIG. 15 is applied. (A) to (D) illustrated in FIG. 16 illustrate differences from the process illustrated in FIG. 15. Hereinafter, the differences from the process illustrated in FIG. 15 will be mainly described.

When the verification processing apparatus 200 receives the hash of the commitment information transmitted from the information processing apparatus 100, the verification processing apparatus 200 repeats the process illustrated in (A) of FIG. 9 N times and generates the first challenge information Ch' ((A) of FIG. 16). Then, the verification processing apparatus 200 transmits the generated first challenge information Ch' to the information processing apparatus 100 ((B) illustrated in FIG. 16).

The information processing apparatus 100 generates the second challenge information Ch including the identification information $ID_B$ based on the identification information $ID_B$ and the first challenge information Ch' transmitted from the verification processing apparatus 200, as in the process of (C) illustrated in FIG. 12 ((C) illustrated in FIG. 16). Then, the information processing apparatus 100 generates the response information based on the generated second challenge information Ch, as in step S410 of FIG. 15, and transmits the response information $\sigma_1, \ldots, \sigma_N$ to the verification processing apparatus 200, as in step S412 of FIG. 15.

The verification processing apparatus 200 generates the second challenge information Ch based on the identification information $ID_B$ and the first challenge information Ch' transmitted to the information processing apparatus 100, as in the process of (D) illustrated in FIG. 12 ((D) illustrated in FIG. 16). Then, the verification processing apparatus 200 verifies the information processing apparatus 100 based on the generated second challenge information Ch and the response information σ transmitted from the information processing apparatus 100 in regard to the transmitted first challenge information Ch', as in step S414 of FIG. 15.

For example, as illustrated in FIG. 16, the information processing apparatus 100 serving as the prover generates the second challenge information Ch including the identification information $ID_B$ and transmits the response information corresponding to the generated second challenge information Ch to the verification processing apparatus 200. That is, in the process illustrated in FIG. 16, the information processing apparatus 100 executes a process of including the identification information in the series of processes related to the authentication.

For example, as illustrated in FIG. 16, the verification processing apparatus 200 serving as the verifier generates the second challenge information Ch including the identification information $ID_B$ and verifies the information processing apparatus 100 based on the generated second challenge information Ch and the response information transmitted from the information processing apparatus 100. That is, in the process illustrated in FIG. 16, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 16 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 16 as the process related to the verification processing method according to the embodiment, so that, for example, the illegal authentication illustrated in C of FIG. 2 can be prevented from being executed.

Figure 17:
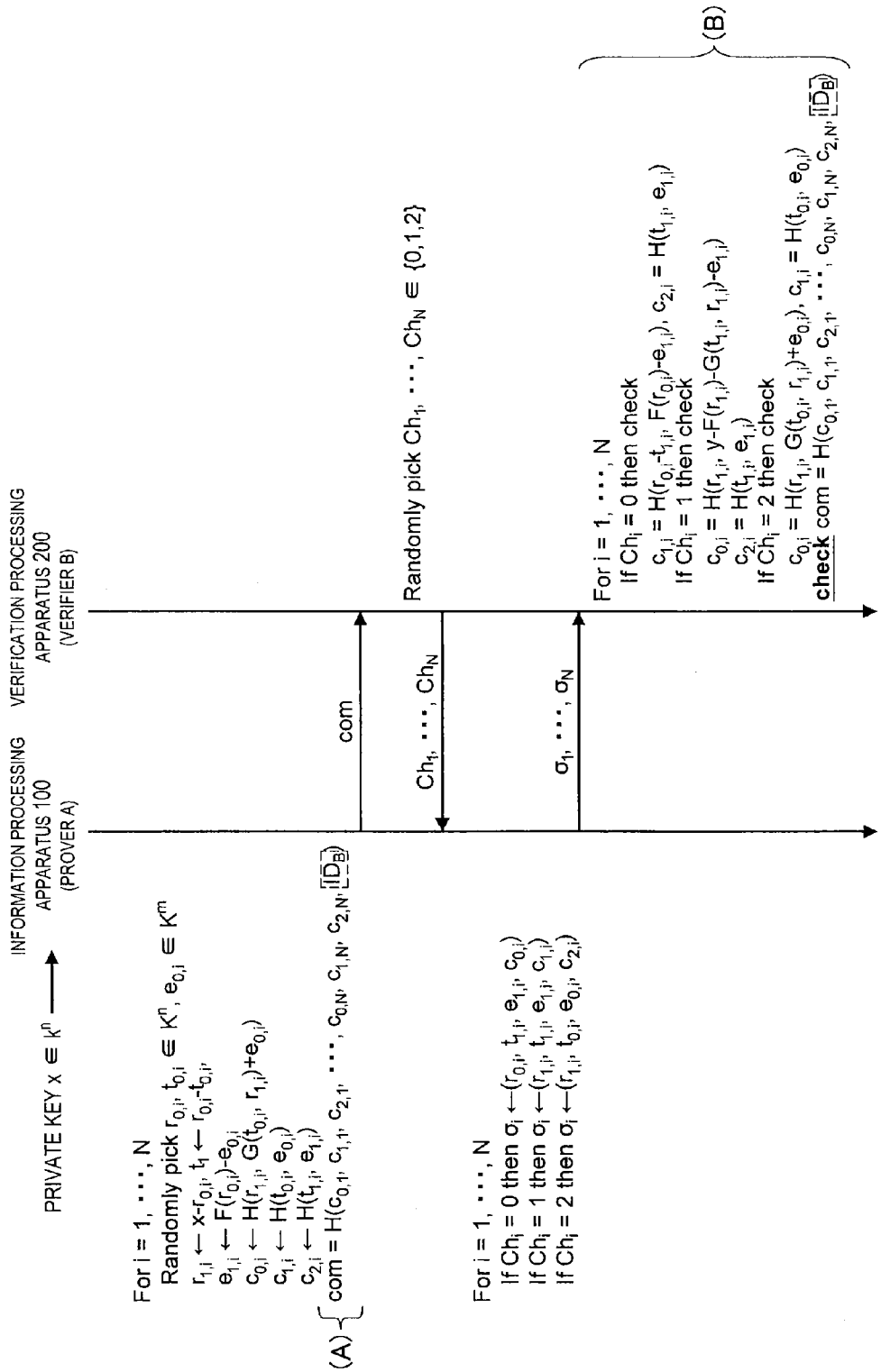
FIG. 17 is an explanatory diagram for describing a process related to the information processing method according to the embodiment and a process related to the verification processing method according to the embodiment.

[4-2-2-3] Second Application Example to MQ Authentication Scheme (3-Pass and Parallelization) to which Basic Structure According to Second Example is Applied: Process of Including Identification Information in Commitment Information FIG. 17 is an explanatory diagram for describing a process related to the information processing method according to the embodiment and a process related to the verification processing method according to the embodiment. Here, FIG. 17 illustrates the second application example to the MQ authentication scheme (3-pass and parallelization) to which the basic structure according to the second example illustrated in FIG. 15 is applied. More specifically, FIG. 17 illustrates an example of a process (a process of including the identification information in the commitment information) of applying "the second application example to the basic structure configuring the MQ authentication scheme according to the second example" illustrated in FIG. 10 in the MQ authentication scheme (3-pass and the parallelization) to which the basic structure according to the second example illustrated in FIG. 15 is applied. (A) and (B) illustrated in FIG. 17 illustrate differences from the process illustrated in FIG. 15. Hereinafter, the differences from the process illustrated in FIG. 15 will be mainly described.

The information processing apparatus 100 generates a hash corn of the commitment information including the identification information $ID_B$ ((A) illustrated in FIG. 17). Then, the information processing apparatus 100 transmits the generated hash com of the commitment information including the identification information $ID_B$ to the verification processing apparatus 200 as in step S404 of FIG. 15.

The verification processing apparatus 200 verifies the information processing apparatus 100 based on the identification information $ID_B$ and the response information σ transmitted from the information processing apparatus 100 by verifying the hash of the commitment information based on the response information σ, as in step S412 illustrated in FIG. 15 ((B) illustrated in FIG. 17).

For example, as illustrated in (A) of FIG. 17, the information processing apparatus 100 serving as the prover includes the identification information $ID_B$ in the hash com of the commitment information. That is, in the process illustrated in FIG. 17, the information processing apparatus 100 executes a process of including the identification information in the series of processes related to the authentication.

For example, as illustrated in (B) of FIG. 17, the verification processing apparatus 200 serving as the verifier verifies the information processing apparatus 100 based on the identification information $ID_B$ and the response information σ transmitted from the information processing apparatus 100 in regard to the challenge information Ch by verifying the hash corn of the commitment information. That is, in the process illustrated in FIG. 17, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 17 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 17 as the process related to the verification processing method according to the embodiment, so that, for example, the illegal authentication illustrated in C of FIG. 2 can be prevented from being executed.

[4-2-3] Application Example to MQ Authentication Scheme (3-Pass and Serialization) to which Basic Structure According to First Example is Applied

[4-2-3-1] MQ Authentication Scheme to which Basic Structure According to First Embodiment is Applied: 3-Pass and Serialization An MQ authentication scheme (3-pass and serialization) to which the basic structure according to the first example is applied will be first described before description of the application examples to the MQ authentication scheme (3-pass and serialization) to which the basic structure according to the first example is applied.

Figure 18:
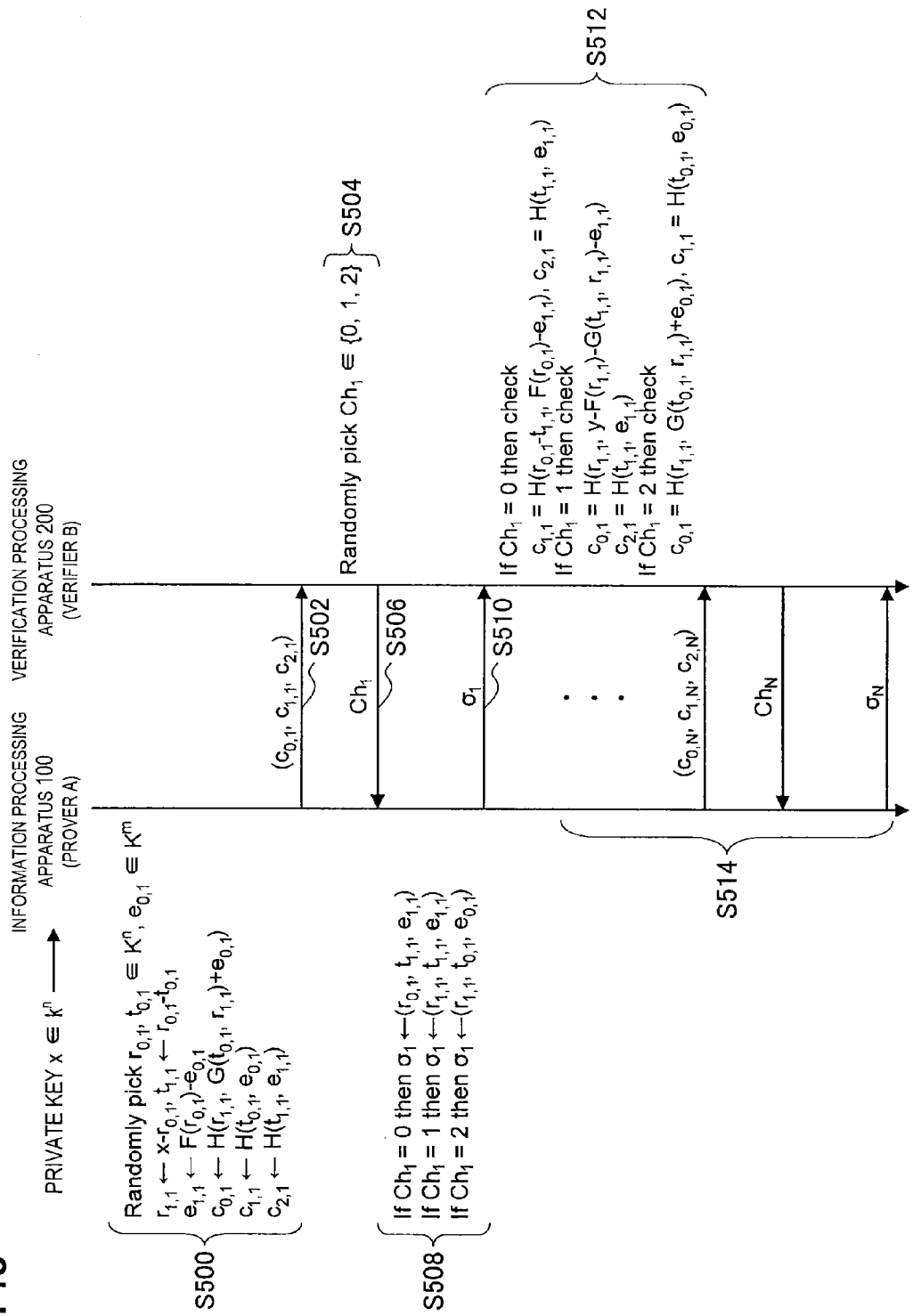
FIG. 18 is an explanatory diagram for describing an MQ authentication scheme (3-pass and serialization) to which the basic structure according to the first example is applied.

FIG. 18 is an explanatory diagram for describing an MQ authentication scheme (3-pass and serialization) to which the basic structure according to the first example is applied. Here, a process illustrated in FIG. 18 corresponds to a process of serializing basic structures configuring the MQ authentication scheme according to the first example illustrated in FIG. 4 by repeating a process a plurality of times.

The information processing apparatus 100 generates variables to generate commitment information (for example, "$c_0$," "$c_1$," and "$c_2$" illustrated in FIG. 18), as in step S100 illustrated in FIG. 4 (S500). Then, the information processing apparatus 100 transmits the generated commitment information to the verification processing apparatus 200, as in step S102 illustrated in FIG. 4 (S102).

When the verification processing apparatus 200 receives the commitment information transmitted in step S502 from the information processing apparatus 100, the verification processing apparatus 200 generates challenge information, as in step S104 illustrated in FIG. 4 (S504). Then, the verification processing apparatus 200 transmits the generated challenge information to the information processing apparatus 100, as in step S106 illustrated in FIG. 4 (S506).

The information processing apparatus 100 receiving the challenge information transmitted in step S506 from the verification processing apparatus 200 generates response information corresponding to the value indicated by the received challenge information, as in step S108 illustrated in FIG. 4 (S508). Then, the information processing apparatus 100 transmits the generated response information as a response to the challenge information to the verification processing apparatus 200, as in step S110 illustrated in FIG. 4 (S510).

When the verification processing apparatus 200 receives the response information transmitted in step S510 from the information processing apparatus 100, the verification processing apparatus 200 verifies the information forming the commitment information corresponding to the transmitted challenge information based on the received response information, as in step S112 illustrated in FIG. 4 (S512).

The information processing apparatus 100 and the verification processing apparatus 200 repeat the processes of steps S500 to S512 N times (S514). The verification processing apparatus 200 verifies the information processing apparatus 100 based on the verification results of the processes executed N times. For example, when the values calculated in all of the processes executed N times are identical to the values included in the commitment information, the verification processing apparatus 200 authenticates the information processing apparatus 100 having transmitted the response information as the genuine information processing apparatus 100.

Figure 19:
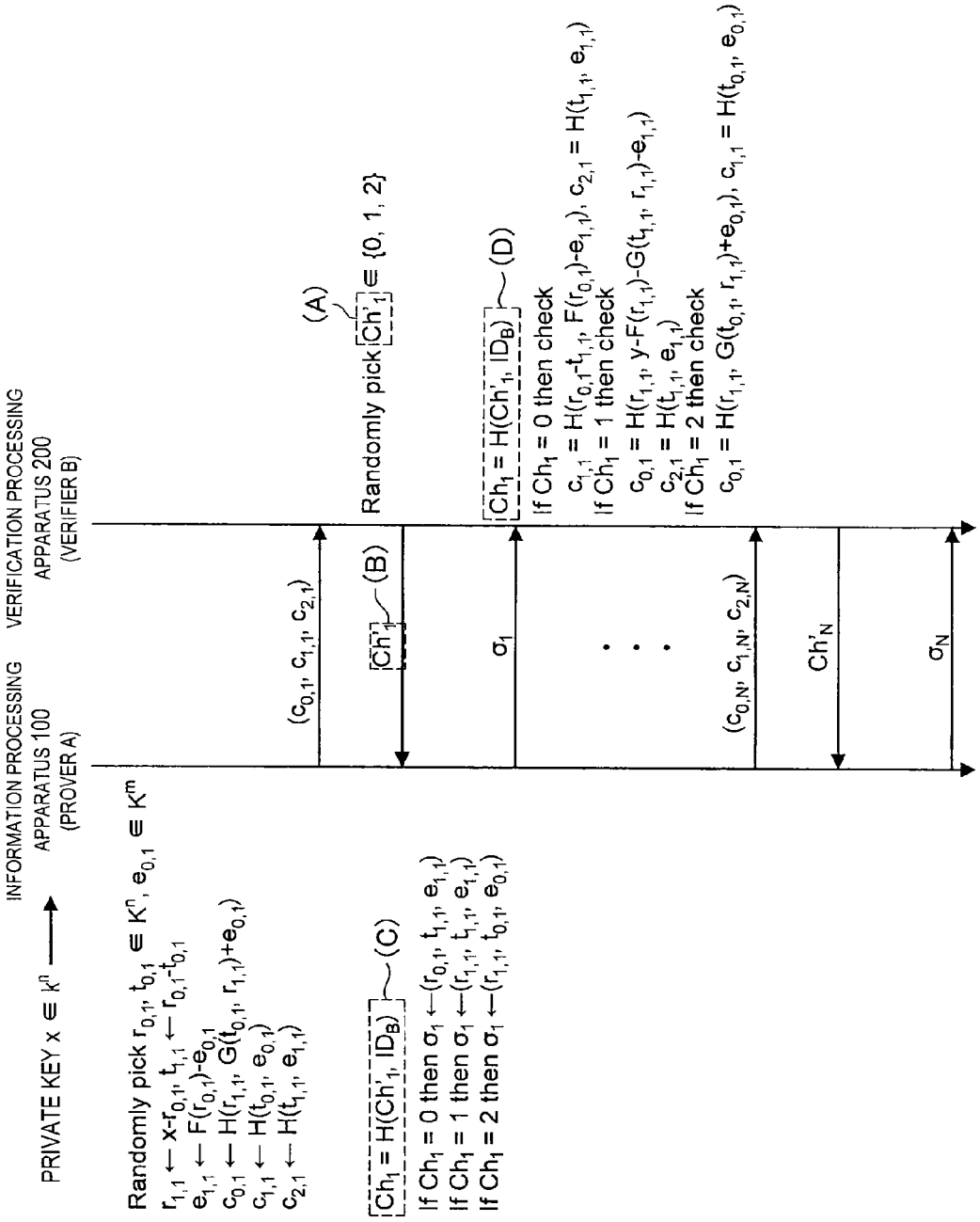
FIG. 19 is an explanatory diagram for describing a process related to the information processing method according to the embodiment and a process related to the verification processing method according to the embodiment.

[4-2-3-2] First Application Example to MQ Authentication Scheme (3-Pass and Serialization) to which Basic Structure According to First Example is Applied: Process of Including Identification Information in Challenge Information FIG. 19 is an explanatory diagram for describing a process related to the information processing method according to the embodiment and a process related to the verification processing method according to the embodiment. Here, FIG. 19 illustrates the first application example to the MQ authentication scheme (3-pass and serialization) to which the basic structure according to the first example illustrated in FIG. 18 is applied. More specifically, FIG. 19 illustrates an example of a process (a process of including the identification information in the challenge information) of applying "the first application example to the basic structure configuring the MQ authentication scheme according to the first example" illustrated in FIG. 5 in the MQ authentication scheme (3-pass and the serialization) to which the basic structure according to the first example illustrated in FIG. 18 is applied. (A) to (D) illustrated in FIG. 19 illustrate differences from the process illustrated in FIG. 18. Hereinafter, the differences from the process illustrated in FIG. 18 will be mainly described.

The verification processing apparatus 200 generates first challenge information $Ch'_1$ when the verification processing apparatus 200 receives the commitment information transmitted from the information processing apparatus 100, as in the process illustrated in (A) of FIG. 5 ((A) of FIG. 19). Then, the verification processing apparatus 200 transmits the generated first challenge information $Ch'_1$ to the information processing apparatus 100, as in the process illustrated in (B) of FIG. 5 ((B) illustrated in FIG. 19).

The information processing apparatus 100 generates second challenge information $Ch_1$ including the identification information $ID_B$ based on the identification information $ID_B$ and the first challenge information $Ch'_1$ transmitted from the verification processing apparatus 200, as in the process illustrated in (C) of FIG. 5 ((C) illustrated in FIG. 19). Then, the information processing apparatus 100 generates the response information based on the generated second challenge information $Ch_1$, as in step S508 of FIG. 18, and transmits the response information to the verification processing apparatus 200, as in step S510 of FIG. 18.

The verification processing apparatus 200 generates the second challenge information $Ch_1$ based on the identification information $ID_B$ and the first challenge information $Ch'_1$ transmitted to the information processing apparatus 100, as in the process illustrated in (D) of FIG. 5 ((D) illustrated in FIG. 19). Then, the verification processing apparatus 200 verifies the information forming the commitment information corresponding to the transmitted challenge information based on the generated second challenge information $Ch_1$ and the response information $\sigma_1$ transmitted from the information processing apparatus 100 in regard to the transmitted first challenge information $Ch'_1$, as in step S512 of FIG. 15.

For example, as illustrated in FIG. 19, the information processing apparatus 100 serving as the prover generates the second challenge information including the identification information $ID_B$ and transmits the response information corresponding to the generated second challenge information to the verification processing apparatus 200. That is, in the process illustrated in FIG. 19, the information processing apparatus 100 executes a process of including the identification information in the series of processes related to the authentication.

For example, as illustrated in FIG. 19, the verification processing apparatus 200 serving as the verifier generates the second challenge information including the identification information $ID_B$ and verifies the information processing apparatus 100 based on the generated second challenge information and the response information transmitted from the information processing apparatus 100. That is, in the process illustrated in FIG. 19, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 19 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 19 as the process related to the verification processing method according to the embodiment, so that, for example, the illegal authentication illustrated in C of FIG. 2 can be prevented from being executed.

Figure 20:
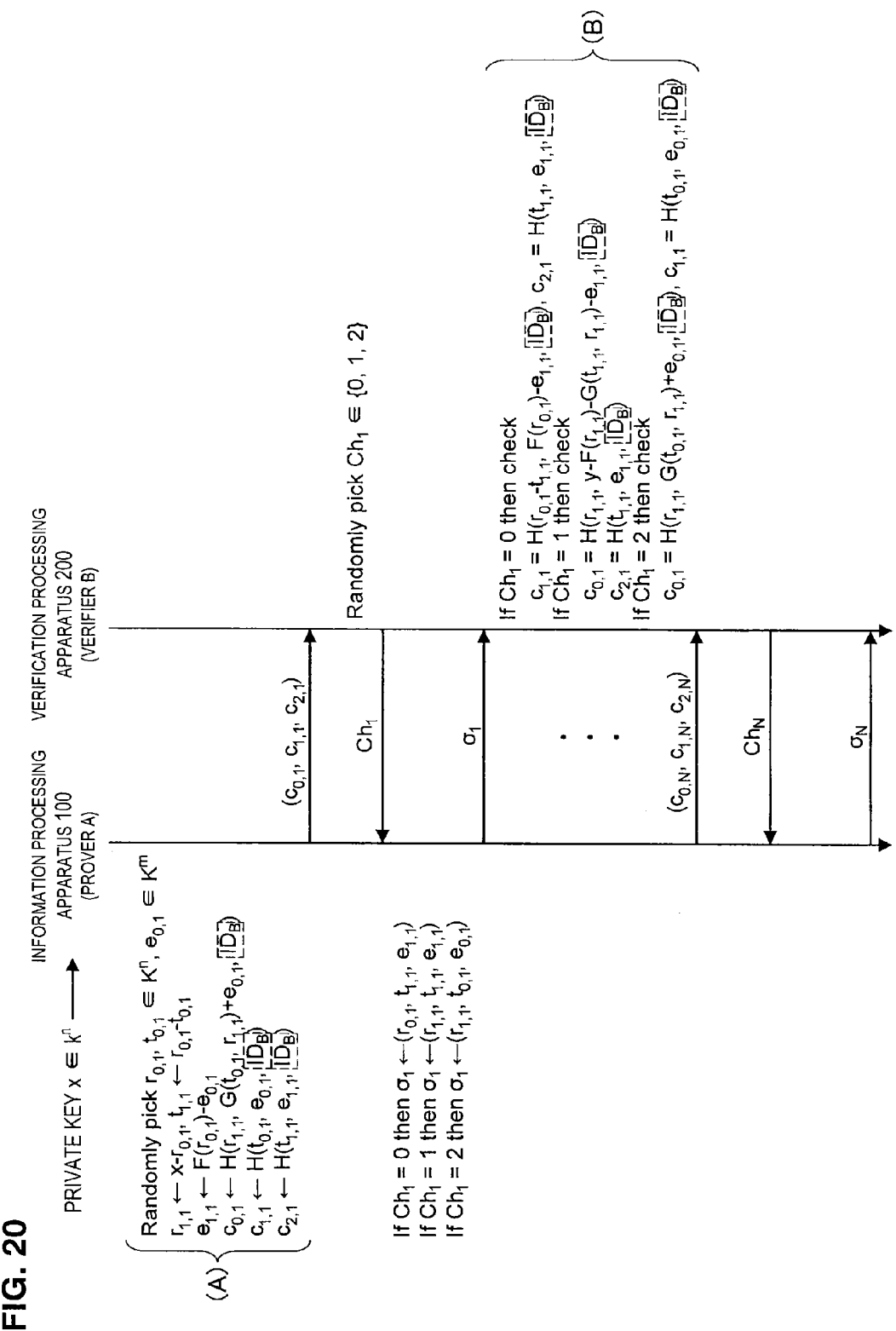
FIG. 20 is an explanatory diagram for describing a process related to the information processing method according to the embodiment and a process related to the verification processing method according to the embodiment.

[4-2-3-3] Second Application Example to MQ Authentication Scheme (3-Pass and Serialization) to which Basic Structure According to First Example is Applied: Process of Including Identification Information in Commitment Information FIG. 20 is an explanatory diagram for describing a process related to the information processing method according to the embodiment and a process related to the verification processing method according to the embodiment. Here, FIG. 20 illustrates the second application example to the MQ authentication scheme (3-pass and serialization) to which the basic structure according to the first example illustrated in FIG. 18 is applied. More specifically, FIG. 20 illustrates an example of a process (a process of including the identification information in the commitment information) of applying "the second application example to the basic structure configuring the MQ authentication scheme according to the first example" illustrated in FIG. 6 in the MQ authentication scheme (3-pass and the serialization) to which the basic structure according to the first example illustrated in FIG. 18 is applied. (A) and (B) illustrated in FIG. 20 illustrate differences from the process illustrated in FIG. 18. Hereinafter, the differences from the process illustrated in FIG. 18 will be mainly described.

The information processing apparatus 100 generates the commitment information including the identification information $ID_B$, as in the process illustrated in (A) of FIG. 6 ((A) illustrated in FIG. 20). Then, the information processing apparatus 100 transmits the generated commitment information including the identification information $ID_B$ to the verification processing apparatus 200 as in step S502 of FIG. 18.

The verification processing apparatus 200 verifies the information forming the commitment information corresponding to the challenge information transmitted as in step S512 illustrated in FIG. 15 based on the identification information $ID_B$ and the response information $\sigma_1$ transmitted as in step S210 of FIG. 18 from the information processing apparatus 100, as in the process illustrated in (B) of FIG. 6.

For example, as illustrated in (A) of FIG. 20, the information processing apparatus 100 serving as the prover includes the identification information $ID_B$ in all of the information ($c_0$, $c_1$, and $c_2$) forming the commitment information. That is, in the process illustrated in FIG. 20, the information processing apparatus 100 executes a process of including the identification information in the series of processes related to the authentication.

For example, as illustrated in (B) of FIG. 20, the verification processing apparatus 200 serving as the verifier verifies the information processing apparatus 100 based on the identification information $ID_B$ and the response information $\sigma$ transmitted from the information processing apparatus 100 in regard to the challenge information Ch. That is, in the process illustrated in FIG. 20, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 20 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 20 as the process related to the verification processing method according to the embodiment, so that, for example, the illegal authentication illustrated in C of FIG. 2 can be prevented from being executed.

A process of including the identification information in the commitment information is not limited to the process illustrated in FIG. 20.

Figure 21:
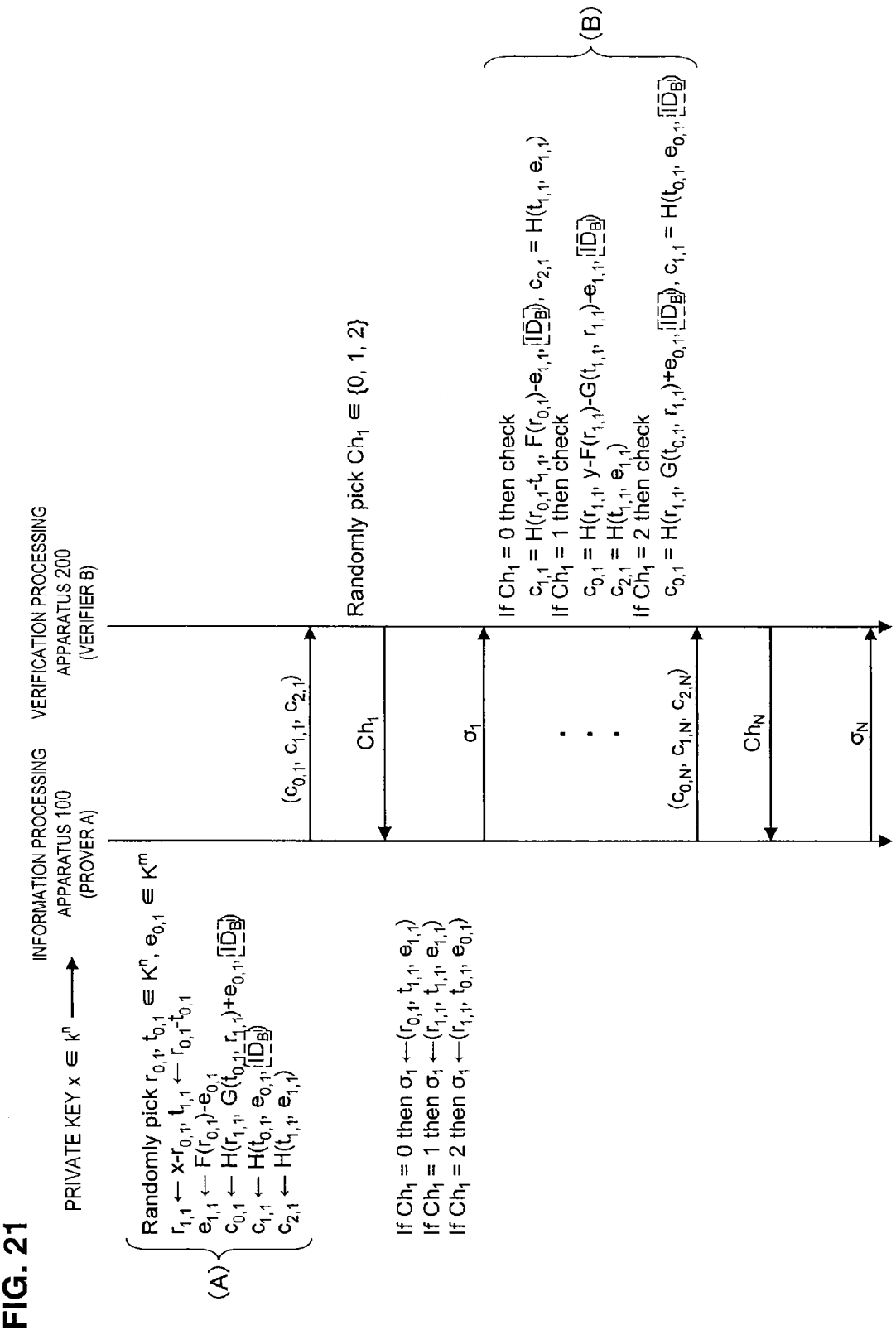
FIG. 21 is an explanatory diagram for describing a process related to the information processing method according to the embodiment and a process related to the verification processing method according to the embodiment.

FIG. 21 is an explanatory diagram for describing a process related to the information processing method according to the embodiment and a process related to the verification processing method according to the embodiment. Here, FIG. 21 illustrates the second application example to the MQ authentication scheme (3-pass and serialization) to which the basic structure according to the first example illustrated in FIG. 18 is applied. More specifically, FIG. 21 illustrates another example of the process (process of including the identification information in the commitment information) of applying "the second application example to the basic structure configuring the MQ authentication scheme according to the first example" illustrated in FIG. 6 in the MQ authentication scheme (3-pass and serialization) to which the basic structure according to the first example illustrated in FIG. 18 is applied. (A) and (B) illustrated in FIG. 21 illustrate differences from the process illustrated in FIG. 18. Hereinafter, the differences from the process illustrated in FIG. 18 will be mainly described.

The information processing apparatus 100 generates the commitment information including the identification information $ID_B$, as in the process illustrated in (A) of FIG. 7 ((A) illustrated in FIG. 21). Then, the information processing apparatus 100 transmits the generated commitment information including the identification information $ID_B$ to the verification processing apparatus 200, as in step S502 of FIG. 18.

Here, in the process of (A) illustrated in FIG. 20, the information processing apparatus 100 includes the identification information $ID_B$ in all of the information ($c_0$, $c_1$, and $c_2$) forming the commitment information. In the process of (A) illustrated in FIG. 21, however, the information processing apparatus 100 includes the identification information $ID_B$ in the parts ($c_0$ and $c_1$) of the information forming the commitment information. Further, as described above, the parts of the information forming the commitment information in which the information processing apparatus 100 includes the identification information $ID_B$ are not limited to ($c_0$ and $c_1$).

As in the process illustrated in (B) of FIG. 7, the verification processing apparatus 200 verifies the information processing apparatus 100 based on the identification information $ID_B$ and the response information $\sigma$ transmitted from the information processing apparatus 100, as in step S510 illustrated in FIG. 18 ((B) illustrated in FIG. 21).

Here, in the process of (B) illustrated in FIG. 20, the verification processing apparatus 200 normally uses the identification information $ID_B$ when the verification processing apparatus 200 calculates values corresponding to the parts of the information forming the commitment information. In the process of (B) illustrated in FIG. 21, however, the verification processing apparatus 200 uses the identification information $ID_B$ in regard to the parts of the information forming the commitment information including the identification information $ID_B$, when the verification processing apparatus 200 calculates values corresponding to the parts of the information forming the commitment information. Accordingly, the verification processing apparatus 200 executing the process of (B) illustrated in FIG. 21 can reduce a calculation amount more than when the verification processing apparatus 200 executes the process of (B) illustrated in FIG. 20.

For example, as illustrated in (A) of FIG. 21, the information processing apparatus 100 serving as the prover includes the identification information $ID_B$ in parts (for example, $c_{0,i}$ and $c_{1,i}$) of the information forming the commitment information. That is, in the process illustrated in FIG. 21, the information processing apparatus 100 executes a process of including the identification information in the series of processes related to the authentication.

For example, as illustrated in (B) of FIG. 21, the verification processing apparatus 200 serving as the verifier verifies the information processing apparatus 100 based on the identification information $ID_B$ and the response information transmitted from the information processing apparatus 100 in regard to the challenge information. At this time, the verification processing apparatus 200 verifies the parts of the information forming the commitment information based on the identification information $ID_B$. That is, in the process illustrated in FIG. 21, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 21 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 21 as the process related to the verification processing method according to the embodiment, so that, for example, the illegal authentication illustrated in C of FIG. 2 can be prevented from being executed.

[4-2-4] Application Example to MQ Authentication Scheme (3-Pass and Serialization) to which Basic Structure According to Second Example is Applied

[4-2-4-1] MQ Authentication Scheme to which Basic Structure According to Second Embodiment is Applied: 3-Pass and Serialization An MQ authentication scheme (3-pass and serialization) to which the basic structure according to the second example is applied will be first described before description of the application examples to the MQ authentication scheme (3-pass and serialization) to which the basic structure according to the second example is applied.

Figure 22:
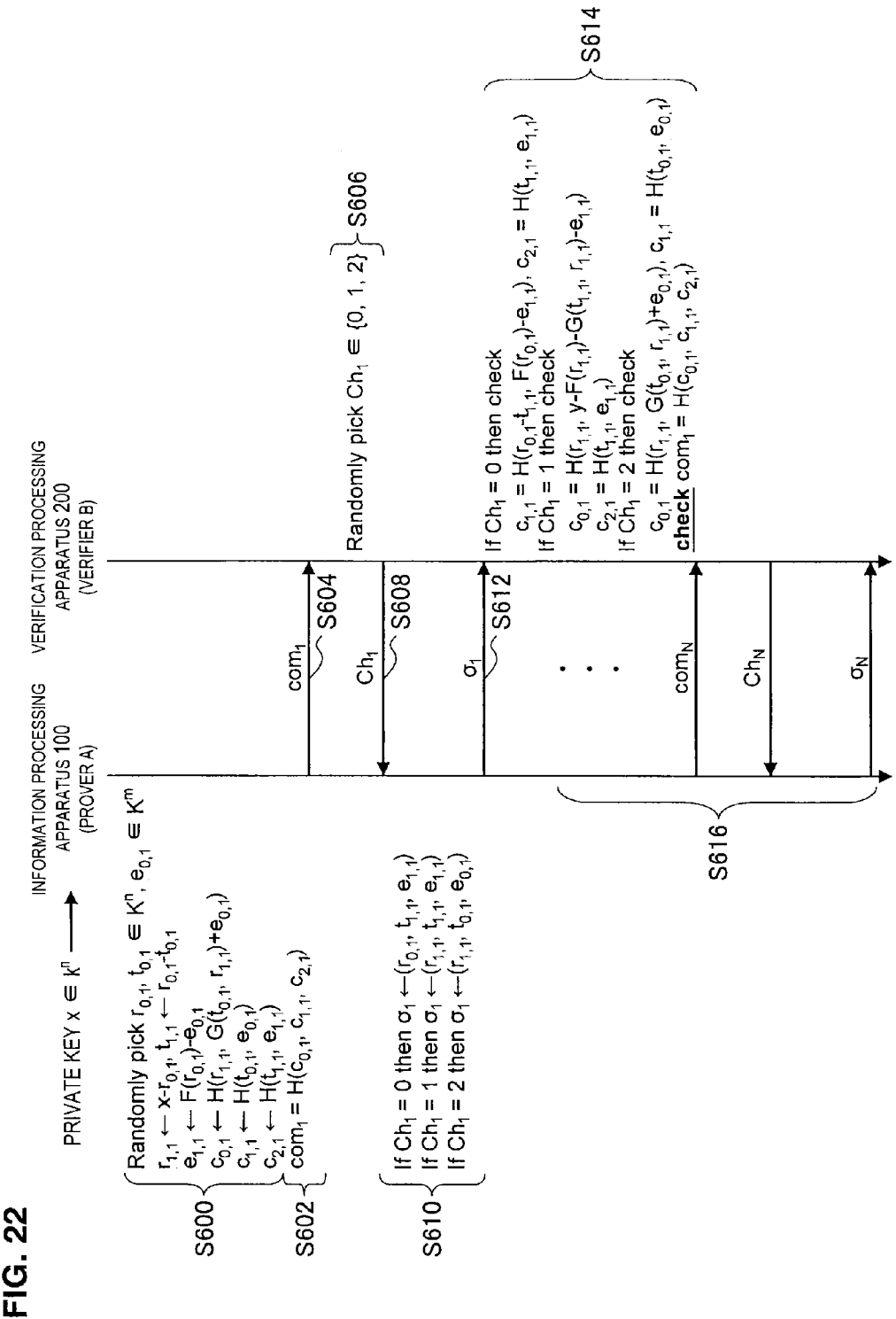
FIG. 22 is an explanatory diagram for describing an MQ authentication scheme (3-pass and serialization) to which the basic structure according to the second example is applied.

FIG. 22 is an explanatory diagram for describing an MQ authentication scheme (3-pass and serialization) to which the basic structure according to the second example is applied. Here, a process illustrated in FIG. 22 corresponds to a process of serializing the basic structures configuring the MQ authentication scheme according to the second example illustrated in FIG. 8 by executing a process a plurality of times.

The information processing apparatus 100 generates variables to generate the commitment information (for example, "$c_0$" "$c_1$" "$c_2$" illustrated in FIG. 22), as in step S200 of FIG. 8 (S600). The information processing apparatus 100 calculates a hash $com_1$ of the generated commitment information, as in step S202 of FIG. 8 (S602). Then, the information processing apparatus 100 transmits the hash $com_1$ of the generated commitment information to the verification processing apparatus 200, as in step S204 of FIG. 8 (S604).

When the verification processing apparatus 200 receives the commitment information $com_1$ transmitted in step S604 from the information processing apparatus 100, the verification processing apparatus 200 generates the challenge information $Ch_1$, as in step S206 of FIG. 8 (S606). Then, the verification processing apparatus 200 transmits the generated challenge information $Ch_1$ to the information processing apparatus 100, as in step S208 of FIG. 8 (S608).

The information processing apparatus 100 receiving the challenge information $Ch_1$ transmitted in step S208 from the verification processing apparatus 200 generates response information $\sigma_1$ corresponding to a value indicated by the received challenge information, as in step S210 of FIG. 8 (S610). Then, the information processing apparatus 100 transmits the generated response information $\sigma_1$ as a response to the challenge information to the verification processing apparatus 200, as in step S212 of FIG. 8 (S612).

When the verification processing apparatus 200 receives the response information $\sigma_1$ transmitted in step S612 from the information processing apparatus 100, the verification processing apparatus 200 verifies the hash $com_1$ of the commitment information corresponding to the challenge information $\sigma_1$ based on the received response information, as in step S214 of FIG. 8 (S614).

The information processing apparatus 100 and the verification processing apparatus 200 repeat the processes of steps S600 to S614 N times (S616). The verification processing apparatus 200 verifies the information processing apparatus 100 based on the authentication results of the processes executed N times. For example, when the values calculated in all of the processes executed N times are identical to the values of the hashes of the commitment information, the verification processing apparatus 200 authenticates the information processing apparatus 100 having transmitted the response information as the genuine information processing apparatus 100.

Figure 23:
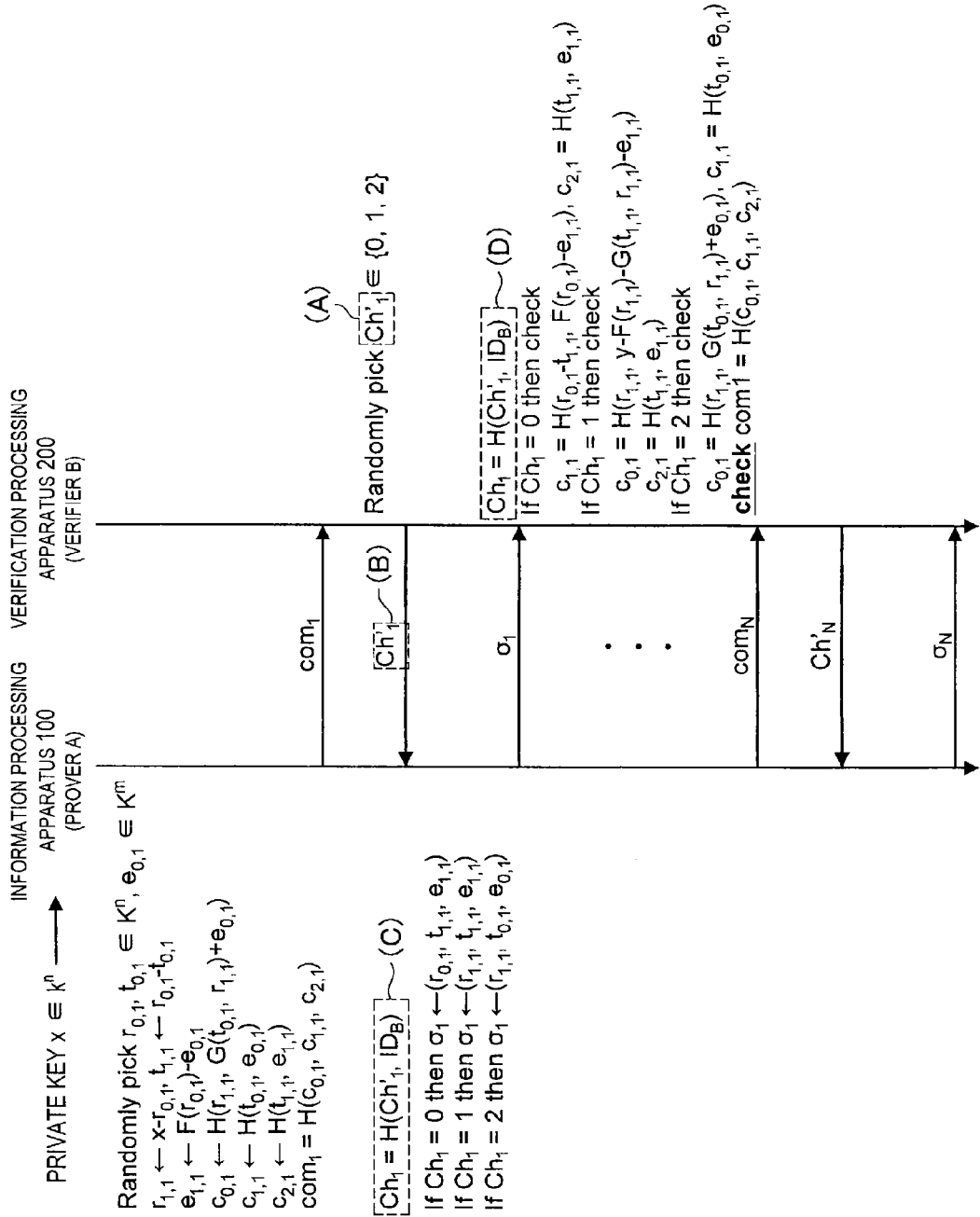
FIG. 23 is an explanatory diagram for describing a process related to the information processing method according to the embodiment and a process related to the verification processing method according to the embodiment.

[4-2-4-2] First Application Example to MQ Authentication Scheme (3-Pass and Serialization) to which Basic Structure According to Second Example is Applied: Process of Including Identification Information in Challenge Information FIG. 23 is an explanatory diagram for describing a process related to the information processing method according to the embodiment and a process related to the verification processing method according to the embodiment. Here, FIG. 23 illustrates the first application example to the MQ authentication scheme (3-pass and serialization) to which the basic structure according to the second example illustrated in FIG. 22 is applied. More specifically, FIG. 23 illustrates an example of a process (a process of including the identification information in the challenge information) of applying "the first application example to the basic structure configuring the MQ authentication scheme according to the second example" illustrated in FIG. 9 in the MQ authentication scheme (3-pass and the serialization) to which the basic structure according to the second example illustrated in FIG. 22 is applied. (A) to (D) illustrated in FIG. 23 illustrate differences from the process illustrated in FIG. 22. Hereinafter, the differences from the process illustrated in FIG. 22 will be mainly described.

The verification processing apparatus 200 generates first challenge information $Ch'_1$ based on the hash $com_1$ of the commitment information transmitted from the information processing apparatus 100, as in the process illustrated in (A) of FIG. 9 ((A) of FIG. 23). Then, the verification processing apparatus 200 transmits the generated first challenge information $Ch'_1$ to the information processing apparatus 100, as in the process illustrated in (B) of FIG. 9 ((B) illustrated in FIG. 23).

The information processing apparatus 100 generates the second challenge information $Ch_1$ including the identification information $ID_B$ based on the identification information $ID_B$ and the first challenge information $Ch'_1$ transmitted from the verification processing apparatus 200, as in the process of (C) illustrated in FIG. 9 ((C) illustrated in FIG. 23). Then, the information processing apparatus 100 generates the response information based on the generated second challenge information $Ch_1$, as in step S610 of FIG. 22, and transmits the response information $\sigma_1$ to the verification processing apparatus 200, as in step S612 of FIG. 22.

The verification processing apparatus 200 generates the second challenge information $Ch_1$ based on the identification information $ID_B$ and the first challenge information $Ch'_1$ transmitted to the information processing apparatus 100, as in the process of (D) illustrated in FIG. 9 ((D) illustrated in FIG. 23). Then, the verification processing apparatus 200 verifies the hash $com_1$ of the commitment information corresponding to the challenge information $\sigma_1$ based on the generated second challenge information $Ch$ and the response information $\sigma_1$ transmitted from the information processing apparatus 100 in regard to the transmitted first challenge information $Ch'_1$, as in step S614 of FIG. 22.

For example, as illustrated in FIG. 23, the information processing apparatus 100 serving as the prover generates the second challenge information including the identification information $ID_B$ and transmits the response information corresponding to the generated second challenge information to the verification processing apparatus 200. That is, in the process illustrated in FIG. 23, the information processing apparatus 100 executes a process of including the identification information in the series of processes related to the authentication.

For example, as illustrated in FIG. 23, the verification processing apparatus 200 serving as the verifier generates the second challenge information including the identification information $ID_B$ and verifies the information processing apparatus 100 based on the generated second challenge information and the response information transmitted from the information processing apparatus 100. That is, in the process illustrated in FIG. 23, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 23 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 23 as the process related to the verification processing method according to the embodiment, so that, for example, the illegal authentication illustrated in C of FIG. 2 can be prevented from being executed.

Figure 24:
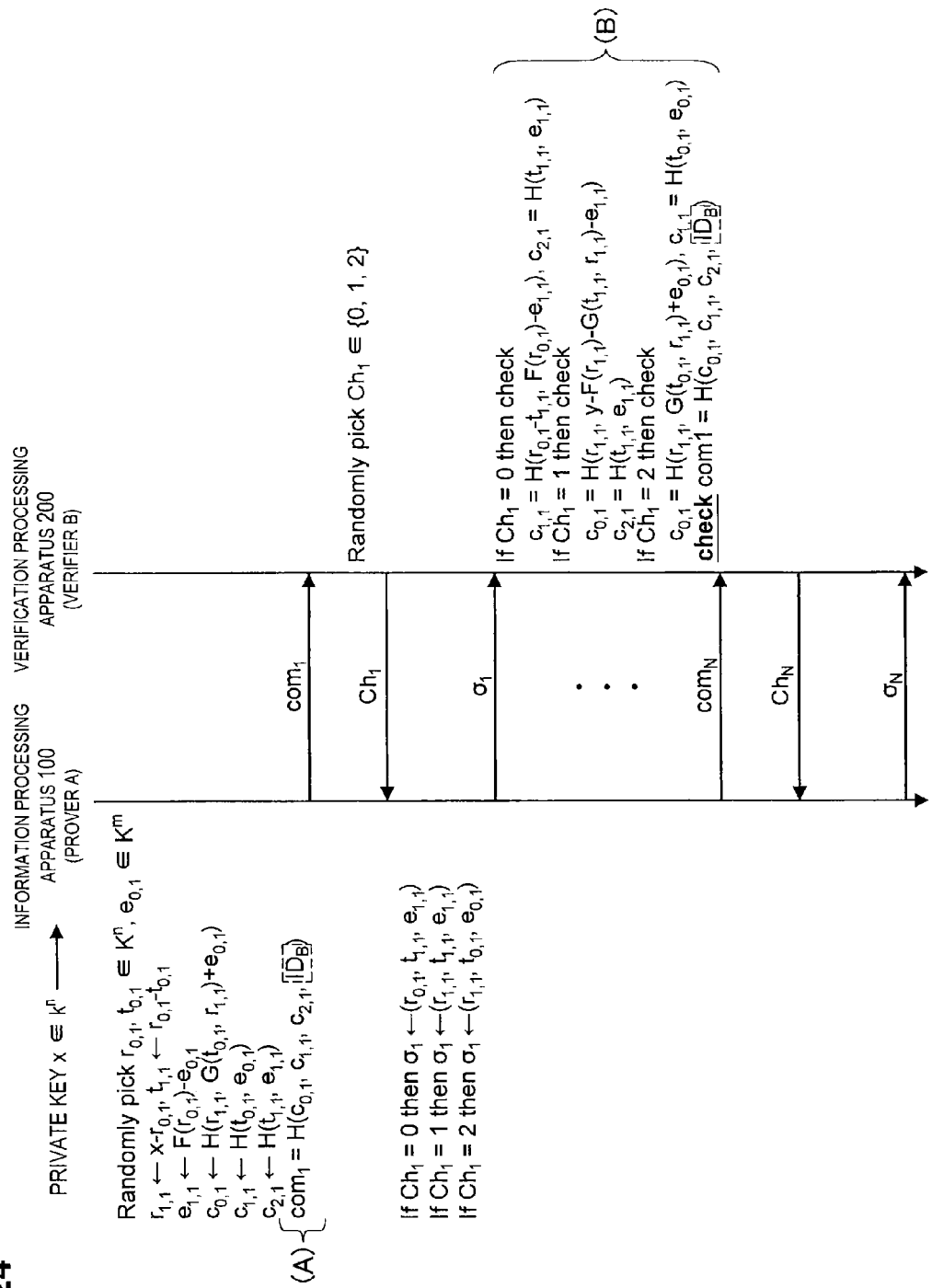
FIG. 24 is an explanatory diagram for describing a process related to the information processing method according to the embodiment and a process related to the verification processing method according to the embodiment.

[4-2-4-3] Second Application Example to MQ Authentication Scheme (3-Pass and Serialization) to which Basic Structure According to Second Example is Applied: Process of Including Identification Information in Commitment Information FIG. 24 is an explanatory diagram for describing a process related to the information processing method according to the embodiment and a process related to the verification processing method according to the embodiment. Here, FIG. 24 illustrates the second application example to the MQ authentication scheme (3-pass and serialization) to which the basic structure according to the second example illustrated in FIG. 22 is applied. More specifically, FIG. 24 illustrates an example of a process (a process of including the identification information in the commitment information) of applying "the second application example to the basic structure configuring the MQ authentication scheme according to the second example" illustrated in FIG. 10 in the MQ authentication scheme (3-pass and the serialization) to which the basic structure according to the second example illustrated in FIG. 22 is applied. (A) and (B) illustrated in FIG. 24 illustrate differences from the process illustrated in FIG. 22. Hereinafter, the differences from the process illustrated in FIG. 22 will be mainly described.

The information processing apparatus 100 generates a hash $com_1$ of the commitment information including the identification information $ID_B$, as in the process illustrated in (A) of FIG. 10 ((A) illustrated in FIG. 24). Then, the information processing apparatus 100 transmits the generated hash $com_1$ of the commitment information including the identification information $ID_B$ to the verification processing apparatus 200 as in step S604 of FIG. 22.

The verification processing apparatus 200 verifies the hash $com_1$ of the commitment information corresponding to the challenge information $\sigma_1$ based on the response information $\sigma_1$ and the identification information $ID_B$ transmitted from the information processing apparatus 100 as in step S612 illustrated in FIG. 22, as in the process illustrated in (B) of FIG. 10 ((B) illustrated in FIG. 24).

For example, as illustrated in (A) of FIG. 24, the information processing apparatus 100 serving as the prover includes the identification information $ID_B$ in the hash of the commitment information. That is, in the process illustrated in FIG. 24, the information processing apparatus 100 executes a process of including the identification information in the series of processes related to the authentication.

For example, as illustrated in (B) of FIG. 24, the verification processing apparatus 200 serving as the verifier verifies the information processing apparatus 100 based on the identification information $ID_B$ and the response information transmitted from the information processing apparatus 100 in regard to the challenge information by verifying the hash of the commitment information. That is, in the process illustrated in FIG. 24, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 24 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 24 as the process related to the verification processing method according to the embodiment, so that, for example, the illegal authentication illustrated in C of FIG. 2 can be prevented from being executed.

As described above, the information processing apparatus 100 according to the embodiment executes the process of including the identification information in the series of processes related to the authentication by executing, for example, "the process of including the identification information in the challenge information" or "the process of including the identification information in the commitment information" as the process (the process in the prover) related to the information processing method according to the embodiment.

The verification processing apparatus 200 according to the embodiment executes the verification on the received information including the identification information by executing, for example, "the process of including the identification information in the challenge information" or "the process of including the identification information in the commitment information" as the process (the process in the verifier) related to the verification processing method according to the embodiment.

Accordingly, the information processing apparatus 100 executes, for example, "the process of including the identification information in the challenge information" or "the process of including the identification information in the commitment information" as the process related to the information processing method according to the embodiment, so that, for example, the illegal authentication illustrated in C of FIG. 2 can be prevented from being executed in the verification processing apparatus 200. Further, the verification processing apparatus 200 executes, for example, "the process of including the identification information in the challenge information" or "the process of including the identification information in the commitment information" as the process related to the verification processing method according to the embodiment, so that, for example, the illegal authentication illustrated in C of FIG. 2 can be prevented from being executed.

Application examples of the process related to the information processing method according to the embodiment and the process related to the verification processing method according to the embodiment are not limited to the above-described examples.

[5] Expansion Examples of Process Related to Information Processing Method According to Embodiment and Process Related to Verification Processing Method According to Embodiment

[5-1] First Expansion Example: Application to 5-Pass Scheme of MQ Authentication As described above, the application examples to the MQ authentication scheme to which the basic structure is applied have been described exemplifying the basic structure of the 3-pass scheme of the MQ authentication as the basic structure configuring the MQ authentication scheme, but the basic structure of the MQ authentication scheme is not limited to the 3-pass scheme. The process related to the information processing method according to the embodiment and the process related to the verification processing method according to the embodiment can also be applied to an MQ authentication scheme to which a basic structure of a 5-pass scheme of the MQ authentication is applied.

Figure 25:
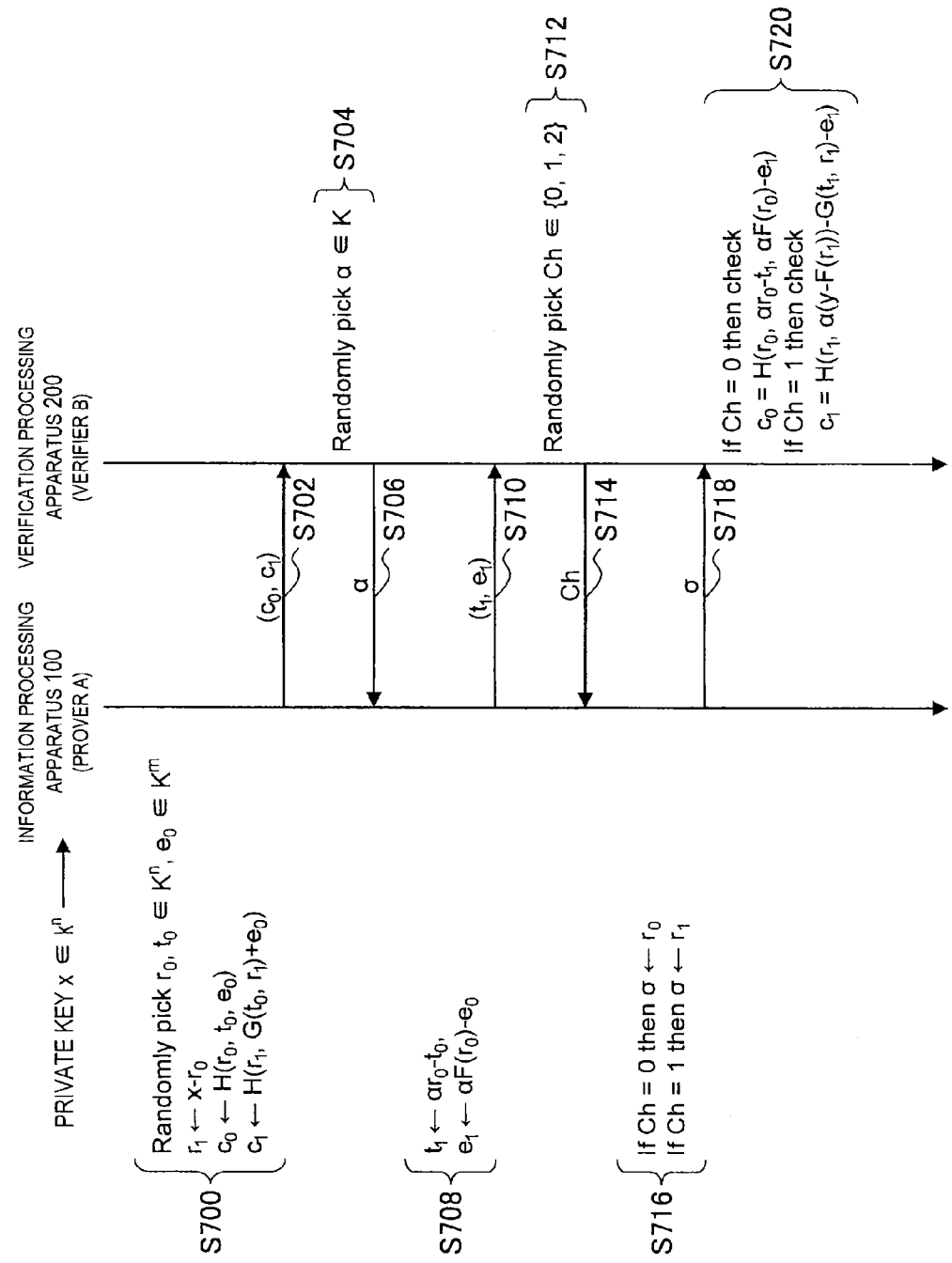
FIG. 25 is an explanatory diagram illustrating a third example of a basic structure configuring the MQ authentication scheme.

[5-1-1] Third Example of Basic Structure Configuring MQ Authentication Scheme: First Example of Basic Structure of 5-Pass Scheme of MQ Authentication First, a third example (a first example of the basic structure of the 5-pass scheme of the MQ authentication) of the basic structure configuring the MQ authentication scheme will be described. FIG. 25 is an explanatory diagram illustrating the third example of a basic structure configuring the MQ authentication scheme. Here, the process of step S702 illustrated in FIG. 25 corresponds to a process related to transmission of commitment information. The processes of steps S706 and S714 illustrated in FIG. 25 correspond to, for example, processes related to transmission of challenge information. The processes of steps S710 and S718 illustrated in FIG. 25 correspond to processes related to transmission of response information.

The information processing apparatus 100 generates variables to generate commitment information (for example, "$c_0$" and "$c_1$" illustrated in FIG. 25) (S700) and transmits the generated commitment information to the verification processing apparatus 200 (S702).

When the verification processing apparatus 200 receives the commitment information transmitted in step S702 from the information processing apparatus 100, the verification processing apparatus 200 generates challenge information $\alpha$ (S704). Then, the verification processing apparatus 200 transmits the generated challenge information $\alpha$ to the information processing apparatus 100 (S706).

The information processing apparatus 100 receiving the challenge information $\alpha$ transmitted in step S706 from the verification processing apparatus 200 generates response information $(t_1, e_1)$ corresponding to the value indicated by the received challenge information $\alpha$ (S708). Then, the information processing apparatus 100 transmits the generated response information $(t_1, e_1)$ as a response to the challenge information $\alpha$ to the verification processing apparatus 200 (S710).

When the verification processing apparatus 200 receives the response information $(t_1, e_1)$ transmitted in step S710 from the information processing apparatus 100, the verification processing apparatus 200 generates challenge information Ch, as in step S104 of FIG. 4 (S712). Then, the verification processing apparatus 200 transmits the generated challenge information Ch to the information processing apparatus 100 (S714).

The information processing apparatus 100 receiving the challenge information Ch transmitted in step S714 from the verification processing apparatus 200 generates response information $\alpha$ corresponding to the value indicated by the received challenge information Ch (S716). Then, the information processing apparatus 100 transmits the generated response information $\alpha$ as a response to the challenge information Ch to the verification processing apparatus 200 (S718).

When the verification processing apparatus 200 receives the response information $\alpha$ transmitted in step S718 from the information processing apparatus 100, the verification processing apparatus 200 verifies the information processing apparatus 100 by verifying information forming commitment information corresponding to the transmitted challenge information $\alpha$ and the challenge information Ch based on the response information $(t_1, e_1)$ received in step S710 and the response information $\alpha$ received in step S718 (S720).

For example, when the challenge information transmitted in step S712 is "0," the verification processing apparatus 200 calculates the value of $c_0$ which is a part of the information forming the commitment information by calculating a hash value based on, for example, the response information $(t_1, e_1)$ and the response information $\alpha$. The verification processing apparatus 200 compares the calculated $c_0$ to $c_0$ included in the received commitment information. Then, for example, when these values are identical to each other, the verification processing apparatus 200 authenticates the information processing apparatus 100 having transmitted the response information as the genuine information processing apparatus 100.

Figure 26:
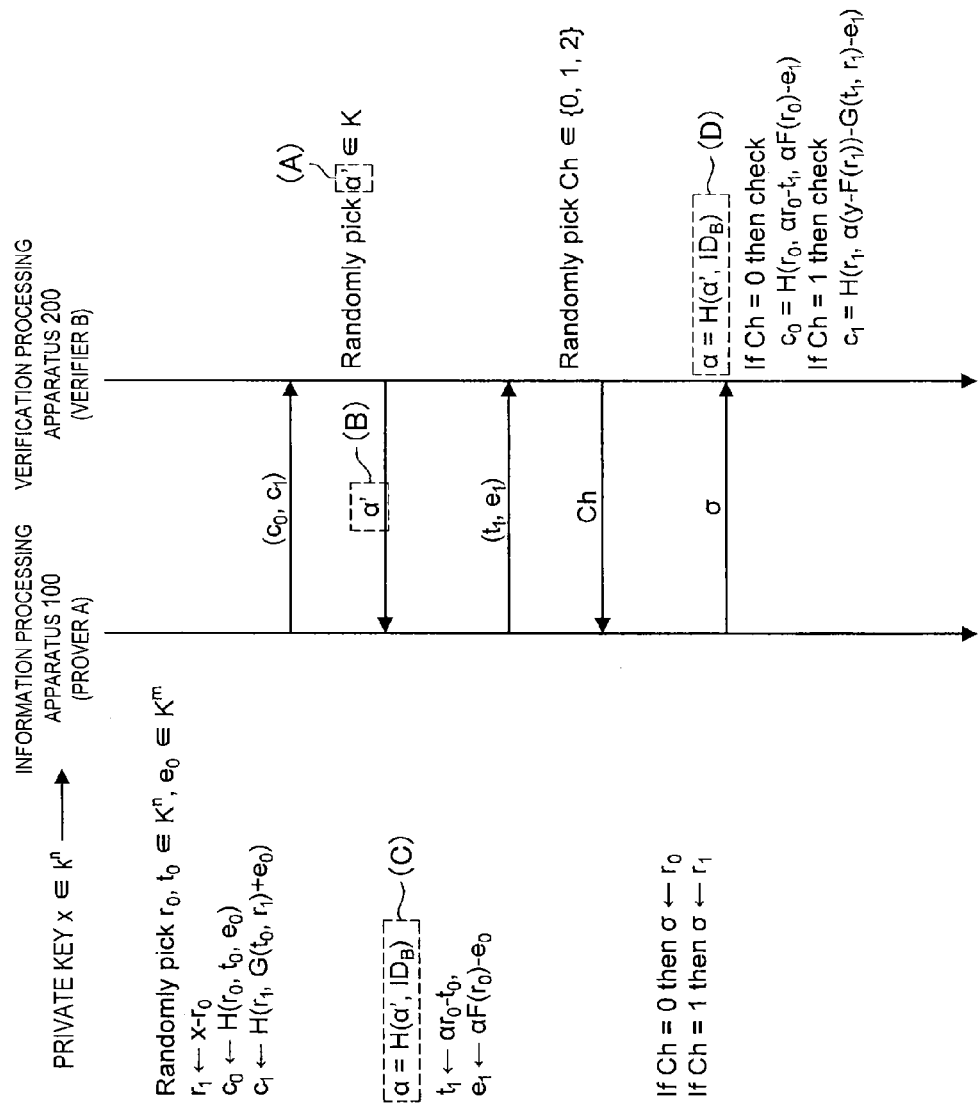
FIG. 26 is an explanatory diagram for describing a process related to the information processing method according to the embodiment and a process related to the verification processing method according to the embodiment.

[5-1-2] First Application Example to Basic Structure Configuring MQ Authentication Scheme According to Third Example: Process of Including Identification Information in Challenge Information FIG. 26 is an explanatory diagram for describing a process related to the information processing method according to the embodiment and a process related to the verification processing method according to the embodiment. Here, FIG. 26 illustrates a first application example to the basic structure configuring the MQ authentication scheme according to the third example illustrated in FIG. 25. More specifically, FIG. 26 illustrates an example of a process of including the identification information in the challenge information in the basic structure configuring the MQ authentication scheme according to the third example illustrated in FIG. 25, and (A) to (D) illustrated in FIG. 26 illustrate differences from the process illustrated in FIG. 25. Hereinafter, the differences from the process illustrated in FIG. 25 will be mainly described.

When the verification processing apparatus 200 receives the commitment information transmitted from the information processing apparatus 100, the verification processing apparatus 200 generates first challenge information $\alpha'$ ((A) illustrated in FIG. 26). Then, the verification processing apparatus 200 transmits the generated first challenge information $\alpha'$ to the information processing apparatus 100 ((B) illustrated in FIG. 26).

Here, the first challenge information $\alpha'$ illustrated in FIG. 26 is, for example, data used for an apparatus serving as a prover to generate second challenge information $\alpha$ which is used to generate the response information $(t_1, e_1)$ illustrated in FIG. 26, as illustrated in (C) of FIG. 26. For example, the first challenge information $\alpha'$ according to the embodiment is used to generate the second challenge information $\alpha$ used in a process related to verification by an apparatus serving as a verifier, as illustrated in (D) of FIG. 26.

As illustrated in (C) of FIG. 26 and (D) of FIG. 26, the second challenge information $\alpha$ is generated based on the first challenge information $\alpha'$ and the identification information $ID_B$. For example, the verification processing apparatus 200 transmits a part of the second challenge information $\alpha$ as the first challenge information according to the embodiment in consideration of the identification information $ID_B$.

The information processing apparatus 100 generates the second challenge information $\alpha$ including the identification information $ID_B$ based on the identification information $ID_B$ and the first challenge information $\alpha'$ transmitted from the verification processing apparatus 200 ((C) illustrated in FIG. 26). Then, the information processing apparatus 100 generates the response information $(t_1, e_1)$ based on the generated second challenge information $\alpha$, as in step S708 of FIG. 25, and transmits the response information $(t_1, e_1)$ to the verification processing apparatus 200, as in step S710 of FIG. 25.

The verification processing apparatus 200 generates the second challenge information $\alpha$ based on the identification information $ID_B$ and the first challenge information $\alpha'$ transmitted to the information processing apparatus 100 ((D) illustrated in FIG. 26). Then, the verification processing apparatus 200 verifies the information processing apparatus 100 based on the generated second challenge information $\alpha$ and the response information $(t_1, e_1)$ and the response information $\alpha$ transmitted from the information processing apparatus 100, as in step S720 of FIG. 25.

For example, as illustrated in FIG. 26, the information processing apparatus 100 serving as the prover generates the second challenge information $\alpha$ including the identification information $ID_B$ and transmits the response information $(t_1, e_1)$ corresponding to the generated second challenge information $\alpha$ to the verification processing apparatus 200. That is, in the process illustrated in FIG. 26, the information processing apparatus 100 executes a process of including the identification information in the series of processes related to the authentication.

For example, as illustrated in FIG. 26, the verification processing apparatus 200 serving as the verifier generates the second challenge information $\alpha$ including the identification information $ID_B$ and verifies the information processing apparatus 100 based on the generated second challenge information $\alpha$ and the response information transmitted from the information processing apparatus 100. That is, in the process illustrated in FIG. 26, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 26 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 26 as the process related to the verification processing method according to the embodiment, so that, for example, the illegal authentication illustrated in C of FIG. 2 can be prevented from being executed.

A process of including the identification information in the challenge information is not limited to the process illustrated in FIG. 26.

Figure 27:
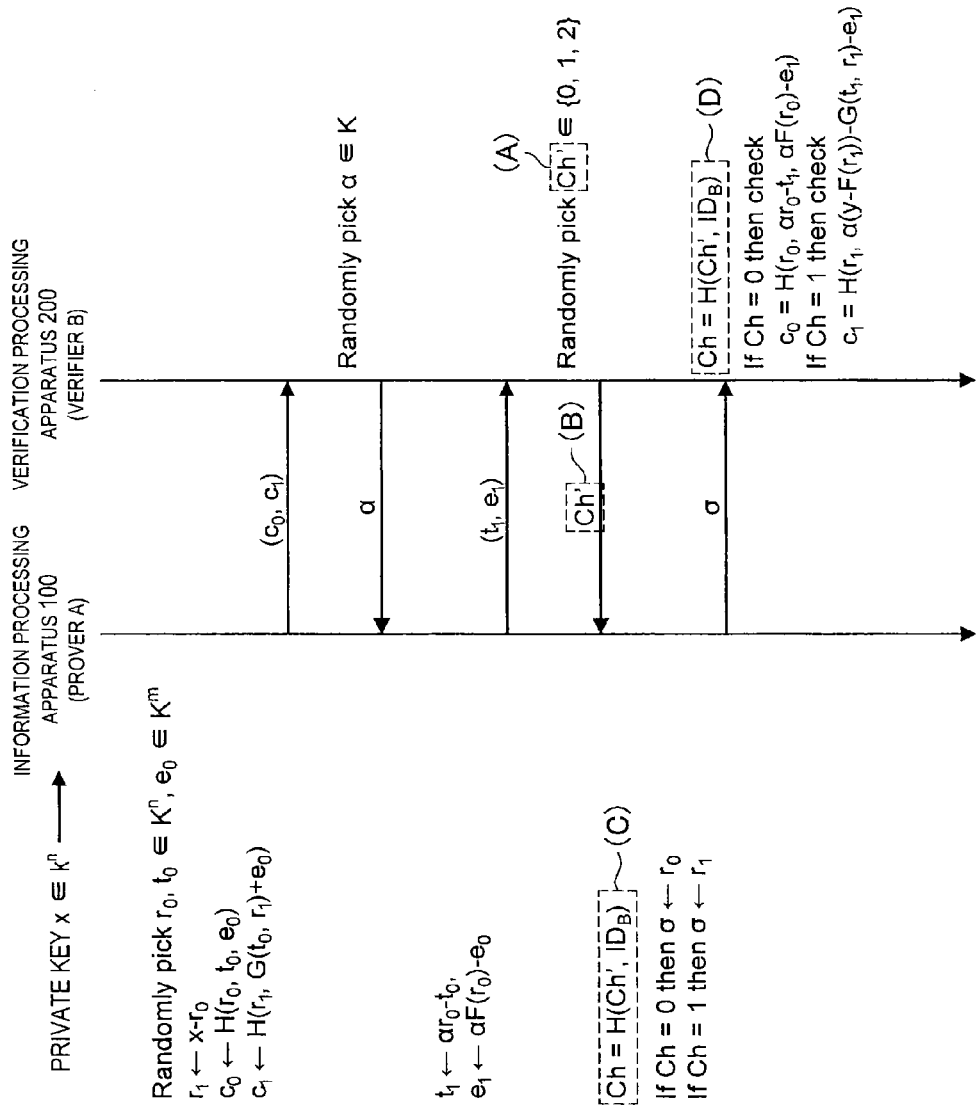
FIG. 27 is an explanatory diagram for describing a process related to the information processing method according to the embodiment and a process related to the verification processing method according to the embodiment.

FIG. 27 is an explanatory diagram for describing a process related to the information processing method according to the embodiment and a process related to the verification processing method according to the embodiment. Here, FIG. 27 illustrates a first application example to the basic structure configuring the MQ authentication scheme according to the third example illustrated in FIG. 25. More specifically, FIG. 26 illustrates another example of a process of including the identification information in the challenge information in the basic structure configuring the MQ authentication scheme according to the third example illustrated in FIG. 25, and (A) to (D) of FIG. 27 illustrate differences from the process illustrated in FIG. 25. Hereinafter, the differences from the process illustrated in FIG. 25 will be mainly described.

The verification processing apparatus 200 generates first challenge information Ch' based on the response information (t1, e1) transmitted from the information processing apparatus 100 ((A) illustrated in FIG. 27). Then, the verification processing apparatus 200 transmits the generated first challenge information Ch' to the information processing apparatus 100 ((B) of FIG. 27).

Here, the first challenge information Ch' illustrated in FIG. 27 is, for example, data used for an apparatus serving as a prover to generate second challenge information Ch which is used to generate the response information $\alpha$ illustrated in FIG. 27, as illustrated in (C) of FIG. 27. For example, the first challenge information Ch' according to the embodiment is used to generate the second challenge information Ch used in a process related to verification by an apparatus serving as a verifier, as illustrated in (D) of FIG. 27.

As illustrated in (C) of FIG. 27 and (D) of FIG. 27, the second challenge information Ch is generated based on the first challenge information Ch' and the identification information $ID_B$. For example, the verification processing apparatus 200 transmits a part of the second challenge information Ch as the first challenge information according to the embodiment in consideration of the identification information $ID_B$.

The information processing apparatus 100 generates the second challenge information Ch including the identification information $ID_B$ based on the identification information $ID_B$ and the first challenge information Ch' transmitted from the verification processing apparatus 200 ((C) illustrated in FIG. 27). Then, the information processing apparatus 100 generates the response information σ based on the generated second challenge information Ch, as in step S716 of FIG. 25, and transmits the response information σ to the verification processing apparatus 200, as in step S718 of FIG. 25.

The verification processing apparatus 200 generates the second challenge information Ch based on the identification information $ID_B$ and the first challenge information Ch' transmitted to the information processing apparatus 100 ((D) illustrated in FIG. 27). Then, the verification processing apparatus 200 verifies the information processing apparatus 100 based on the generated second challenge information Ch, and the response information ($t_1$, $e_1$) and the response information σ transmitted from the information processing apparatus 100, as in step S720 of FIG. 25.

For example, as illustrated in FIG. 27, the information processing apparatus 100 serving as the prover generates the second challenge information Ch including the identification information $ID_B$ and transmits the response information σ corresponding to the generated second challenge information Ch to the verification processing apparatus 200. That is, in the process illustrated in FIG. 27, the information processing apparatus 100 executes a process of including the identification information in the series of processes related to the authentication.

For example, as illustrated in FIG. 27, the verification processing apparatus 200 serving as the verifier generates the second challenge information Ch including the identification information $ID_B$ and verifies the information processing apparatus 100 based on the generated second challenge information Ch and the response information transmitted from the information processing apparatus 100. That is, in the process illustrated in FIG. 27, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 27 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 27 as the process related to the verification processing method according to the embodiment, so that, for example, the illegal authentication illustrated in C of FIG. 2 can be prevented from being executed.

Figure 28:
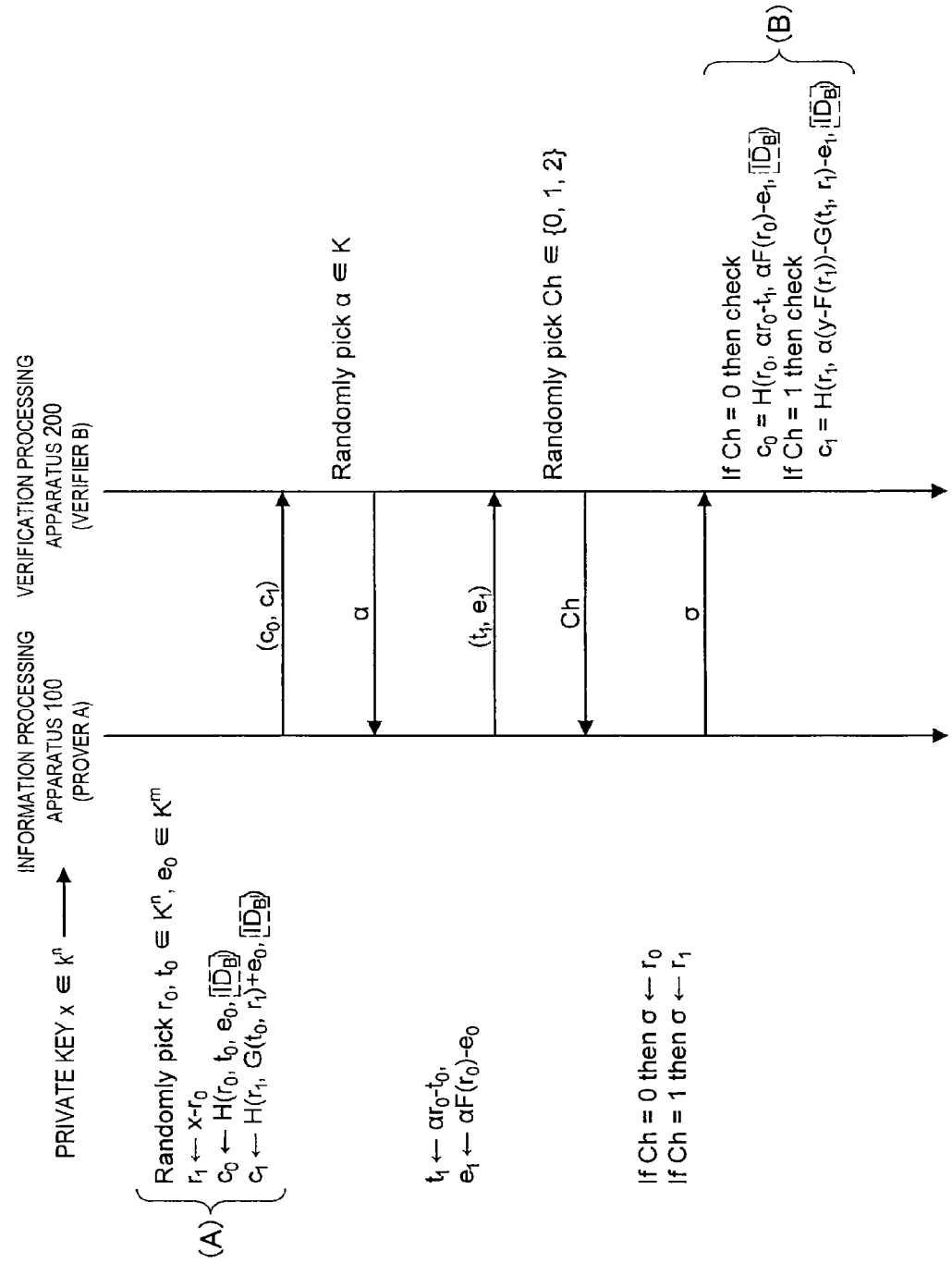
FIG. 28 is an explanatory diagram for describing a process related to the information processing method according to the embodiment and a process related to the verification processing method according to the embodiment.

[5-1-3] Second Application Example to Basic Structure Configuring MQ Authentication Scheme According to Third Example: Process of Including Identification Information in Commitment Information FIG. 28 is an explanatory diagram for describing a process related to the information processing method according to the embodiment and a process related to the verification processing method according to the embodiment. Here, FIG. 28 illustrates a second application example to the basic structure configuring the MQ authentication scheme according to the third example illustrated in FIG. 25. More specifically, FIG. 28 illustrates an example of a process of including the identification information in the commitment information in the basic structure configuring the MQ authentication scheme according to the third example illustrated in FIG. 25, and (A) and (B) of FIG. 28 illustrate differences from the process illustrated in FIG. 25. Hereinafter, the differences from the process illustrated in FIG. 25 will be mainly described.

The information processing apparatus 100 generates the commitment information including the identification information $ID_B$ ((A) illustrated in FIG. 28). Then, the information processing apparatus 100 transmits the generated commitment information including the identification information $ID_R$ to the verification processing apparatus 200, as in step S702 of FIG. 25.

The verification processing apparatus 200 verifies the information processing apparatus 100 based on the response information ($t_1$, $e_1$) and the response information σ transmitted from the information processing apparatus 100 and the identification information $ID_B$, as in steps S710 and S718 illustrated in FIG. 25 ((B) illustrated in FIG. 27). More specifically, the verification processing apparatus 200 verifies the information processing apparatus 100 by calculating a hash value based on the received response information ($t_1$, $e_1$) and response information σ and the identification information $ID_B$ and calculating a value corresponding to the parts of the information forming the commitment information, as in step S720 illustrated in FIG. 25.

For example, as illustrated in (A) of FIG. 28, the information processing apparatus 100 serving as the prover includes the identification information $ID_B$ in all of the information ($c_0$ and $c_1$) forming the commitment information. That is, in the process illustrated in FIG. 28, the information processing apparatus 100 executes a process of including the identification information in the series of processes related to the authentication.

For example, as illustrated in (B) of FIG. 28, the verification processing apparatus 200 serving as the verifier verifies the information processing apparatus 100 based on the response information ($t_1$, $e_1$) and the response information σ transmitted from the information processing apparatus 100 and the identification information $ID_B$. That is, in the process illustrated in FIG. 28, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 28 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 28 as the process related to the verification processing method according to the embodiment, so that, for example, the illegal authentication illustrated in C of FIG. 2 can be prevented from being executed.

[5-1-4] Fourth Example of Basic Structure Configuring MQ Authentication Scheme: Second Example of Basic Structure of 5-Pass Scheme of MQ Authentication Next, a fourth example (a second example of the basic structure of the 5-pass scheme of the MQ authentication) of the basic structure configuring the MQ authentication scheme will be described.

Figure 29:
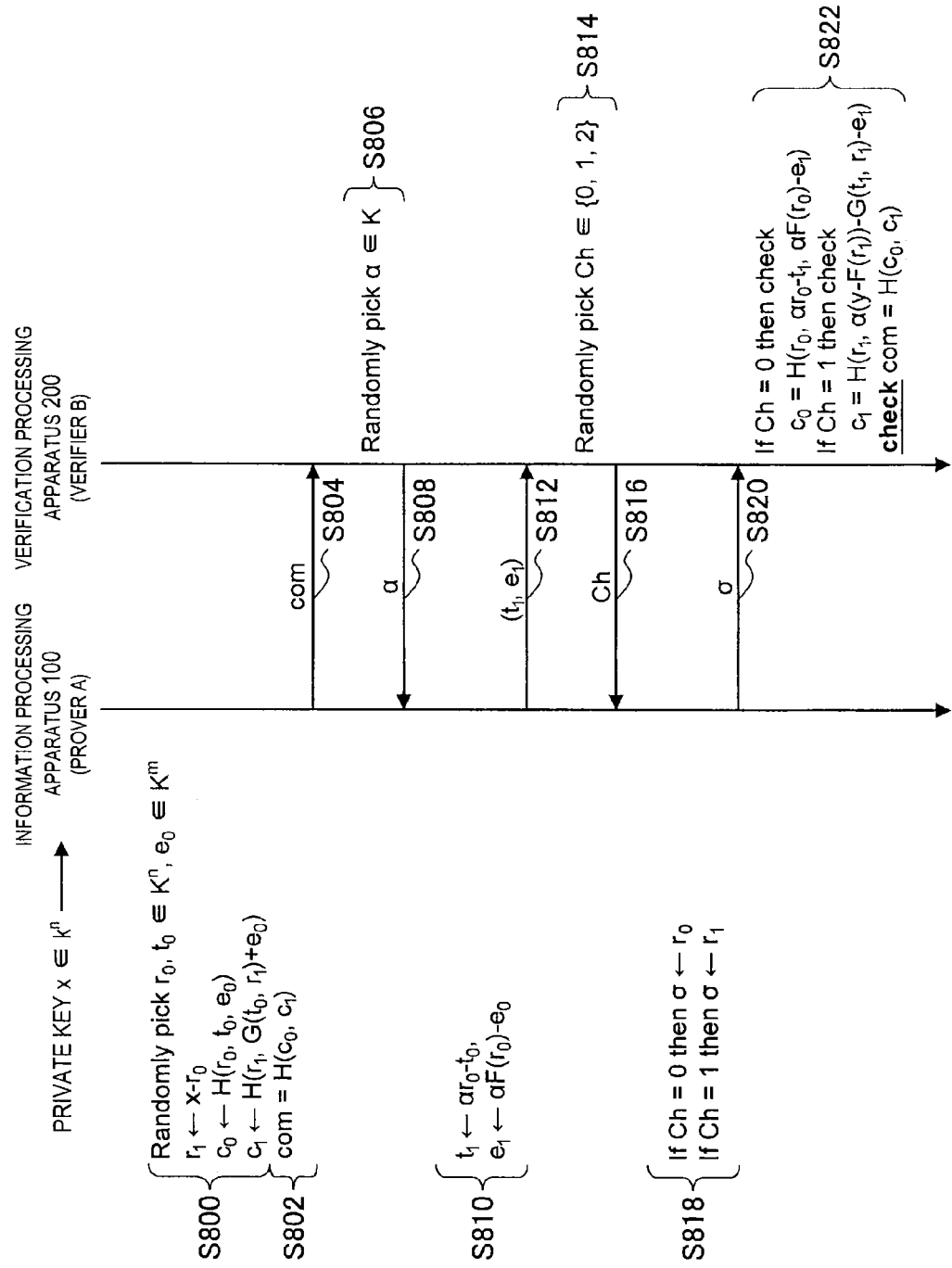
FIG. 29 is an explanatory diagram illustrating a fourth example of a basic structure configuring the MQ authentication scheme.

FIG. 29 is an explanatory diagram illustrating the fourth example of a basic structure configuring the MQ authentication scheme. Here, the process of step S804 illustrated in FIG. 29 corresponds to a process related to transmission of commitment information. The processes of steps S808 and S816 illustrated in FIG. 29 correspond to, for example, processes related to transmission of challenge information. The processes of steps S812 and S820 illustrated in FIG. 29 correspond to processes related to transmission of response information.

The information processing apparatus 100 generates variables to generate commitment information (for example, "$c_0$" and "$c_1$" illustrated in FIG. 29), as in step S700 of FIG. 25 (S800). The information processing apparatus 100 calculates a hash corn of the generated commitment information (S802). The information processing apparatus 100 transmits the hash corn of the generated commitment information to the verification processing apparatus 200 (S804).

When the verification processing apparatus 200 receives the hash com of the commitment information transmitted in step S804 from the information processing apparatus 100, the verification processing apparatus 200 generates challenge information α, as in step S704 of FIG. 25 (S806). Then, the verification processing apparatus 200 transmits the generated challenge information α to the information processing apparatus 100, as in step S706 of FIG. 25 (S808).

The information processing apparatus 100 receiving the challenge information α transmitted in step S808 from the verification processing apparatus 200 generates response information ($t_1$, $e_1$) corresponding to the value indicated by the received challenge information α, as in step S708 of FIG. 25 (S810). Then, the information processing apparatus 100 transmits the generated response information ($t_1$, $e_1$) as a response to the challenge information α to the verification processing apparatus 200, as in step S710 of FIG. 25 (S812).

When the verification processing apparatus 200 receives the response information ($t_1$, $e_1$) transmitted in step S812 from the information processing apparatus 100, the verification processing apparatus 200 generates challenge information Ch, as in step S712 of FIG. 25 (S814). Then, the verification processing apparatus 200 transmits the generated challenge information Ch to the information processing apparatus 100, as in step S714 of FIG. 25 (S816).

The information processing apparatus 100 receiving the challenge information Ch transmitted in step S816 from the verification processing apparatus 200 generates response information α corresponding to the value indicated by the received challenge information Ch, as in step S716 of FIG. 25 (S818). Then, the information processing apparatus 100 transmits the generated response information α as a response to the challenge information Ch to the verification processing apparatus 200, as in step S718 of FIG. 25 (S820).

When the verification processing apparatus 200 receives the response information α transmitted in step S820 from the information processing apparatus 100, the verification processing apparatus 200 verifies the information processing apparatus 100 based on the response information ($t_1$, $e_1$) received in step S812 and the response information α received in step S820 (S822).

Here, when the commitment information received from the information processing apparatus 100 is the hash of the commitment information, the verification processing apparatus 200 verifies the hash of the commitment information based on the response information ($t_1$, $e_1$) and the response information α. More specifically, for example, the verification processing apparatus 200 calculates a hash corresponding to the hash of the commitment information based on the response information ($t_1$, $e_1$) and the response information α. When the value of the calculated hash is identical to the value of the hash of the commitment information, the verification processing apparatus 200 authenticates the information processing apparatus 100 transmitting the response information as the genuine information processing apparatus 100.

Figure 30:
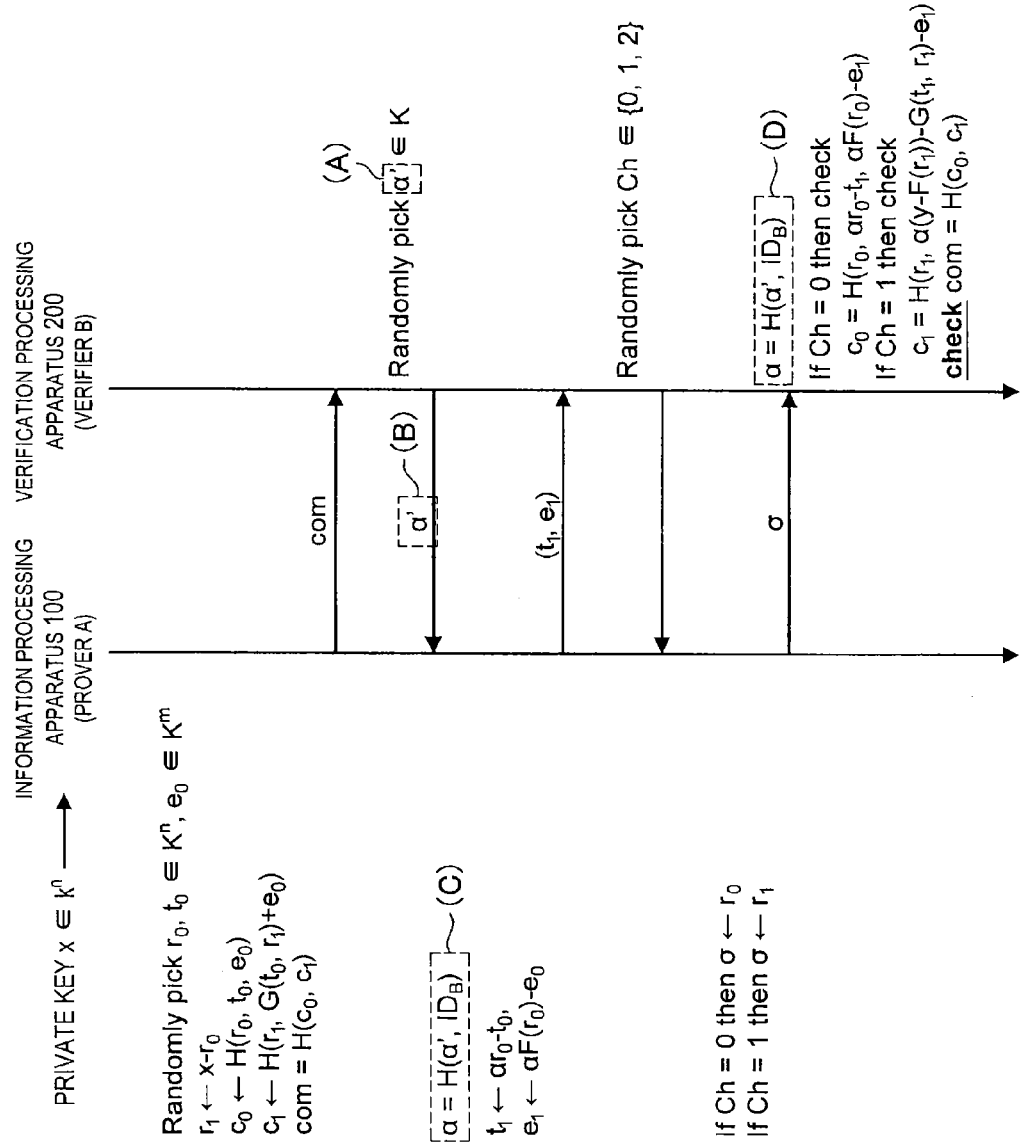
FIG. 30 is an explanatory diagram for describing a process related to the information processing method according to the embodiment and a process related to the verification processing method according to the embodiment.

[5-1-5] First Application Example to Basic Structure Configuring MQ Authentication Scheme According to Fourth Example: Process of Including Identification Information in Challenge Information FIG. 30 is an explanatory diagram for describing a process related to the information processing method according to the embodiment and a process related to the verification processing method according to the embodiment. Here, FIG. 30 illustrates a first application example to the basic structure configuring the MQ authentication scheme according to the fourth example illustrated in FIG. 29. More specifically, FIG. 30 illustrates an example of a process of including the identification information in the challenge information in the basic structure configuring the MQ authentication scheme according to the fourth example illustrated in FIG. 29, and (A) to (D) of FIG. 30 illustrate differences from the process illustrated in FIG. 29. Hereinafter, the differences from the process illustrated in FIG. 29 will be mainly described.

When the verification processing apparatus 200 receives the hash of the commitment information transmitted from the information processing apparatus 100, the verification processing apparatus 200 generates first challenge information α' ((A) illustrated in FIG. 30). Then, the verification processing apparatus 200 transmits the generated first challenge information α' to the information processing apparatus 100 ((B) illustrated in FIG. 30).

The information processing apparatus 100 generates the second challenge information α including the identification information $ID_B$ based on the identification information $ID_B$ and the first challenge information α' transmitted from the verification processing apparatus 200, as in the process of (C) illustrated in FIG. 26 ((C) illustrated in FIG. 30). Then, the information processing apparatus 100 generates the response information ($t_1$, $e_1$) based on the generated second challenge information α, as in step S810 of FIG. 29, and transmits the response information ($t_1$, $e_1$) to the verification processing apparatus 200, as in step S812 of FIG. 29.

The verification processing apparatus 200 generates the second challenge information α based on the identification information $ID_B$ and the first challenge information α' transmitted to the information processing apparatus 100, as in the process of (D) illustrated in FIG. 26 ((D) illustrated in FIG.

30). Then, the verification processing apparatus 200 verifies the information processing apparatus 100 based on the generated second challenge information α and the response information ($t_1$, $e_1$) transmitted from the information processing apparatus 100, as in step S822 of FIG. 29.

For example, as illustrated in FIG. 30, the information processing apparatus 100 serving as the prover generates the second challenge information α including the identification information $ID_B$ and transmits the response information ($t_1$, $e_1$) corresponding to the generated second challenge information α to the verification processing apparatus 200. That is, in the process illustrated in FIG. 30, the information processing apparatus 100 executes a process of including the identification information in the series of processes related to the authentication.

For example, as illustrated in FIG. 30, the verification processing apparatus 200 serving as the verifier generates the second challenge information α including the identification information $ID_B$ and verifies the information processing apparatus 100 based on the generated second challenge information α and the response information transmitted from the information processing apparatus 100. That is, in the process illustrated in FIG. 30, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 30 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 30 as the process related to the verification processing method according to the embodiment, so that, for example, the illegal authentication illustrated in C of FIG. 2 can be prevented from being executed.

A process of including the identification information in the challenge information is not limited to the process illustrated in FIG. 30.

Figure 31:
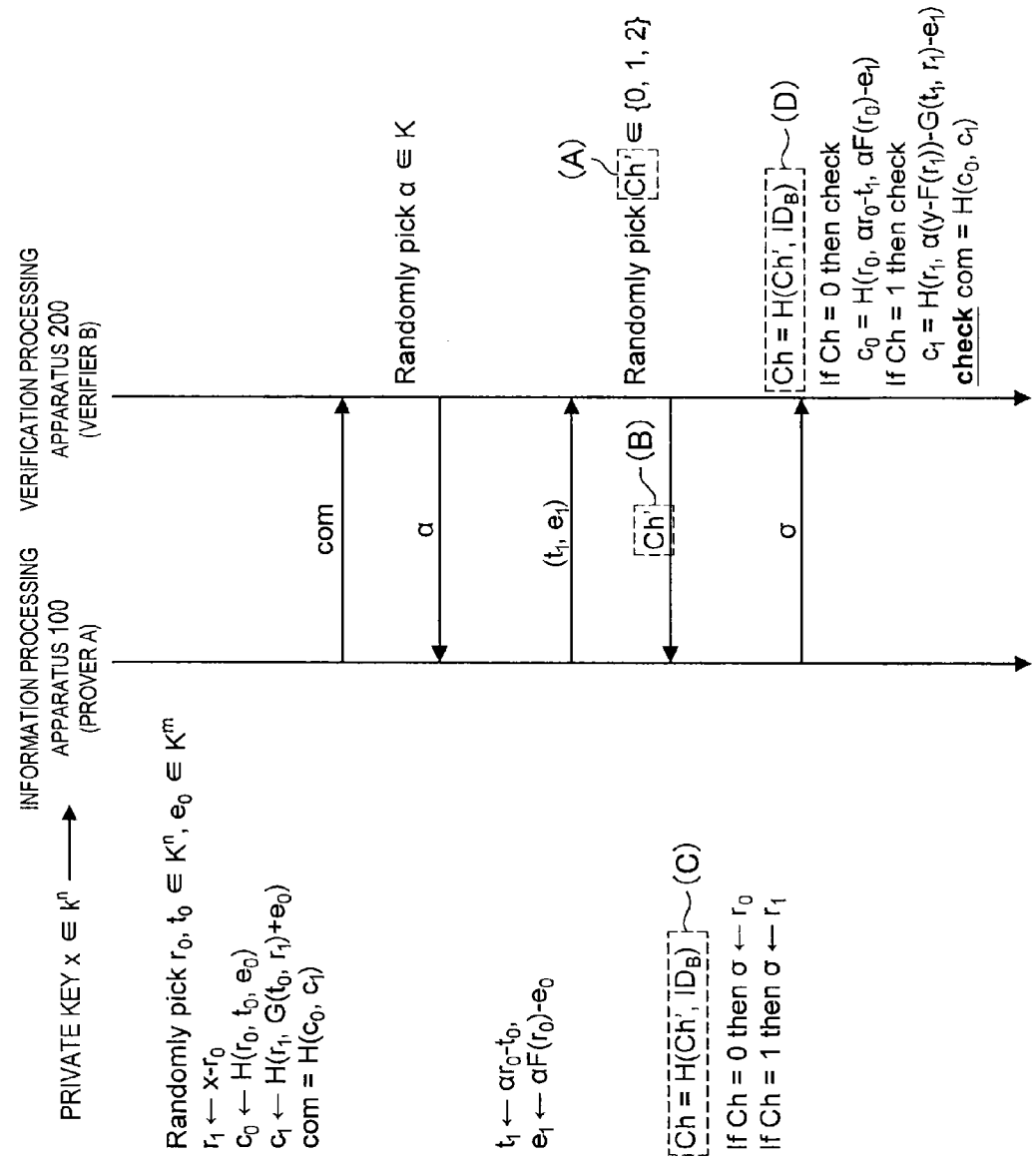
FIG. 31 is an explanatory diagram for describing a process related to the information processing method according to the embodiment and a process related to the verification processing method according to the embodiment.

FIG. 31 is an explanatory diagram for describing a process related to the information processing method according to the embodiment and a process related to the verification processing method according to the embodiment. Here, FIG. 31 illustrates a first application example to the basic structure configuring the MQ authentication scheme according to the fourth example illustrated in FIG. 29. More specifically, FIG. 31 illustrates another example of a process of including the identification information in the challenge information in the basic structure configuring the MQ authentication scheme according to the fourth example illustrated in FIG. 29, and (A) to (D) of FIG. 31 illustrate differences from the process illustrated in FIG. 29. Hereinafter, the differences from the process illustrated in FIG. 29 will be mainly described.

The verification processing apparatus 200 generates first challenge information Ch' based on the response information ($t_1$, $e_1$) transmitted from the information processing apparatus 100, as in the process illustrated in (A) of FIG. 27 ((A) of FIG. 31). Then, the verification processing apparatus 200 transmits the generated first challenge information Ch' to the information processing apparatus 100, as in the process of (B) illustrated in FIG. 27 ((B) of FIG. 31).

The information processing apparatus 100 generates the second challenge information Ch including the identification information $ID_B$ based on the identification information $ID_B$ and the first challenge information Ch' transmitted from the verification processing apparatus 200, as in the process of (C) illustrated in FIG. 27 ((C) illustrated in FIG. 31). Then, the information processing apparatus 100 generates the response information σ based on the generated second challenge information Ch, as in step S716 of FIG. 25, and transmits the response information σ to the verification processing apparatus 200, as in step S718 of FIG. 25.

The verification processing apparatus 200 generates the second challenge information Ch based on the identification information $ID_B$ and the first challenge information Ch' transmitted to the information processing apparatus 100, as in the process of (D) illustrated in FIG. 27 ((D) illustrated in FIG. 31). Then, the verification processing apparatus 200 verifies the information processing apparatus 100 based on the generated second challenge information Ch, and the response information ($t_1$, $e_1$) and the response information σ transmitted from the information processing apparatus 100, as in step S720 of FIG. 25.

For example, as illustrated in FIG. 31, the information processing apparatus 100 serving as the prover generates the second challenge information Ch including the identification information $ID_B$ and transmits the response information σ corresponding to the generated second challenge information Ch to the verification processing apparatus 200. That is, in the process illustrated in FIG. 31, the information processing apparatus 100 executes a process of including the identification information in the series of processes related to the authentication.

For example, as illustrated in FIG. 31, the verification processing apparatus 200 serving as the verifier generates the second challenge information Ch including the identification information $ID_B$ and verifies the information processing apparatus 100 based on the generated second challenge information Ch and the response information transmitted from the information processing apparatus 100. That is, in the process illustrated in FIG. 31, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 31 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 31 as the process related to the verification processing method according to the embodiment, so that, for example, the illegal authentication illustrated in C of FIG. 2 can be prevented from being executed.

Figure 32:
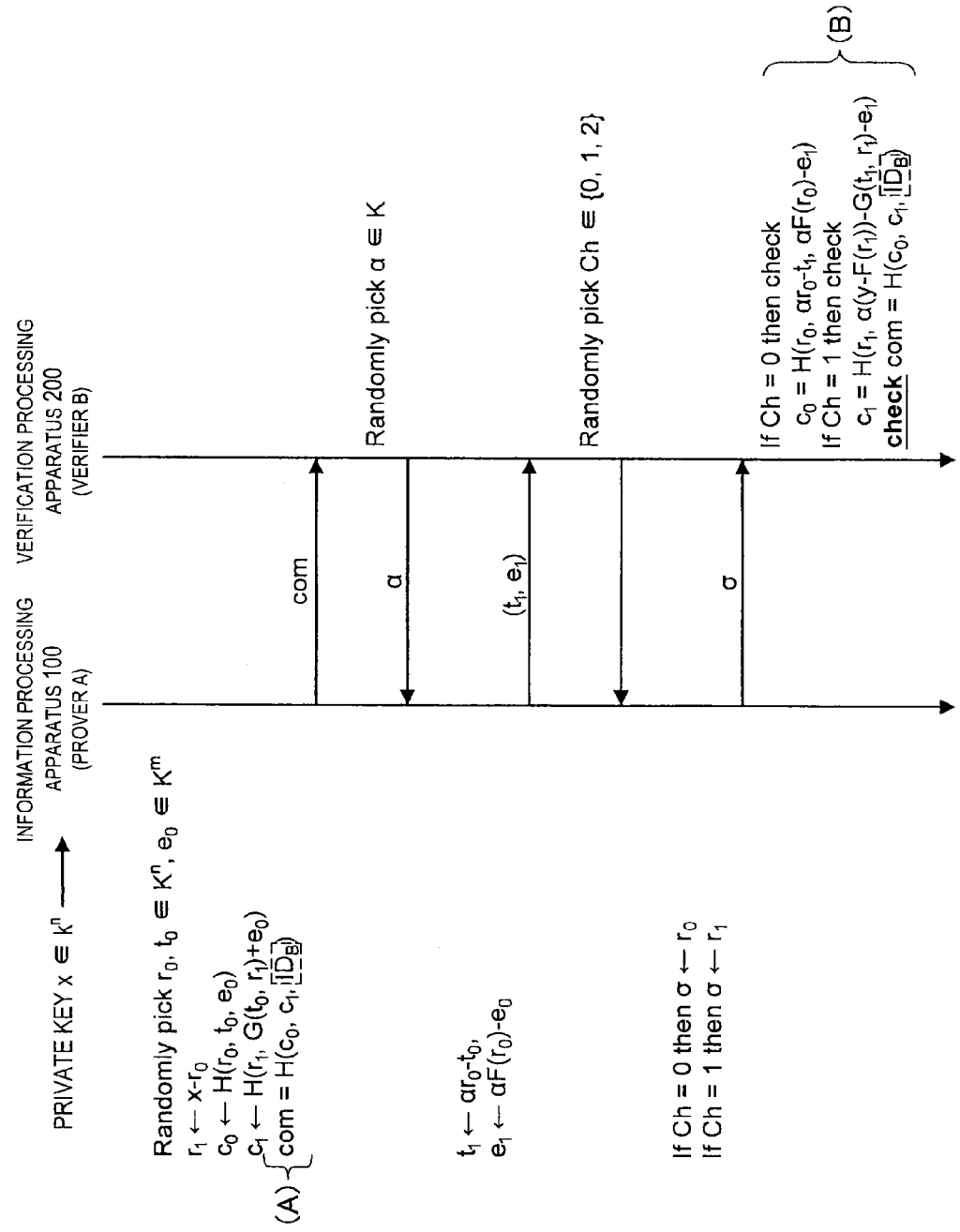
FIG. 32 is an explanatory diagram for describing a process related to the information processing method according to the embodiment and a process related to the verification processing method according to the embodiment.

[5-1-6] Second Application Example to Basic Structure Configuring MQ Authentication Scheme According to Fourth Example: Process of Including Identification Information in Commitment Information FIG. 32 is an explanatory diagram for describing a process related to the information processing method according to the embodiment and a process related to the verification processing method according to the embodiment. Here, FIG. 32 illustrates a second application example to the basic structure configuring the MQ authentication scheme according to the fourth example illustrated in FIG. 29. More specifically, FIG. 32 illustrates an example of a process of including the identification information in the commitment information in the basic structure configuring the MQ authentication scheme according to the fourth example illustrated in FIG. 29, and (A) and (B) illustrated in FIG. 32 illustrate differences from the process illustrated in FIG. 29. Hereinafter, the differences from the process illustrated in FIG. 29 will be mainly described.

The information processing apparatus 100 generates a hash of the commitment information including the identification information $ID_B$ ((A) illustrated in FIG. 32). Then, the information processing apparatus 100 transmits the generated hash of the commitment information including the identification information $ID_B$ to the verification processing apparatus 200, as in step S704 of FIG. 29.

The verification processing apparatus 200 verifies the information processing apparatus 100 based on the response information $(t_1, e_1)$ and the response information σ transmitted from the information processing apparatus 100 and the identification information $ID_B$, as in steps S812 and S820 illustrated in FIG. 29 ((B) illustrated in FIG. 32). More specifically, for example, the verification processing apparatus 200 calculates a hash corresponding to the hash of the commitment information based on the response information $(t_1, e_1)$, the response information σ, and the identification information $ID_B$. Then, for example, when the value of the calculated hash is identical to the value of the hash of the commitment information, the verification processing apparatus 200 authenticates the information processing apparatus 100 having transmitted the response information as the genuine information processing apparatus 100.

For example, as illustrated in (A) of FIG. 32, the information processing apparatus 100 serving as the prover includes the identification information $ID_B$ in the hash of the commitment information. That is, in the process illustrated in FIG. 32, the information processing apparatus 100 executes a process of including the identification information in the series of processes related to the authentication.

For example, as illustrated in (B) of FIG. 32, the verification processing apparatus 200 serving as the verifier verifies the information processing apparatus 100 based on the response information $(t_1, e_1)$ and the response information σ transmitted from the information processing apparatus 100 and the identification information $ID_B$. That is, in the process illustrated in FIG. 32, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 32 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 32 as the process related to the verification processing method according to the embodiment, so that, for example, the illegal authentication illustrated in C of FIG. 2 can be prevented from being executed.

[5-1-7] Application Example to MQ Authentication Scheme to which Basic Structure According to Third Example is Applied and Application Example to MQ Authentication Scheme to which Basic Structure According to Fourth Example is Applied The basic structure according to the third example and the basic structure according to the fourth example related to the 5-pass scheme of the MQ authentication can be applied to a parallelization process and a serialization process, respectively, as in the basic structure related to the 3-pass scheme of the MQ authentication described above.

[5-2] Second Expansion Example: Designation of Identification Information by Prover The process related to the information processing method according to the embodiment and the process related to the verification processing method according to the embodiment have been described above exemplifying the case in which the identification information $ID_B$ according to the embodiment is shared in advance by the information processing apparatus 100 and the verification processing apparatus 200. However, as described above, the identification information $ID_B$ according to the embodiment is not limited to the case in which the identification information $ID_B$ is shared in advance by the information processing apparatus 100 and the verification processing apparatus 200. As described above, the identification information $ID_B$ according to the embodiment may be shared when the information processing apparatus 100 transmits the identification information $ID_B$ to the verification processing apparatus 200 in a series of processes related to authentication. Thus, next, an example of a process when the identification information $ID_B$ according to the embodiment is shared by transmitting the identification information $ID_B$ to the verification processing apparatus 200 by the information processing apparatus 100 in a series of processes related to authentication will be described.

Figure 33:
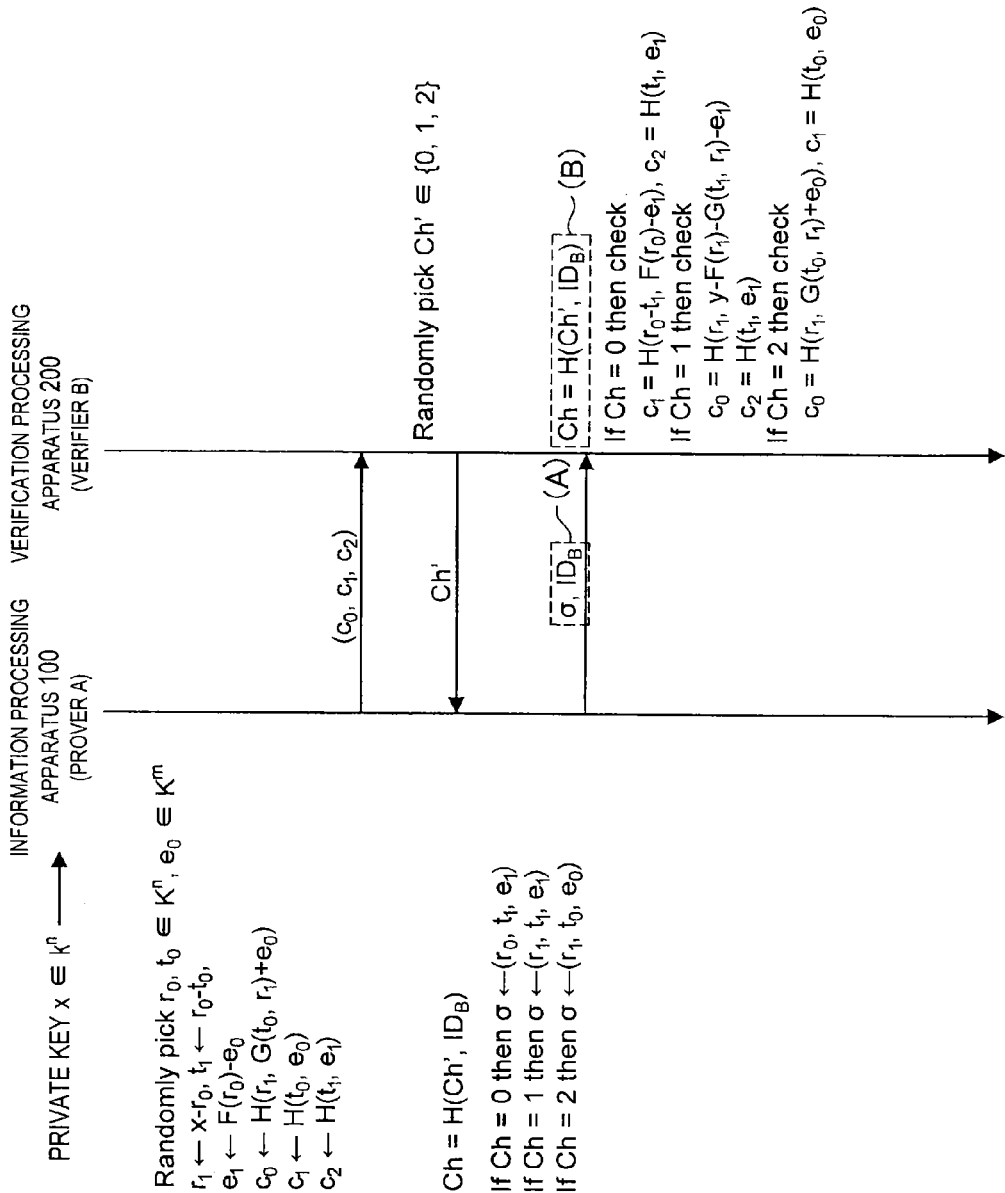
FIG. 33 is an explanatory diagram for describing a process related to the information processing method according to the embodiment and a process related to the verification processing method according to the embodiment.

[5-2-1] First Example of Process Related to Sharing of Identification Information $ID_B$ FIG. 33 is an explanatory diagram for describing a process related to the information processing method according to the embodiment and a process related to the verification processing method according to the embodiment. Here, FIG. 33 illustrates an example of a process related to the sharing of the identification information $ID_B$ in "a first application example to the basic structure configuring the MQ authentication scheme according to the first example" illustrated in FIG. 5. (A) and (B) of FIG. 33 illustrate differences from the process illustrated in FIG. 5. Hereinafter, the differences from the process illustrated in FIG. 5 will be mainly described.

The information processing apparatus 100 generates second challenge information Ch including the identification information $ID_B$ based on the identification information $ID_B$ and the first challenge information Ch' transmitted from the verification processing apparatus 200, as in the process illustrated in (C) of FIG. 5. Then, the information processing apparatus 100 generates the response information σ based on the generated second challenge information Ch and transmits the generated response information σ and the identification information $ID_B$ to the verification processing apparatus 200, as in step S108 of FIG. 4 ((A) illustrated in FIG. 33).

The verification processing apparatus 200 generates the second challenge information Ch based on the identification information $ID_B$ transmitted from the information processing apparatus 100 and the first challenge information Ch' transmitted to the information processing apparatus 100 ((B) illustrated in FIG. 33). Then, the verification processing apparatus 200 verifies the information processing apparatus 100 based on the generated second challenge information Ch and the response information σ transmitted from the information processing apparatus 100 in regard to the transmitted first challenge information Ch' as in step S112 of FIG. 4.

As illustrated in FIG. 33, the information processing apparatus 100 transmits the identification information $ID_B$ along with the response information to the verification processing apparatus 200, and the verification processing apparatus 200 performs the process related to the verification based on the identification information $ID_B$ transmitted from the information processing apparatus 100. That is, in the example illustrated in FIG. 33, the identification information $ID_B$ used in the process related to the verification by the verification processing apparatus 200 is transmitted along with the response information from the information processing apparatus 100.

Here, the verification processing apparatus 200 directly uses the identification information $ID_B$ transmitted from the information processing apparatus 100 in the process related to the verification, but the process in the verification processing apparatus 200 is not limited to the foregoing example. For example, the verification processing apparatus 200 may verify the identification information $ID_B$ transmitted from the information processing apparatus 100, and then may use the identification information $ID_B$ in the process related to the verification when the identification information $ID_B$ is verified normally.

The verification processing apparatus 200 verifies the identification information $ID_B$ transmitted from the information processing apparatus 100, for example, by matching normal identification information recorded in a database with the identification information $ID_B$ transmitted from the information processing apparatus 100. Further, the verification processing apparatus 200 may verify the identification information $ID_B$ transmitted from the information processing apparatus 100 by estimating normal identification information from a URL, an ID, a MAC address, or the like corresponding to the self-apparatus and matching the estimated identification information with the identification information $ID_B$ transmitted from the information processing apparatus 100.

For example, as illustrated in FIG. 33, the information processing apparatus 100 serving as the prover generates second challenge information Ch including the identification information $ID_B$, as in FIG. 5. For example, as illustrated in FIG. 33, the information processing apparatus 100 transmits response information corresponding to the generated second challenge information Ch and the identification information $ID_B$ to the verification processing apparatus 200. That is, in the process illustrated in FIG. 33, the information processing apparatus 100 performs a process of including the identification information in the series of processes related to the authentication.

For example, as illustrated in (B) of FIG. 33, the verification processing apparatus 200 serving as the verifier generates the second challenge information Ch including the identification information $ID_B$ transmitted from the information processing apparatus 100 and verifies the information processing apparatus 100 based on the generated second challenge information Ch and the response information transmitted from the information processing apparatus 100. That is, in the process illustrated in FIG. 33, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 33 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 33 as the process related to the verification processing method according to the embodiment, so that, for example, the illegal authentication illustrated in C of FIG. 2 can be prevented from being executed.

Figure 34:
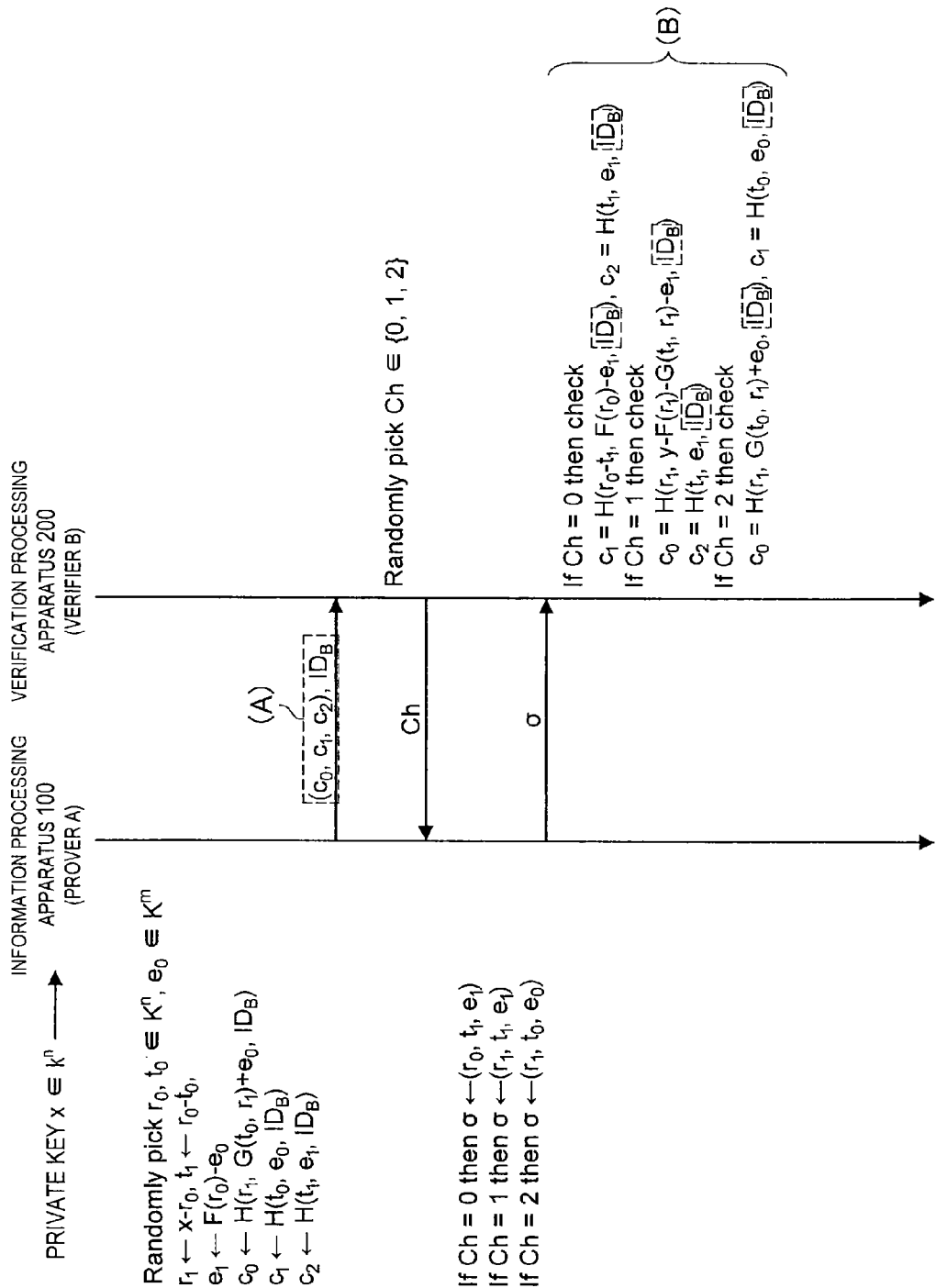
FIG. 34 is an explanatory diagram for describing a process related to the information processing method according to the embodiment and a process related to the verification processing method according to the embodiment.

[5-2-2] Second Example of Process Related to Sharing of Identification Information $ID_B$ FIG. 34 is an explanatory diagram for describing a process related to the information processing method according to the embodiment and a process related to the verification processing method according to the embodiment. Here, FIG. 34 illustrates an example of a process related to the sharing of the identification information $ID_B$ in "the second application example to the basic structure configuring the MQ authentication scheme according to the first example" illustrated in FIG. 6. (A) and (B) illustrated in FIG. 34 illustrate differences from the process illustrated in FIG. 6. Hereinafter, the differences from the process illustrated in FIG. 6 will be mainly described.

The information processing apparatus 100 generates commitment information including the identification information $ID_B$, as in the process illustrated in (A) of FIG. 6. Then, the information processing apparatus 100 transmits the identification information $ID_B$ and the generated commitment information including the identification information $ID_B$ to the verification processing apparatus 200 ((A) illustrated in FIG. 34).

As in the process illustrated in (B) of FIG. 6, the verification processing apparatus 200 verifies the information processing apparatus 100 based on the identification information $ID_B$ transmitted from the information processing apparatus 100 and the response information σ transmitted from the information processing apparatus 100, as in step S110 illustrated in FIG. 4 ((B) illustrated in FIG. 34).

As illustrated in FIG. 34, the information processing apparatus 100 transmits the identification information $ID_B$ along with the commitment information to the verification processing apparatus 200, and the verification processing apparatus 200 performs the process related to the verification based on the identification information $ID_B$ transmitted from the information processing apparatus 100. That is, in the example illustrated in FIG. 34, the identification information $ID_B$ used in the process related to the verification by the verification processing apparatus 200 is transmitted along with the commitment information from the information processing apparatus 100.

Here, the verification processing apparatus 200 directly uses the identification information $ID_B$ transmitted from the information processing apparatus 100 in the process related to the verification, but the process in the verification processing apparatus 200 is not limited to the foregoing example. For example, the verification processing apparatus 200 may verify the identification information $ID_B$ transmitted from the information processing apparatus 100, and then may use the identification information $ID_B$ in the process related to the verification when the identification information $ID_B$ is verified normally.

For example, as illustrated in FIG. 34, the information processing apparatus 100 serving as the prover includes the identification information $ID_B$ in all of the information ($c_0$, $c_1$, and $c_2$) forming the commitment information, as in FIG. 6. That is, in the process illustrated in FIG. 34, the information processing apparatus 100 performs a process of including the identification information in the series of processes related to the authentication.

For example, as illustrated in FIG. 34, the verification processing apparatus 200 serving as the verifier verifies the information processing apparatus 100 based on the response a transmitted from the information processing apparatus 100 in regard to the challenge information Ch and the identification information $ID_B$ transmitted from the information processing apparatus 100. That is, in the process illustrated in FIG. 34, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 34 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 34 as the process related to the verification processing method according to the embodiment, so that, for example, the illegal authentication illustrated in C of FIG. 2 can be prevented from being executed.

The process related to the sharing of the identification information $ID_B$ realized by transmitting the identification information $ID_B$ along with the commitment information to the verification processing apparatus 200 is not limited to the process illustrated in FIG. 34.

Figure 35:
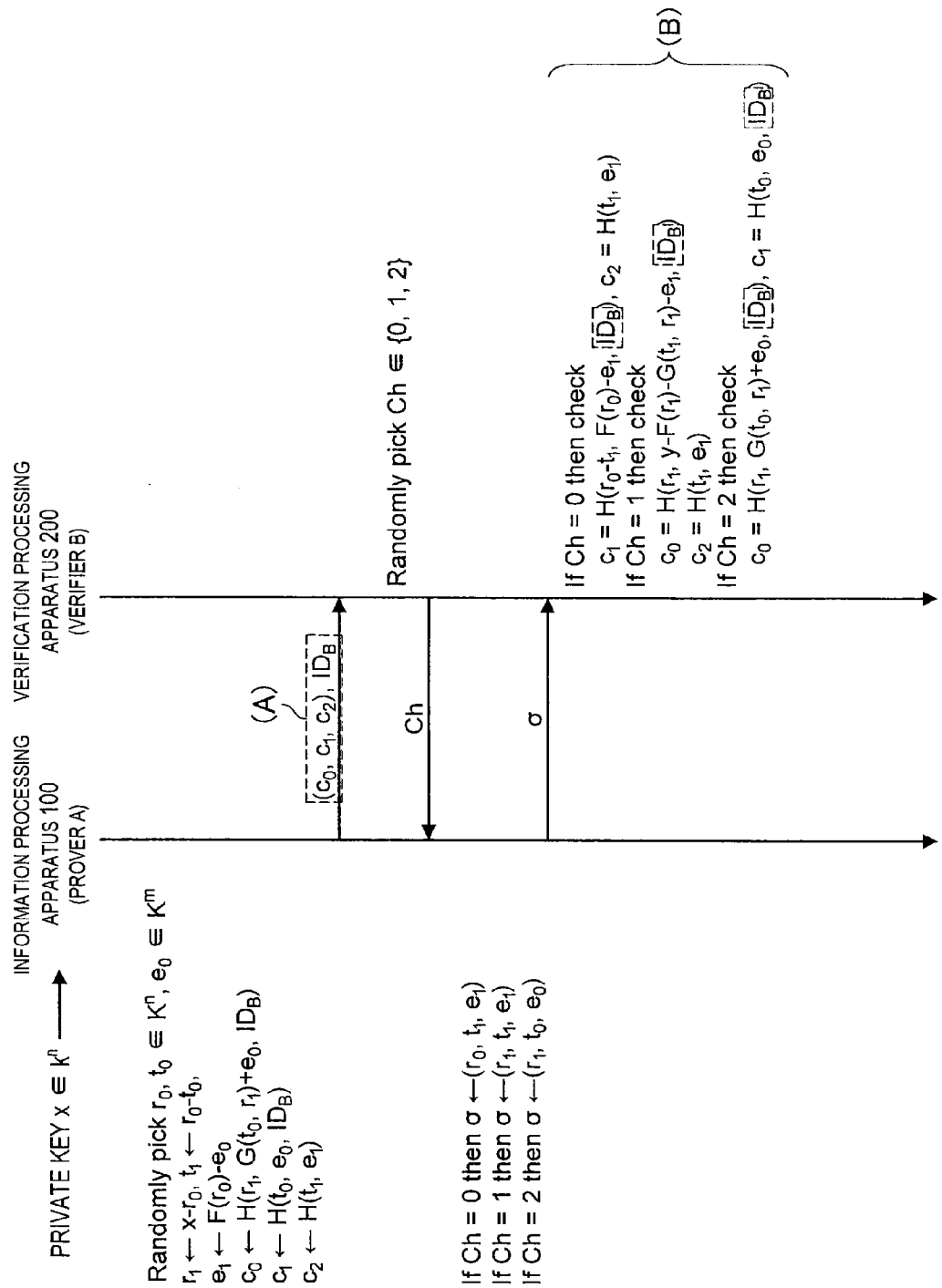
FIG. 35 is an explanatory diagram for describing a process related to the information processing method according to the embodiment and a process related to the verification processing method according to the embodiment.

FIG. 35 is an explanatory diagram for describing a process related to the information processing method according to the embodiment and a process related to the verification processing method according to the embodiment. Here, FIG. 35 illustrates an example of a process related to the sharing of the identification information $ID_B$ in "the second application example to the basic structure configuring the MQ authentication scheme according to the first example" illustrated in FIG. 7. (A) and (B) illustrated in FIG. 35 illustrate differences from the process illustrated in FIG. 7. Hereinafter, the differences from the process illustrated in FIG. 7 will be mainly described.

The information processing apparatus 100 generates commitment information including the identification information $ID_B$, as in the process illustrated in (A) of FIG. 7. Then, the information processing apparatus 100 transmits the identification information $ID_B$ and the generated commitment information including the identification information $ID_B$ to the verification processing apparatus 200, as in the process illustrated in (A) of FIG. 34 ((A) illustrated in FIG. 35).

As in the process illustrated in (B) of FIG. 7, the verification processing apparatus 200 verifies the information processing apparatus 100 based on the identification information $ID_B$ transmitted from the information processing apparatus 100 and the response information σ transmitted from the information processing apparatus 100, as in step S110 illustrated in FIG. 4 ((B) illustrated in FIG. 35).

For example, as illustrated in FIG. 35, the information processing apparatus 100 serving as the prover includes the identification information $ID_B$ in parts (for example, $c_0$ and $c_1$) of the information forming the commitment information. That is, in the process illustrated in FIG. 35, the information processing apparatus 100 performs a process of including the identification information in the series of processes related to the authentication.

For example, as illustrated in FIG. 35, the verification processing apparatus 200 serving as the verifier verifies the information processing apparatus 100 based on the response information σ transmitted from the information processing apparatus 100 in regard to the challenge information Ch and the identification information $ID_B$ transmitted from the information processing apparatus 100. At this time, the verification processing apparatus 200 verifies the parts of the information forming the commitment information based on the identification information $ID_B$. That is, in the process illustrated in FIG. 35, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 35 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 35 as the process related to the verification processing method according to the embodiment, so that, for example, the illegal authentication illustrated in C of FIG. 2 can be prevented from being executed.

Figure 36:
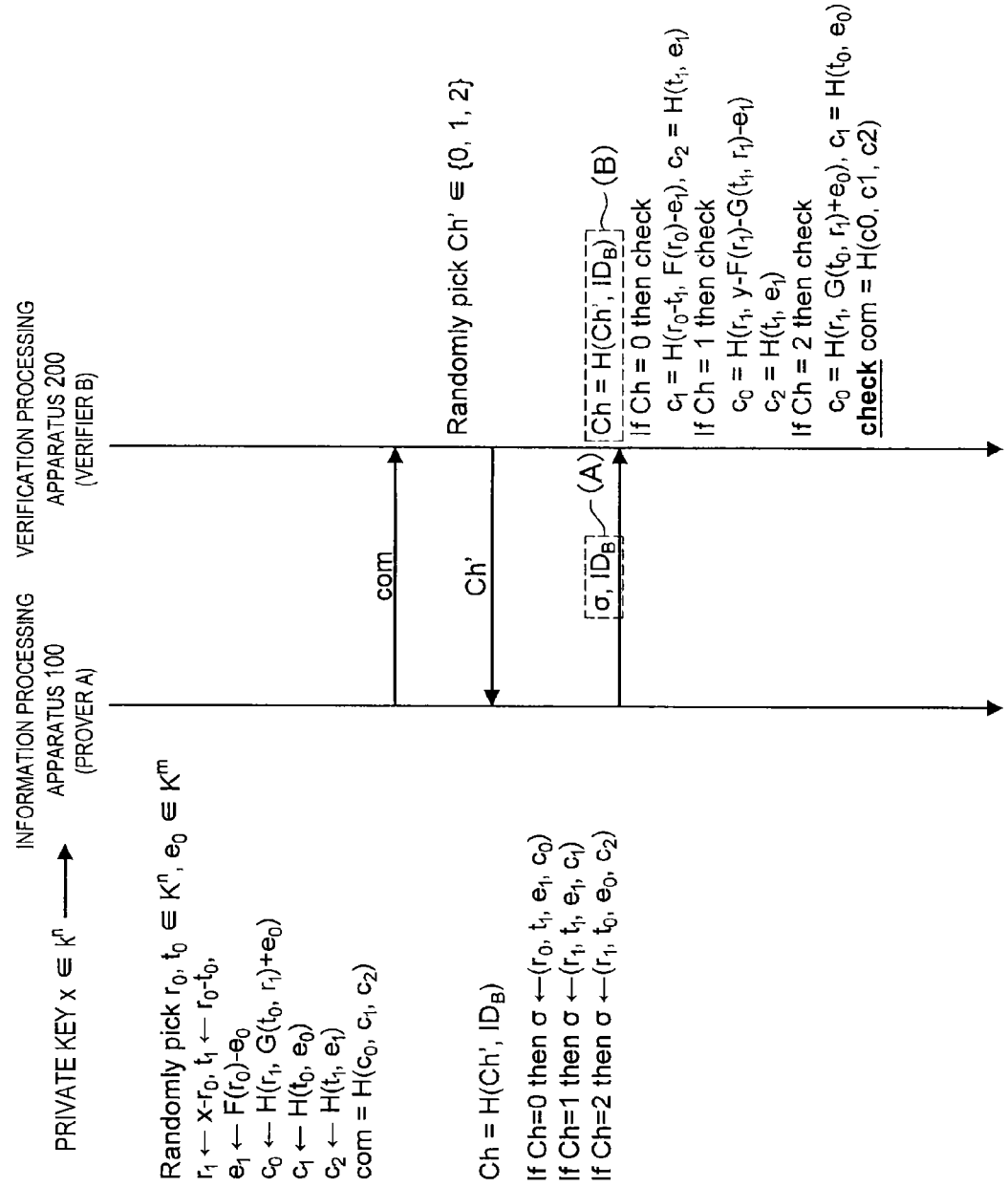
FIG. 36 is an explanatory diagram for describing a process related to the information processing method according to the embodiment and a process related to the verification processing method according to the embodiment.

[5-2-3] Third Example of Process Related to Sharing of Identification Information $ID_B$ FIG. 36 is an explanatory diagram for describing a process related to the information processing method according to the embodiment and a process related to the verification processing method according to the embodiment. Here, FIG. 36 illustrates an example of a process related to the sharing of the identification information $ID_B$ in "the first application example to the basic structure configuring the MQ authentication scheme according to the second example" illustrated in FIG. 9. (A) and (B) illustrated in FIG. 36 illustrate differences from the process illustrated in FIG. 9. Hereinafter, the differences from the process illustrated in FIG. 9 will be mainly described.

The information processing apparatus 100 generates second challenge information Ch including the identification information $ID_B$ based on the identification information $ID_B$ and the first challenge information Ch' transmitted from the verification processing apparatus 200, as in the process illustrated in (C) of FIG. 9. Then, the information processing apparatus 100 generates response information based on the generated second challenge information Ch, as in step S210 of FIG. 8, and transmits the generated response information σ and the identification information $ID_B$ to the verification processing apparatus 200 ((A) illustrated in FIG. 36).

The verification processing apparatus 200 generates second challenge information Ch based on the first challenge information Ch' transmitted to the information processing apparatus 100 and the identification information $ID_B$ transmitted from the information processing apparatus 100, as in the process of (D) illustrated in FIG. 9 ((B) illustrated in FIG. 36). Then, the verification processing apparatus 200 verifies the information processing apparatus 100 based on the generated second challenge information Ch and the response information σ transmitted from the information processing apparatus 100 in regard to the transmitted first challenge information Ch', as in step S214 illustrated in FIG. 8.

As illustrated in FIG. 36, the information processing apparatus 100 transmits the identification information $ID_B$ along with the response information to the verification processing apparatus 200, and the verification processing apparatus 200 performs the process related to the verification based on the identification information $ID_B$ transmitted from the information processing apparatus 100. That is, in the example illustrated in FIG. 36, the identification information $ID_B$ used in the process related to the verification by the verification processing apparatus 200 is transmitted along with the response information from the information processing apparatus 100.

Here, the verification processing apparatus 200 directly uses the identification information $ID_B$ transmitted from the information processing apparatus 100 in the process related to the verification, but the process in the verification processing apparatus 200 is not limited to the foregoing example. For example, the verification processing apparatus 200 may verify the identification information $ID_B$ transmitted from the information processing apparatus 100, and then may use the identification information $ID_B$ in the process related to the verification when the identification information $ID_B$ is verified normally.

For example, as illustrated in FIG. 36, the information processing apparatus 100 serving as the prover generates second challenge information Ch including the identification information $ID_B$ and transmits the identification information $ID_B$ and the response information corresponding to the generated second challenge information Ch to the verification processing apparatus 200. That is, in the process illustrated in FIG. 36, the information processing apparatus 100 performs a process of including the identification information in the series of processes related to the authentication.

For example, as illustrated in FIG. 36, the verification processing apparatus 200 serving as the verifier generates the second challenge information Ch including the identification information $ID_B$ transmitted from the information processing apparatus 100. Then, the verification processing apparatus 200 verifies the information processing apparatus 100 based on the generated second challenge information Ch and the response information transmitted from the information processing apparatus 100. That is, in the process illustrated in FIG. 36, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 36 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 36 as the process related to the verification processing method according to the embodiment, so that, for example, the illegal authentication illustrated in C of FIG. 2 can be prevented from being executed.

Figure 37:
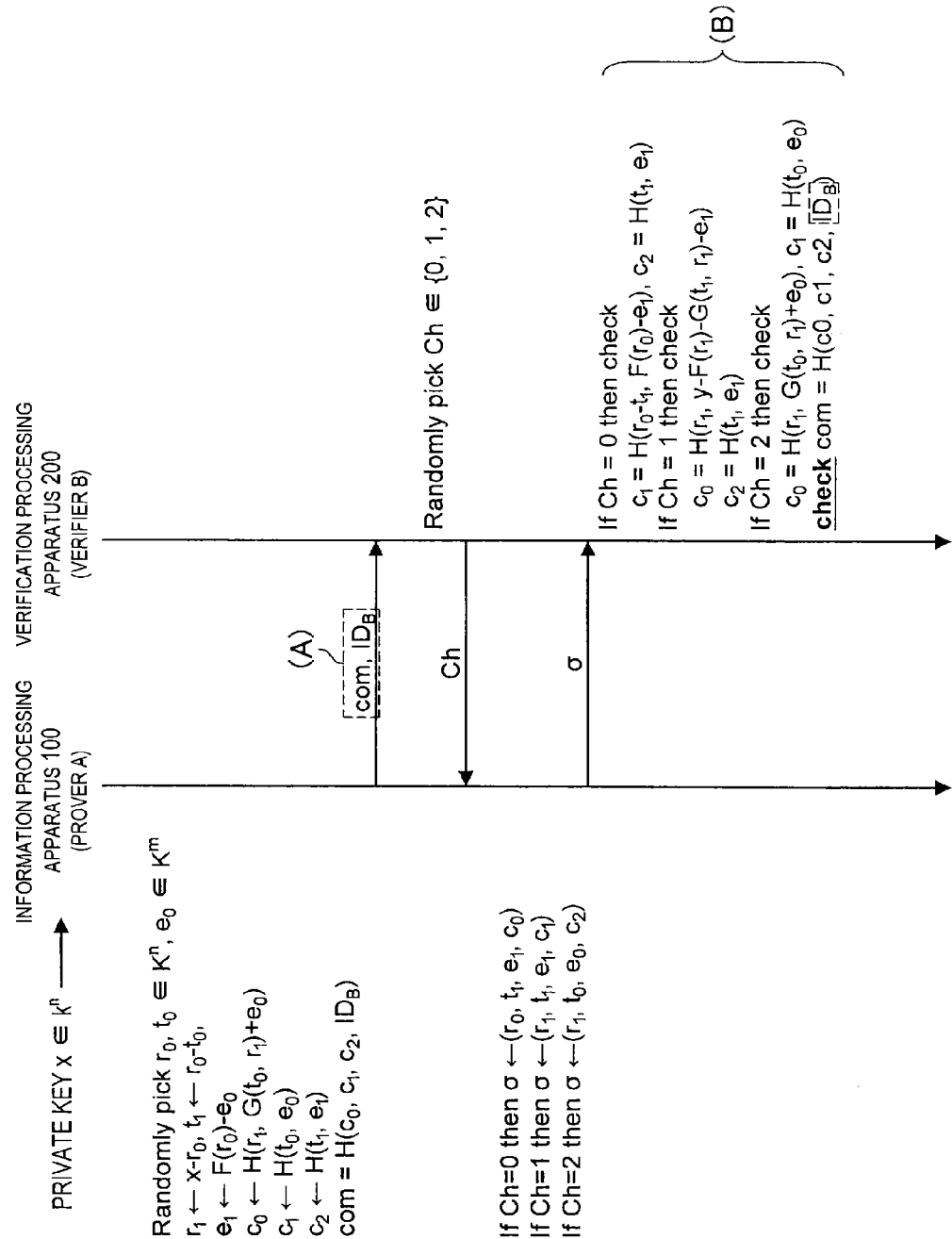
FIG. 37 is an explanatory diagram for describing a process related to the information processing method according to the embodiment and a process related to the verification processing method according to the embodiment.

[5-2-4] Fourth Example of Process Related to Sharing of Identification Information $ID_B$ FIG. 37 is an explanatory diagram for describing a process related to the information processing method according to the embodiment and a process related to the verification processing method according to the embodiment. Here, FIG. 37 illustrates an example of a process related to the sharing of the identification information $ID_B$ in "the second application example to the basic structure configuring the MQ authentication scheme according to the second example" illustrated in FIG. 10. (A) and (B) illustrated in FIG. 37 illustrate differences from the process illustrated in FIG. 10. Hereinafter, the differences from the process illustrated in FIG. 10 will be mainly described.

The information processing apparatus 100 generates a hash coin of the commitment information including the identification information $ID_B$, as in the process illustrated in (A) of FIG. 10. Then, the information processing apparatus 100 transmits the identification information $ID_B$ and the generated hash corn of the commitment information including the identification information $ID_B$ to the verification processing apparatus 200 ((A) illustrated in FIG. 37).

As in the process illustrated in (A) of FIG. 10, the verification processing apparatus 200 verifies the information processing apparatus 100 based on the response information σ transmitted from the information processing apparatus 100 and the identification information $ID_B$ transmitted from the information processing apparatus 100, as in step S212 illustrated in FIG. 8 ((B) illustrated in FIG. 37).

As illustrated in FIG. 37, the information processing apparatus 100 transmits the identification information $ID_B$ along with the hash corn of the commitment information to the verification processing apparatus 200, and the verification processing apparatus 200 performs the process related to the verification based on the identification information $ID_B$ transmitted from the information processing apparatus 100. That is, in the example illustrated in FIG. 37, the identification information $ID_B$ used in the process related to the verification by the verification processing apparatus 200 is transmitted along with the hash of the commitment information from the information processing apparatus 100.

Here, the verification processing apparatus 200 directly uses the identification information $ID_B$ transmitted from the information processing apparatus 100 in the process related to the verification, but the process in the verification processing apparatus 200 is not limited to the foregoing example. For example, the verification processing apparatus

200 may verify the identification information $ID_B$ transmitted from the information processing apparatus 100, and then may use the identification information $ID_B$ in the process related to the verification when the identification information $ID_B$ is verified normally.

For example, as illustrated in FIG. 37, the information processing apparatus 100 serving as the prover includes the identification information $ID_B$ in the hash corn of the commitment information. That is, in the process illustrated in FIG. 37, the information processing apparatus 100 performs a process of including the identification information in the series of processes related to the authentication.

For example, as illustrated in FIG. 37, the verification processing apparatus 200 serving as the verifier verifies the information processing apparatus 100 based on the response information σ transmitted from the information processing apparatus 100 in regard to the challenge information Ch and the identification information $ID_B$ transmitted from the information processing apparatus 100. That is, in the process illustrated in FIG. 37, the verification processing apparatus 200 executes the verification on the received information including the identification information. Accordingly, the verification processing apparatus 200 can authenticate the information processing apparatus 100 while confirming whether the information received from the information processing apparatus 100 is information (information used for the self-apparatus to execute the authentication) destined for the self-apparatus.

Accordingly, the information processing apparatus 100 executes, for example, the process illustrated in FIG. 37 as the process related to the information processing method according to the embodiment, so that, for example, the illegal authentication illustrated in C of FIG. 2 can be prevented from being executed in the verification processing apparatus 200. Further, the verification processing apparatus 200 executes, for example, the process illustrated in FIG. 37 as the process related to the verification processing method according to the embodiment, so that, for example, the illegal authentication illustrated in C of FIG. 2 can be prevented from being executed.

[5-2-4] Application Example to MQ Authentication Scheme of Process Related to Sharing of Identification Information $ID_B$ As described in the process related to the sharing of the identification information $ID_B$ according to the first example to the process related to the sharing of the identification information $ID_B$ according to the fourth example, for example, the information processing apparatus 100 transmits the identification information $ID_B$ according to the embodiment along with the commitment information or the response information to the verification processing apparatus 200. Then, the verification processing apparatus 200 performs the process related to the verification based on the identification information $ID_B$ transmitted from the information processing apparatus 100 along with the commitment information or the response information.

Here, the process related to the sharing of the identification information $ID_B$ in the basic structure (3-pass) configuring the MQ authentication scheme has been described above as an example. However, the process related to the sharing of the identification information $ID_B$ according to the embodiment can be applied to each of the parallelization process and the serialization process like the basic structure related to the 3-pass scheme of the MQ authentication described above. Further, for example, the process related to the sharing of the identification information $ID_B$ according to the embodiment can also be applied to each of the basic structure related to the 5-pass scheme of the MQ authentication described above, and the parallelization process and the serialization process of the basic structures related to the 5-pass scheme.

As a kind of identification information transmitted when the identification information is shared by transmitting the identification information from the information processing apparatus 100 to the verification processing apparatus 200, one kind of identification information is exemplified. For example, when the process of serializing the basic structures is executed, the information processing apparatus 100 does not transmit other identification information in communication related to each basic structure. For example, the foregoing example can be realized by constructing a protocol so that the information processing apparatus 100 transmits the identification information only in one-time communication.

[5-3] Third Expansion Example: Application Example to Authentication Scheme Using Signature Technology The application examples of the information processing method (the method related to the process in the prover) according to the embodiment and the verification processing method (the method related to the process in the verifier) according to the embodiment to the authentication methods other than authentication schemes using signature technologies by exemplifying the MQ authentication have been described above. As described above, however, the information processing method according to the embodiment and the verification processing method according to the embodiment can also be applied to authentication schemes using signature technologies. Accordingly, an application example of the information processing method according to the embodiment and the verification processing method according to the embodiment to an authentication scheme using a signature technology will be described.

The information processing apparatus 100 generates a signature that is valid only for an apparatus serving as a verifier corresponding to the identification information $ID_B$ (and can be verified normally only by an apparatus serving as a verifier corresponding to the identification information $ID_B$), for example, by performing Fiat-Shamir conversion on a process of parallelizing the basic structures related to the 3-pass scheme (or the 5-pass scheme) described above. The verification processing apparatus 200 verifies whether response information is a signature (a signature generated through the foregoing Fiat-Shamir conversion) corresponding to challenge information by verifying the response information transmitted from the information processing apparatus 100.

When the information processing apparatus 100 and the verification processing apparatus 200 perform, for example, the foregoing processes, a signature scheme in which the identification information $ID_B$ is included in the commitment information or the challenge information according to the embodiment is realized. Accordingly, by using the signature scheme according to the embodiment, it is possible to prevent, for example, the illegal authentication illustrated in C of FIG. 2 from being executed.

Figure 38:
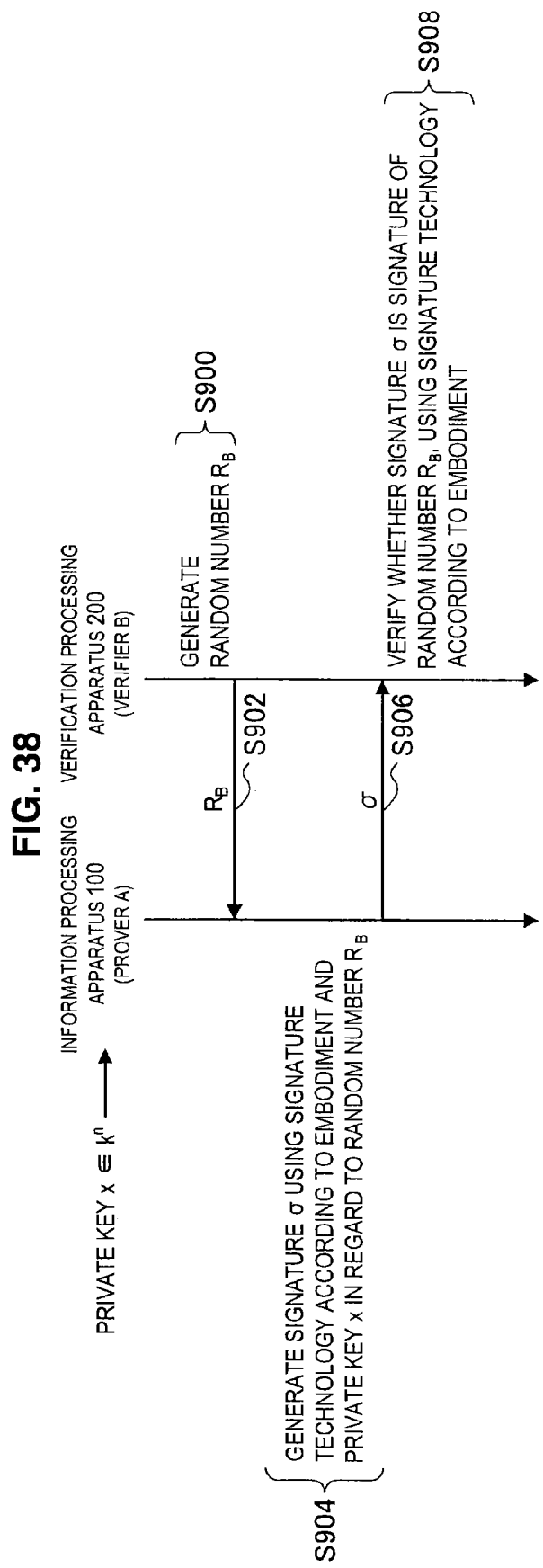
FIG. 38 is an explanatory diagram for describing an example of a process related to a signature scheme according to the embodiment.

FIG. 38 is an explanatory diagram for describing an example of a process related to a signature scheme according to the embodiment.

The verification processing apparatus 200 generates a random number $R_B$ (S900) and transmits the generated random number $R_B$ to the information processing apparatus 100 (S902). Here, in the process illustrated in FIG. 38, the random number $R_B$ corresponds to challenge information.

The information processing apparatus 100 receiving the random number $R_B$ transmitted in step S902 from the verification processing apparatus 200 generates a signature σ in regard to the random number $R_B$ using the signature technology according to the embodiment using the Fiat-Shamir conversion and a private key x (S904). Then, the information processing apparatus 100 transmits the generated signature σ to the verification processing apparatus 200 (S906). Here, in the process illustrated in FIG. 38, the signature σ corresponds to response information.

The verification processing apparatus 200 receiving the signature σ transmitted in step S906 from the information processing apparatus 100 verifies whether the signature σ is a signature of the random number $R_B$ transmitted in step S902, using the signature technology according to the embodiment using the Fiat-Shamir conversion (S908). More specifically, for example, the verification processing apparatus 200 verifies whether the received signature σ is a signature of information connecting the random number $R_B$ to the identification information $ID_B$ of the verifier. For example, when the signature σ is a signature of the random number $R_B$ transmitted in step S902, the verification processing apparatus 200 authenticates the information processing apparatus 100 having transmitted the signature σ as the genuine information processing apparatus 100.

(Information Processing Apparatus and Verification Processing Apparatus According to Embodiment)

Next, examples of the configurations of the information processing apparatus 100 (apparatus serving as the prover) according to the embodiment capable of performing the process related to the information processing method according to the embodiment described above and the verification processing apparatus 200 (apparatus serving as the verifier) according to the embodiment capable of performing the process related to the verification processing method according to the embodiment described above will be described.

[1] Information Processing Apparatus 100 (Apparatus Serving as Prover)

Figure 39:
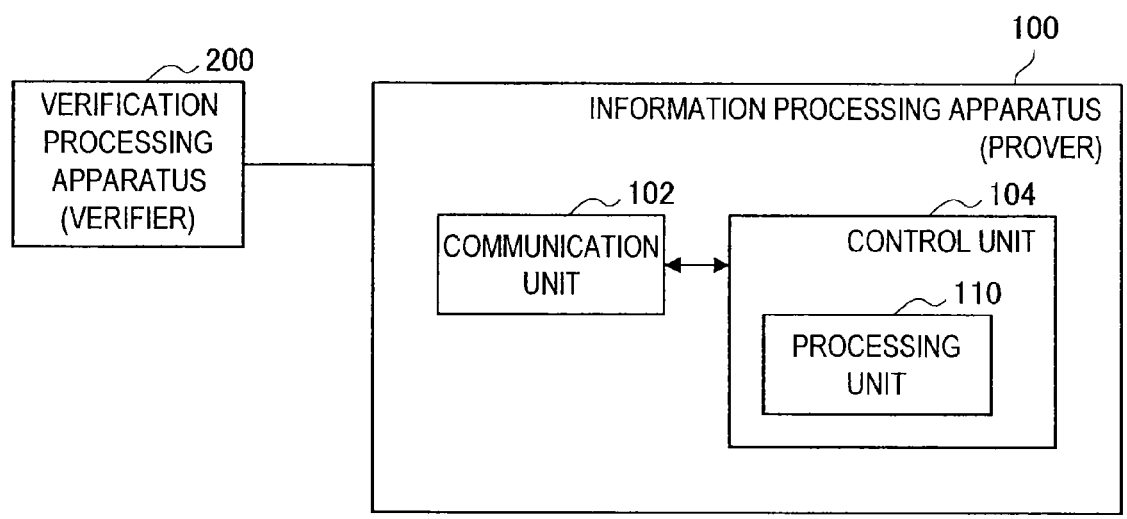
FIG. 39 is a block diagram illustrating an example of the configuration of an information processing apparatus according to the embodiment.

FIG. 39 is a block diagram illustrating an example of the configuration of an information processing apparatus 100 according to the embodiment. In FIG. 39, the verification processing apparatus 200 serving as the verifier is also illustrated.

For example, the information processing apparatus 100 and the verification processing apparatus 200 communicate with each other via a network (or directly). Here, examples of the network according to the embodiment include a wired network such as a local area network (LAN) or a wide area network (WAN), a wireless network such as a wireless local area network (WLAN) or a wireless wide area network (WWAN) via a base station, and the Internet using a communication protocol such as Transmission Control Protocol/Internet Protocol (TCP/IP).

The information processing apparatus 100 includes, for example, a communication unit 102 and a control unit 104.

The information processing apparatus 100 may include, for example, a read-only memory (ROM) (not illustrated), a random access memory (RAM) (not illustrated), a storage unit (not illustrated), an operation unit (not illustrated) which can be operated by a user, and a display unit (not illustrated) which displays various screens on a display screen. In the information processing apparatus 100, for example, the constituent elements are connected by a bus serving as a data transmission path.

Here, the ROM (not illustrated) stores programs to be used by the control unit 104 or control data such as arithmetic parameters. The RAM (not illustrated) temporarily stores programs or the like to be executed by the control unit 104.

The storage unit (not illustrated) is storage means included in the information processing apparatus 100 and stores, for example, various kinds of data such as applications. In the storage unit (not illustrated), for example, regions with a tamper resistant property are provided to store key data such as a private key. The key data such as a private key may be stored in any recording medium with a tamper resistant property. Here, examples of the storage unit (not illustrated) include a magnetic recording medium such as a hard disk and a non-volatile memory such as a flash memory. The storage unit (not illustrated) may be detachably mounted on the information processing apparatus 100.

An operation input device to be described below is exemplified as the operation unit (not illustrated) and a display device to be described below is exemplified as the display unit (not illustrated).

[Example of Hardware Configuration of Information Processing Apparatus 100]

Figure 40:
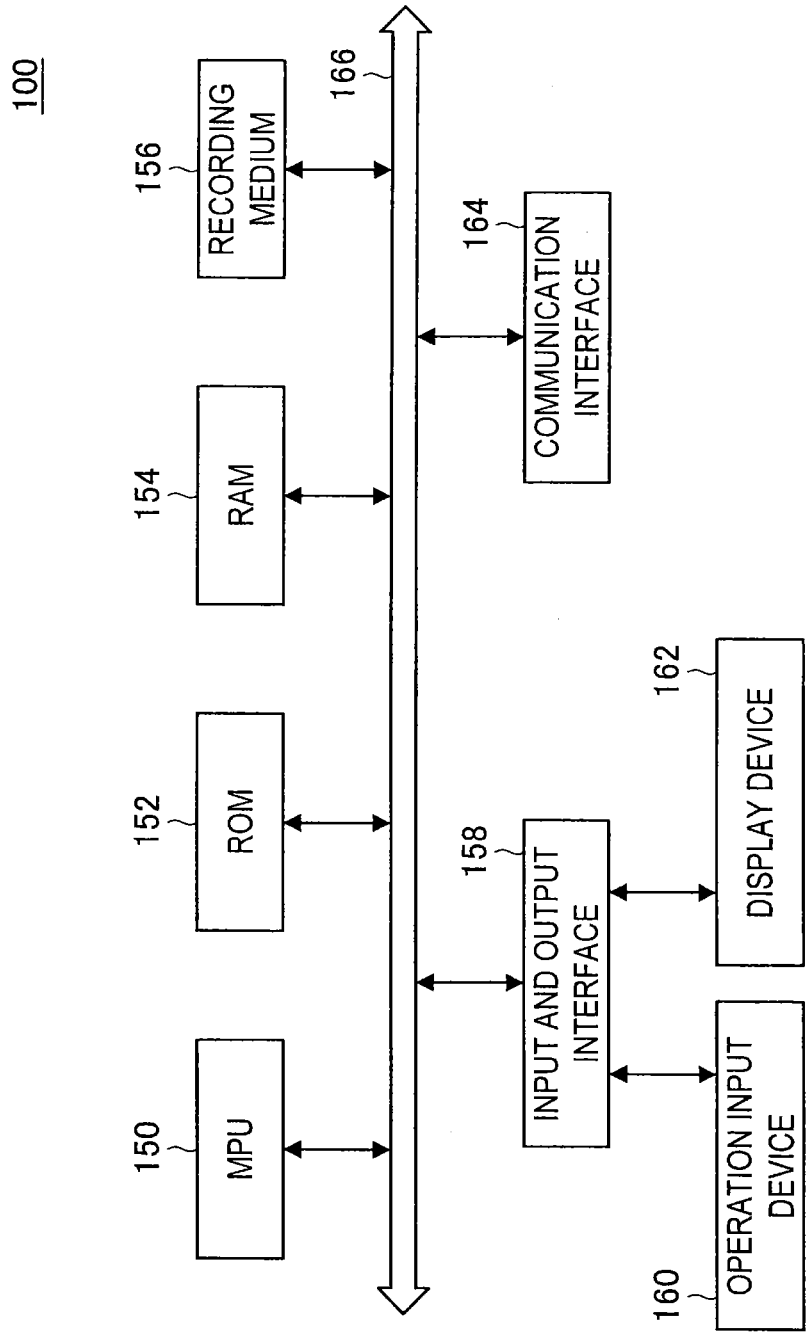
FIG. 40 is an explanatory diagram illustrating an example of a hardware configuration of the information processing apparatus according to the embodiment.

FIG. 40 is an explanatory diagram illustrating an example of a hardware configuration of the information processing apparatus 100 according to the embodiment. The information processing apparatus 100 includes, for example, an MPU 150, a ROM 152, a RAM 154, a recording medium 156, an input and output interface 158, an operation input device 160, a display device 162, and a communication interface 164. In the information processing apparatus 100, for example, the constituent elements are connected by a bus 166 serving as a data transmission path.

The MPU 150 is configured to include, for example, a micro processing unit (MPU) or various processing circuits and functions as the control unit 104 that controls the entire information processing apparatus 100. The MPU 150 serves as, for example, a processing unit 110 to be described below in the information processing apparatus 100.

The ROM 152 stores, for example, programs to be used by the MPU 150 or control data such as arithmetic parameters. For example, the RAM 154 temporarily stores programs or the like to be executed by the MPU 150.

The recording medium 156 functions as a storage unit (not illustrated) and stores, for example, various kinds of data such as applications. Here, examples of the recording medium 156 include a magnetic recording medium such as a hard disk or a non-volatile memory such as a flash memory. The recording medium 156 may be detachably mounted on the information processing apparatus 100.

The input and output interface 158 connects, for example, the operation input device 160 or the display device 162. The operation input device 160 functions as an operation unit (not illustrated) and the display device 162 functions as a display unit (not illustrated). Here, examples of the input and output interface 158 include a Universal Serial Bus (USB) terminal, a Digital Visual Interface (DVI) terminal, a High-Definition Multimedia Interface (HDMI) (registered trademark) terminal, and various processing circuits. The operation input device 160 is provided on, for example, the information processing apparatus 100 and is connected to the input and output interface 158 inside the information processing apparatus 100. Examples of the operation input device 160 include a button, a direction key, a rotational selector such as a jog dial, and a combination thereof. The display device 162 is provided on, for example, the information processing apparatus 100 and is connected to the input and output interface 158 inside the information processing apparatus 100. Examples of the display device 162 include a liquid crystal display (LCD) and an organic LE display (which is called an organic electro-luminescence display or an organic light emitting diode (OLED) display).

The input and output interface 158 can, of course, be connected to an external device, such as an operation input device (for example, a keyboard or a mouse) serving as an external device or a display device of the information processing apparatus 100. The display device 162 may be a device, such as a touch screen, on which display or a user's operation can be performed.

The communication interface 164 is communication means included in the information processing apparatus 100 and functions as the communication unit 102 that performs wireless and wired communication with an external apparatus such as a server via a network (or directly). Here, examples of the communication interface 164 include a communication antenna and a radio frequency (RF) circuit (wireless communication), an IEEE802.15.1 port and a transmission and reception circuit (wireless communication), an IEEE802.11b port and a transmission and reception circuit (wireless communication), and a LAN terminal and a transmission and reception circuit (wired communication).

The information processing apparatus 100 with, for example, the configuration illustrated in FIG. 40 accordingly performs the process related to the information processing method according to the embodiment. The hardware configuration of the information processing apparatus 100 according to the embodiment is not limited to the configuration illustrated in FIG. 40.

For example, when the information processing apparatus 100 communicates with an external apparatus such as the verification processing apparatus 200 via an external communication device connected via the input and output interface 158 or the like, the information processing apparatus 100 may not include the communication interface 164.

For example, the information processing apparatus 100 may have a configuration in which the operation device 160 or the display device 162 is not included.

Referring back to FIG. 39, an example of the configuration of the information processing apparatus 100 will be described. The communication unit 102 is communication means included in the information processing apparatus 100 and perform wired and wireless communication with an external apparatus such as the verification processing apparatus 200 via a network (or directly). The communication of the communication unit 102 is controlled by, for example, the control unit 104.

Here, examples of the communication unit 102 include a communication antenna and an RF circuit, a LAN terminal and a transmission and reception circuit. However, the configuration of the communication unit 102 is not limited to the foregoing configuration. For example, the communication unit 102 may have a configuration corresponding to any standard by which communication can be performed by a USB terminal and a transmission and reception circuit or may have any configuration in which communication with an external apparatus can be performed via the network 400.

The control unit 104 is configured to include, for example, an MPU and serves to control the entire information processing apparatus 100. The control unit 104 includes, for example, a processing unit 110 and serves to chiefly perform the process related to the information processing method according to the embodiment.

The processing unit 110 serves to chiefly perform the process related to the information processing method according to the embodiment, for example, by performing the process of including the identification information in the commitment information described above or the process of including the identification information in the challenge information described above.

More specifically, when the processing unit 110 performs the process of including the identification information in the commitment information, for example, the processing unit 110 transmits the commitment information including the identification information to the verification processing apparatus 200. The processing unit 110 generates the response information based on the challenge information transmitted from the verification processing apparatus 200 and transmits the generated response information to the verification processing apparatus 200.

Here, the processing unit 110 causes the communication unit 102 or an external communication device to transmit various kinds of information such as the commitment information or the response information, for example, by delivering various kinds of information and transmission commands to the communication unit 102 or the external communication device and controlling the communication unit 102 or the external communication device (the same applies below).

When the processing unit 110 performs the process of including the identification information in the challenge information, for example, the processing unit 110 transmits the commitment information to the verification processing apparatus 200. The processing unit 110 generates the second challenge information including the identification information based on the first challenge information transmitted from the verification processing apparatus 200. Then, the processing unit 110 generates the response information based on the generated second challenge information and transmits the generated response information to the verification processing apparatus 200.

For example, the control unit 104 includes the processing unit 110 and chiefly performs the process (for example, the process of including the identification information in the commitment information described above or the process of including the identification information in the challenge information described above) related to the information processing method according to the embodiment.

The information processing apparatus 100 has, for example, the configuration illustrated in FIG. 39 and accordingly performs the process (for example, the process of including the identification information in the commitment information described above or the process of including the identification information in the challenge information described above) related to the information processing method according to the embodiment. Thus, the information processing apparatus 100 has, for example, the configuration illustrated in FIG. 39 and can accordingly prevent, for example, the illegal authentication illustrated in C of FIG. 2 from occurring in the verification processing apparatus 200.

Consequently, the information processing apparatus 100 has, for example, the configuration illustrated in FIG. 39 and can accordingly prevent illegal authentication from occurring in another verifier using information related to authentication with one verifier for other purposes.

The configuration of the information processing apparatus 100 according to the embodiment is not limited to the configuration illustrated in FIG. 39.

For example, the information processing apparatus 100 according to the embodiment can include the processing unit 110 illustrated in FIG. 39 individually from the control unit 104 (for example, the processing unit is realized by an individual processing circuit).

The processing unit 110 may include a plurality of units (functional blocks) which respectively perform one process or two or more processes among various processes including the process (for example, the process of including the identification information in the commitment information described above or the process of including the identification information in the challenge information described above) related to the information processing method according to the embodiment.

For example, when the information processing apparatus 100 according to the embodiment communicates with an external apparatus such as the verification processing apparatus 200 via an external communication device, the information processing apparatus 100 according to the embodiment may not include the communication unit 102.

[2] Verification Processing Apparatus (Apparatus Serving as Verifier)

Figure 41:
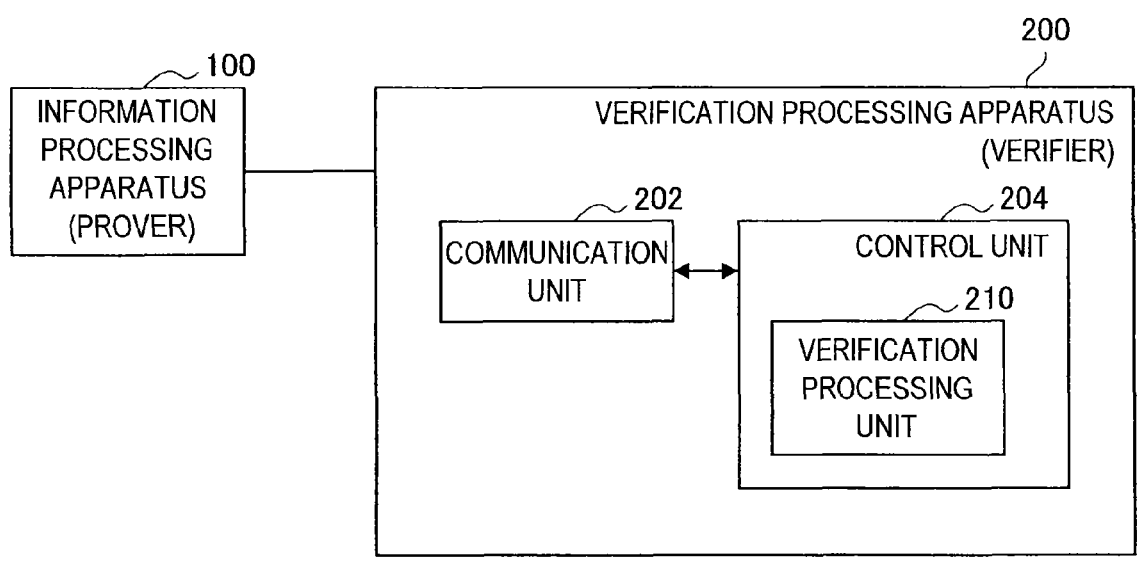
FIG. 41 is a block diagram illustrating an example of the configuration of a verification processing apparatus according to the embodiment.

FIG. 41 is a block diagram illustrating an example of the configuration of a verification processing apparatus 200 according to the embodiment. In FIG. 41, the information processing apparatus 100 serving as the prover is also illustrated. For example, the verification processing apparatus 200 and the information processing apparatus 100 communicate with each other via a network (or directly).

The verification processing apparatus 200 includes, for example, a communication unit 202 and a control unit 204.

The verification processing apparatus 200 may include, for example, a ROM (not illustrated), a RAM (not illustrated), a storage unit (not illustrated), an operation unit (not illustrated) which can be operated by a user, and a display unit (not illustrated) which displays various screens on a display screen. In the verification processing apparatus 200, for example, the constituent elements are connected by a bus serving as a data transmission path.

Here, the ROM (not illustrated) stores programs to be used by the control unit 204 or control data such as arithmetic parameters. The RAM (not illustrated) temporarily stores programs or the like to be executed by the control unit 204.

The storage unit (not illustrated) is storage means included in the verification processing apparatus 200 and stores, for example, data indicating verification results or various kinds of data such as applications. Here, examples of the storage unit (not illustrated) include a magnetic recording medium such as a hard disk and a non-volatile memory such as a flash memory. The storage unit (not illustrated) may be detachably mounted on the verification processing apparatus 200.

The operation input device illustrated in FIG. 40 described above is exemplified as the operation unit (not illustrated) and the display device illustrated in FIG. 40 described above is exemplified as the display unit (not illustrated).

[Example of Hardware Configuration of Verification Processing Apparatus 200]

The verification processing apparatus 200 has, for example, the hardware configuration illustrated in FIG. 40 and performs the process related to the verification processing method according to the embodiment with, for example, the configuration illustrated in FIG. 40.

The hardware configuration of the verification processing apparatus 200 according to the embodiment is not limited to the configuration illustrated in FIG. 40.

For example, when the verification processing apparatus 200 communicates with an external apparatus such as the information processing apparatus 100 via an external communication device connected via the input and output interface 158 or the like, the verification processing apparatus 200 may not include the communication interface 164.

For example, the verification processing apparatus 200 may have a configuration in which the operation device 160 or the display device 162 is not included.

Referring back to FIG. 41, an example of the configuration of the verification processing apparatus 200 will be described. The communication unit 202 is communication means included in the verification processing apparatus 200 and performs wired and wireless communication with an external apparatus such as the information processing apparatus 100 via a network (or directly). The communication of the communication unit 202 is controlled by, for example, the control unit 204.

Here, examples of the communication unit 202 include a communication antenna and an RF circuit, a LAN terminal and a transmission and reception circuit. However, the configuration of the communication unit 202 is not limited to the foregoing configuration. For example, the communication unit 202 may have a configuration corresponding to any standard by which communication can be performed by a USB terminal and a transmission and reception circuit or may have any configuration in which communication with an external apparatus can be performed via a network.

The control unit 204 is configured to include, for example, an MPU and serves to control the entire verification processing apparatus 200. The control unit 204 includes, for example, a verification processing unit 210 and serves to chiefly perform the process related to the verification processing method according to the embodiment.

The verification processing unit 210 serves to chiefly perform the process related to the verification processing method according to the embodiment, for example, by performing the process of including the identification information in the commitment information described above or the process of including the identification information in the challenge information described above.

More specifically, when the verification processing unit 210 performs the process of including the identification information in the commitment information, for example, the verification processing unit 210 transmits the challenge information based on the commitment information including the identification information and transmitted from the information processing apparatus 100. For example, the verification processing unit 210 verifies the information processing apparatus 100 based on the identification information and the response information transmitted from the information processing apparatus 100 in regard to the transmitted challenge information.

Here, for example, the identification information used in the process by the verification processing unit 210 may be shared in advance with the information processing apparatus 100 or may be shared with the information processing apparatus 100 by transmitting the identification information along with the commitment information or the response information from the information processing apparatus 100.

Here, the verification processing unit 210 causes the communication unit 202 or an external communication device to transmit various kinds of information such as the challenge information, for example, by delivering various kinds of information and transmission commands to the communication unit 202 or the external communication device and controlling the communication unit 202 or the external communication device (the same applies below).

When the verification processing unit 210 performs the process of including the identification information in the above-described challenge information, for example, the verification processing unit 210 transmits the first challenge information to the information processing apparatus 100 based on the commitment information transmitted from the information processing apparatus 100. For example, the verification processing unit 210 generates the second challenge information based on the transmitted first challenge information and the identification information. Then, for example, the verification processing unit 210 verifies the information processing apparatus 100 based on the second challenge information and the response information transmitted from the information processing apparatus 100 in regard to the first challenge information.

For example, the control unit 204 includes the verification processing unit 210 and chiefly performs the process (for example, the process of including the identification information in the commitment information described above or the process of including the identification information in the challenge information described above) related to the verification processing method according to the embodiment.

The verification processing apparatus 200 has, for example, the configuration illustrated in FIG. 41 and accordingly performs the process (for example, the process of including the identification information in the commitment information described above or the process of including the identification information in the challenge information described above) related to the verification processing method according to the embodiment. Thus, the verification processing apparatus 200 has, for example, the configuration illustrated in FIG. 41 and can accordingly prevent, for example, the illegal authentication illustrated in C of FIG. 2 from occurring.

Consequently, the verification processing apparatus 200 has, for example, the configuration illustrated in FIG. 41 and can accordingly prevent illegal authentication from occurring in another verifier using information related to authentication with one verifier for other purposes.

The configuration of the verification processing apparatus 200 according to the embodiment is not limited to the configuration illustrated in FIG. 41.

For example, the verification processing apparatus 200 according to the embodiment can include the verification processing unit 210 illustrated in FIG. 41 individually from the control unit 204 (for example, the verification processing unit is realized by an individual processing circuit).

The verification processing unit 210 may include a plurality of units (functional blocks) which respectively perform one process or two or more processes among various processes including the process (for example, the process of including the identification information in the commitment information described above or the process of including the identification information in the challenge information described above) related to the verification processing method according to the embodiment.

For example, when the verification processing apparatus 200 according to the embodiment communicates with an external apparatus such as the information processing apparatus 100 via an external communication device, the verification processing apparatus 200 according to the embodiment may not include the communication unit 202.

The information processing apparatus (apparatus serving as the prover and performing the process related to the information processing method according to the embodiment) according to the embodiment has been described above, but the embodiment is not limited thereto. The embodiment can be applied to, for example, various apparatuses such as tablet apparatuses, communication apparatuses such as portable telephones or smartphones, video and music reproducing apparatuses (or video and music recording and reproducing apparatuses), game apparatuses, and computers such as personal computers (PCs). For example, the embodiment can also be applied to an integrated circuit (IC) which can be embedded into the foregoing apparatus.

The verification processing apparatus (apparatus serving as the verifier and performing the process related to the verification processing method according to the embodiment) according to the embodiment has been described above, but the embodiment is not limited thereto. The embodiment can be applied to, for example, various apparatuses such as computers such as PCs or servers, tablet apparatuses, communication apparatuses such as portable telephones or smartphones, video and music reproducing apparatuses (or video and music recording and reproducing apparatuses), and game apparatuses. For example, the embodiment can also be applied to a processing IC which can be embedded into the foregoing apparatus.

(Program According to Embodiment)

A program (for example, a program capable of executing the process related to the information processing method according to the embodiment, such as the process of including the identification information in the commitment information described above or the process of including the identification information in the challenge information described above) causing a computer to function as the information processing apparatus (apparatus performing the process related to the information processing method according to the embodiment and serving as the prover) according to the embodiment is executed on the computer, so that illegal authentication can be prevented from occurring in another verifier using information related to the authentication with one verifier for other purposes.

Further, a program (for example, a program capable of executing the process related to the verification processing method according to the embodiment, such as the process of including the identification information in the commitment information described above or the process of including the identification information in the challenge information described above) causing a computer to function as the verification processing apparatus (apparatus performing the process related to the verification processing method according to the embodiment and serving as the verifier) according to the embodiment is executed on the computer, so that illegal authentication can be prevented from occurring in another verifier using information related to the authentication with one verifier for other purposes.

The preferred embodiments of the present disclosure have been described above with reference to the accompanying drawings, whilst the present invention is not limited to the above examples, of course. A person skilled in the art may find various alternations and modifications within the scope of the appended claims, and it should be understood that they will naturally come under the technical scope of the present disclosure.

For example, the programs (computer programs) causing a computer to function as the information processing apparatus (the apparatus executing the process related to the information processing method according to the embodiment and serving as the prover) according to the embodiment or the verification processing apparatus (the apparatus executing the process related to the verification processing method according to the embodiment and serving as the verifier) according to the embodiment has been provided above. However, the embodiment can provide a recording medium storing each of the foregoing programs or all of the foregoing programs together.

The above-described configurations express examples of the embodiment and, of course, pertain to the technical scope of the present disclosure.

Additionally, the present technology may also be configured as below.

(1)

An information processing apparatus including:

a processing unit configured to transmit commitment information including identification information on a verification processing apparatus to the verification processing apparatus, generate response information used for the verification processing apparatus to execute a process related to verification based on challenge information transmitted from the verification processing apparatus, and transmit the response information to the verification processing apparatus or configured to transmit the commitment information to the verification processing apparatus, generate second challenge information including the identification information based on first challenge information transmitted from the verification processing apparatus, generate the response information based on the generated second challenge information, and transmit the response information to the verification processing apparatus.

(2)

The information processing apparatus according to (1), wherein, when the processing unit transmits the commitment information including the identification information, the processing unit includes the identification information in at least a part of information forming the commitment information.

(3)

The information processing apparatus according to (2), wherein, when the processing unit transmits the commitment information including the identification information, the processing unit includes the identification information in all of the information forming the commitment information.

(4)

The information processing apparatus according to (1), wherein, when the processing unit transmits the commitment information including the identification information, the processing unit transmits a hash value of the commitment information including the identification information to the verification processing apparatus.

(5)

The information processing apparatus according to (1), wherein, when the processing unit generates the second challenge information including the identification information, the processing unit transmits a hash value of the commitment information to the verification processing apparatus.

(6)

The information processing apparatus according to any one of (1) to (5), wherein the processing unit transmits the identification information along with the commitment information or the response information to the verification processing apparatus.

(7)

The information processing apparatus according to any one of (1) to (6), wherein an authentication scheme with the verification processing apparatus is a Multivariate Quadratic (MQ) authentication scheme.

(8)

A verification processing apparatus including:

a verification processing unit configured to verify an information processing apparatus based on identification information of the verification processing apparatus and response information transmitted from the information processing apparatus, in regard to challenge information transmitted from the information processing apparatus and transmitted based on commitment information including the identification information or configured to generate first challenge information transmitted to the information processing apparatus based on the commitment information transmitted from the information processing apparatus and second challenge information based on the identification information and to verify the information processing apparatus based on the second challenge information and the response information transmitted from the information processing apparatus in regard to the first challenge information.

(9)

The verification processing apparatus according to (8), wherein, when the verification processing unit verifies the information processing apparatus based on the response information and the identification information, the verification processing unit verifies at least a part of information forming the commitment information corresponding to the challenge information based on the response information and the identification information.

(10)

The verification processing apparatus according to (9), wherein, when the verification processing unit verifies the information processing apparatus based on the response information and the identification information and the identification information is included in at least the part of the information forming the commitment information, the verification processing unit verifies the information processing apparatus based on the identification information in regard to the part of the information including the identification information.

(11)

The verification processing apparatus according to (8), wherein, when the verification processing unit verifies the information processing apparatus based on the response information and the identification information and the commitment information is a hash value of the commitment information, the verification processing unit verifies the hash value of the commitment information based on the response information and the identification information.

(12)

The verification processing apparatus according to (8), wherein, when the verification processing unit verifies the information processing apparatus based on the second challenge information and the response information, the verification processing unit verifies at least a part of information forming the commitment information corresponding to the second challenge information.

(13)

The verification processing apparatus according to (8), wherein, when the verification processing unit verifies the information processing apparatus based on the second challenge information and the response information, the verification processing unit verifies a hash value of the commitment information based on the second challenge information and the response information.

(14)

The verification processing apparatus according to any one of (8) to (13), wherein the identification information is transmitted along with the commitment information or the response information from the information processing apparatus.

(15)

The verification processing apparatus according to (14), wherein the verification processing unit verifies the identification information transmitted from the information processing apparatus and uses the identification information when the verification processing unit verifies the identification information normally.

(16)

The verification processing apparatus according to any one of (8) to (15), wherein an authentication scheme with the information processing apparatus is an MQ authentication scheme.

(17)

An information processing method including:

a step of transmitting commitment information including identification information of a verification processing apparatus to the verification processing apparatus; and a step of generating response information used for the verification processing apparatus to perform a process related to verification based on challenge information transmitted from the verification processing apparatus and transmitting the response information to the verification processing apparatus, or a step of transmitting the commitment information to the verification processing apparatus;

a step of generating second challenge information including the identification information based on first challenge information transmitted from the verification processing apparatus; and a step of generating the response information based on the generated second challenge information and transmitting the response information to the verification processing apparatus.

(18)

A verification processing method including:

a step of transmitting challenge information based on commitment information transmitted from an information processing apparatus and including identification information of a verification processing apparatus; and a step of verifying the information processing apparatus based on response information transmitted from the information processing apparatus in regard to the transmitted challenge information and the identification information, or a step of transmitting first challenge information to the information processing apparatus based on the commitment information transmitted from the information processing apparatus;

a step of generating second challenge information based on the transmitted first challenge information and the identification information; and a step of verifying the information processing apparatus based on the second challenge information and the response information transmitted from the information processing apparatus in regard to the first challenge information.

(19)

A program for causing a computer to execute:

a step of transmitting commitment information including identification information of a verification processing apparatus to the verification processing apparatus; and a step of generating response information used for the verification processing apparatus to perform a process related to verification based on challenge information transmitted from the verification processing apparatus and transmitting the response information to the verification processing apparatus, or a step of transmitting the commitment information to the verification processing apparatus;

a step of generating second challenge information including the identification information based on first challenge information transmitted from the verification processing apparatus; and a step of generating the response information based on the generated second challenge information and transmitting the response information to the verification processing apparatus.

(20)

A program for causing a computer to execute:

a step of transmitting challenge information based on commitment information transmitted from an information processing apparatus and including identification information of the verification processing apparatus; and a step of verifying the information processing apparatus based on response information transmitted from the information processing apparatus in regard to the transmitted challenge information and the identification information, or a step of transmitting first challenge information to the information processing apparatus based on the commitment information transmitted from the information processing apparatus;

a step of generating second challenge information based on the transmitted first challenge information and the identification information; and a step of verifying the information processing apparatus based on the second challenge information and the response information transmitted from the information processing apparatus in regard to the first challenge information.

REFERENCE SIGNS LIST 10, 20, 30, 100 information processing apparatus
102, 202 communication unit
104, 204 control unit
110 processing unit
200 verification processing apparatus
210 verification processing unit

The invention claimed is:

1. An information processing apparatus comprising:
a memory; and
one or more processors coupled to the memory and configured to:
transmit commitment information, including identification information of a verification processing apparatus, to the verification processing apparatus,
receive first challenge information from the verification processing apparatus,
generate second challenge information including the identification information based on the received first challenge information,
generate first response information based on the generated second challenge information,
transmit the first response information to the verification processing apparatus,
receive third challenge information from the verification processing apparatus,
generate second response information, used for the verification processing apparatus to execute a process related to verification of the information processing apparatus, based on the received third challenge information, and
transmit the second response information to the verification processing apparatus.

2. The information processing apparatus according to claim 1, wherein, in an event the one or more processors transmit the commitment information including the identification information, the one or more processors are configured to include the identification information in at least a part of information forming the commitment information.

3. The information processing apparatus according to claim 2, wherein, in an event the one or more processors transmit the commitment information including the identification information, the one or more processors are configured to include the identification information in all of the information forming the commitment information.

4. The information processing apparatus according to claim 1, wherein, in an event the one or more processors transmit the commitment information including the identification information, the one or more processors are configured to transmit a hash value of the commitment information including the identification information to the verification processing apparatus.

5. The information processing apparatus according to claim 1, wherein, in event of the one or more processors generate the second challenge information including the identification information, the one or more processors are configured to transmit a hash value of the commitment information to the verification processing apparatus.

6. The information processing apparatus according to claim 1, wherein the one or more processors are configured to transmit the identification information along with the commitment information to the verification processing apparatus.

7. The information processing apparatus according to claim 1, wherein an authentication scheme with the verification processing apparatus is a Multivariate Quadratic (MQ) authentication scheme.

8. A verification processing apparatus comprising:
a memory; and
one or more processors coupled to the memory and configured to:
receive commitment information, including identification information of the verification processing apparatus, from an information processing apparatus,
generate first challenge information in response to the reception of the commitment information,
transmit the generated first challenge information to the information processing apparatus,
receive first response information from the information processing apparatus,
receive second response information, to execute a process related to verification of the information processing apparatus, from the information processing apparatus,
wherein the second response information is generated by the information processing apparatus based on third challenge information received from the verification processing apparatus,
wherein the third challenge information is generated by the verification processing apparatus in response to the reception of the first response information from the information processing apparatus,
wherein the first response information is generated by the information processing apparatus based on second challenge information including the identification information and
wherein the second challenge information is generated by the information processing apparatus based on the first challenge information received from the verification processing apparatus, and
verify the information processing apparatus based on the received second response information.

9. The verification processing apparatus according to claim 8, wherein, in an event the one or more processors verify the information processing apparatus based on the second response information and the identification information, the one or more processors are configured to verify at least a part of information forming the commitment information corresponding to the second challenge information based on the second response information and the identification information.

10. The verification processing apparatus according to claim 9, wherein, in an event the one or more processors verify the information processing apparatus based on the second response information and the identification information and the identification information is included in at least the part of the information forming the commitment information, the one or more processors are configured to verify the information processing apparatus based on the identification information in regard to the part of the information including the identification information.

11. The verification processing apparatus according to claim 8, wherein, in an event the one or more processors verify the information processing apparatus based on the second response information and the identification information and the commitment information is a hash value of the commitment information, the one or more processors are configured to verify the hash value of the commitment information based on the second response information and the identification information.

12. The verification processing apparatus according to claim 8, wherein, in an event the one or more processors verify the information processing apparatus based on the second challenge information and the second response information, the one or more processors are configured to verify at least a part of information forming the commitment information corresponding to the second challenge information.

13. The verification processing apparatus according to claim 8, wherein, in an event the one or more processors verify the information processing apparatus based on the second challenge information and the second response information, the one or more processors are configured to verify a hash value of the commitment information based on the second challenge information and the second response information.

14. The verification processing apparatus according to claim 8, wherein, the identification information is transmitted along with the commitment information from the information processing apparatus.

15. The verification processing apparatus according to claim 14, wherein the one or more processors are configured to verify the identification information transmitted from the information processing apparatus and use the identification information in an event the one or more processors verify the identification information.

16. The verification processing apparatus according to claim 8, wherein an authentication scheme with the information processing apparatus is an MQ authentication scheme.

17. An information processing method comprising:
in an information processing apparatus:
transmitting commitment information including identification information of a verification processing apparatus to the verification processing apparatus;
receiving first challenge information from the verification processing apparatus;

generating second challenge information including the identification information based on the received first challenge information;

generating first response information based on the generated second challenge information;

transmitting the first response information to the verification processing apparatus;

receiving third challenge information from the verification processing apparatus;

generating second response information, used for the verification processing apparatus to execute a process related to verification of the information processing apparatus, based on the received third challenge information; and transmitting the second response information to the verification processing apparatus.

18. A verification processing method comprising:

in a verification processing apparatus:

receiving commitment information, including identification information of the verification processing apparatus, from an information processing apparatus;

generating first challenge information in response to the reception of the commitment information;

transmitting the generated first challenge information to the information processing apparatus;

receiving first response information from the information processing apparatus;

receiving second response information, to execute a process related to verification of the information processing apparatus, from the information processing apparatus, wherein the second response information is generated by the information processing apparatus based on third challenge information received from the verification processing apparatus, wherein the third challenge information is generated by the verification processing apparatus in response to the reception of the first response information from the information processing apparatus, wherein the first response information is generated by the information processing apparatus based on second challenge information including the identification information and wherein the second challenge information is generated by the information processing apparatus based on the first challenge information received from the verification processing apparatus; and verifying the information processing apparatus based on the received second response information.

19. A non-transitory computer readable medium having stored thereon, a set of computer-executable instructions for causing an information processing apparatus to perform steps comprising:

transmitting commitment information including identification information of a verification processing apparatus to the verification processing apparatus;

receiving first challenge information from the verification processing apparatus;

generating second challenge information including the identification information based on the received first challenge information transmitted;

generating first response information based on the generated second challenge information;

transmitting the first response information to the verification processing apparatus;

receiving third challenge information from the verification processing apparatus;

a step of generating second response information, used for the verification processing apparatus to execute a process related to verification of the information processing apparatus, based on the received third challenge information; and transmitting the second response information to the verification processing apparatus.

20. A non-transitory computer readable medium having stored thereon, a set of computer-executable instructions for causing a verification processing apparatus to perform steps comprising receiving commitment information, including identification information of the verification processing apparatus, from an information processing apparatus;

generating first challenge information in response to the reception of the commitment information;

transmitting the generated first challenge information to the information processing apparatus;

receiving first response information from the information processing apparatus;

receiving second response information, to execute a process related to verification of the information processing apparatus, from the information processing apparatus, wherein the second response information is generated by the information processing apparatus based on third challenge information received from the verification processing apparatus, wherein the third challenge information is generated by the verification processing apparatus in response to the reception of the first response information from the information processing apparatus, wherein the first response information is generated by the information processing apparatus based on second challenge information including the identification information and wherein the second challenge information is generated by the information processing apparatus based on the first challenge information received from the verification processing apparatus; and verifying the information processing apparatus based on the received second response information.

* * * * *